US012552863B2

(12) United States Patent
Pejchal et al.

(10) Patent No.: US 12,552,863 B2
(45) Date of Patent: Feb. 17, 2026

(54) HIGH AFFINITY ANTI-CD3 ANTIBODIES, AND METHODS FOR THEIR GENERATION AND USE

(71) Applicant: ADIMAB, LLC, Lebanon, NH (US)

(72) Inventors: Robert Pejchal, Lebanon, NH (US); Caitlin Stein, Lebanon, NH (US); Julia McCreary, Lebanon, NH (US)

(73) Assignee: ADIMAB, LLC, Lebanon, NH (US)

( * ) Notice: Subject to any disclaimer, the term of this patent is extended or adjusted under 35 U.S.C. 154(b) by 981 days.

(21) Appl. No.: 17/617,046

(22) PCT Filed: Jun. 8, 2020

(86) PCT No.: PCT/US2020/036653
§ 371 (c)(1),
(2) Date: Dec. 7, 2021

(87) PCT Pub. No.: WO2020/247929
PCT Pub. Date: Dec. 10, 2020

(65) Prior Publication Data
US 2023/0002487 A1 Jan. 5, 2023

Related U.S. Application Data

(60) Provisional application No. 62/858,949, filed on Jun. 7, 2019.

(51) Int. Cl.
C07K 16/28 (2006.01)
(52) U.S. Cl.
CPC ...... C07K 16/2809 (2013.01); C07K 2317/31 (2013.01); C07K 2317/622 (2013.01); C07K 2317/92 (2013.01)
(58) Field of Classification Search
None
See application file for complete search history.

(56) References Cited

U.S. PATENT DOCUMENTS

| 7,728,114 | B2 | 6/2010 | Mach et al. | |
|---|---|---|---|---|
| 2004/0006216 | A1* | 1/2004 | Waldmann | A61P 37/06 530/388.22 |
| 2009/0258001 | A1 | 10/2009 | Ponath et al. | |
| 2010/0183554 | A1 | 7/2010 | Mach et al. | |
| 2015/0166661 | A1 | 6/2015 | Chen et al. | |
| 2018/0118836 | A1 | 5/2018 | Bernett et al. | |
| 2020/0190189 | A1 | 6/2020 | Walker et al. | |
| 2020/0299408 | A1 | 9/2020 | Chen et al. | |
| 2024/0317858 | A1* | 9/2024 | Battles | C07K 16/2809 |

FOREIGN PATENT DOCUMENTS

| CN | 102906115 | 1/2013 |
|---|---|---|
| CN | 106831996 | 6/2017 |
| CN | 109890963 | 6/2019 |
| WO | WO 2004106380 | 12/2004 |
| WO | WO 2009125825 | 10/2009 |
| WO | 2012162067 | 11/2012 |
| WO | WO 2012158818 | 11/2012 |
| WO | WO 2013049254 | 4/2013 |
| WO | WO 2013148296 | 10/2013 |
| WO | WO 2014047231 | 3/2014 |
| WO | WO 2015095392 | 6/2015 |
| WO | WO 2016079076 | 5/2016 |
| WO | WO 2016116626 | 7/2016 |
| WO | 2016166360 | 10/2016 |
| WO | WO 2016180721 | 11/2016 |
| WO | 2017009442 | 1/2017 |
| WO | 2018117237 | 6/2018 |
| WO | WO 2018075974 | 6/2018 |
| WO | 2018/208864 | 11/2018 |
| WO | 2019034580 | 2/2019 |
| WO | 2019057099 | 3/2019 |
| WO | WO 2019237081 | 12/2019 |
| WO | 2020247929 | 12/2020 |
| WO | 2020247932 | 12/2020 |
| WO | WO 2021034646 | 2/2021 |
| WO | WO 2021041250 | 3/2021 |

OTHER PUBLICATIONS

Rudikoff, et al., PNAS, 1982, 79, p. 1979-1983 (Year: 1982).*
Ahmad, et. al., Clin Dev Immunol, 2012, 980250, 1-15 (Year: 2012).*
Brinkmann, et. al., MABS, 2017, 9, 182-212 (Year: 2017).*
Bedouelle, Hugues, et al. "Diversity and junction residues as hotspots of binding energy in an antibody neutralizing the dengue virus." The FEBS journal 273.1 (2006): 34-46.
Brown, McKay, et al. "Tolerance of single, but not multiple, amino acid replacements in antibody VH CDR 2: a means of minimizing B cell wastage from somatic hypermutation?." Journal of immunology (Baltimore, MD.: 1950) 156.9 (1996): 3285-3291.
Carpenter, Paul A., et al. "A humanized non-FcR-binding anti-CD3 antibody, visilizumab, for treatment of steroid-refractory acute graft-versus-host disease." Blood, The Journal of the American Society of Hematology 99.8 (2002): 2712-2719.
Chatenoud, Lucienne, et al. "Anti-CD3 antibody induces long-term remission of overt autoimmunity in nonobese diabetic mice." Proceedings of the National Academy of Sciences 91.1 (1994): 123-127.
Colman, P. M. "Research in Immunology." Elsevier, NY 145.1 (1994): 33-36.
Kretschmer, Karsten, Holger Engel, and Siegfried Weiss. "Strong antigenic selection shaping the immunoglobulin heavy chain repertoire of B-1a lymphocytes in λ2315 transgenic mice." European journal of immunology 32.8 (2002): 2317-2327.

(Continued)

Primary Examiner — Michael Szperka
Assistant Examiner — Samantha Lake Hopkins
(74) Attorney, Agent, or Firm — Robin L. Teskin; Baker, Donelson, Bearman, Caldwell & Berkowitz PC

(57) ABSTRACT

Antibodies and antigen-binding fragments thereof with high affinity for CD3 and desirable developability profiles are provided, as well as methods for their manufacture and use.

19 Claims, No Drawings
Specification includes a Sequence Listing.

(56) References Cited

OTHER PUBLICATIONS

Rudikoff, Stuart, et al. "Single amino acid substitution altering antigen-binding specificity." Proceedings of the National Academy of Sciences 79.6 (1982): 1979-1983.

Sydow, Jasmin F., et al. "Structure-based prediction of asparagine and aspartate degradation sites in antibody variable regions." PloS one 9.6 (2014): e100736.

Vajdos, Felix F., et al. "Comprehensive functional maps of the antigen-binding site of an anti-ErbB2 antibody obtained with shotgun scanning mutagenesis." Journal of molecular biology 320.2 (2002): 415-428.

Shao, Xiao-Feng, et al. "Expression of chimeric anti-CD3 IgG antibody in mammalian cells and analysis of its biological activity." Sheng wu Gong Cheng xue bao= Chinese Journal of Biotechnology 19.5 (2003): 527-531. English Abstract Only.

Hale, Geoff, et al. "Pharmacokinetics and antibody responses to the CD3 antibody otelixizumab used in the treatment of type 1 diabetes." The Journal of Clinical Pharmacology 50.11 (2010): 1238-1248.

Gaglia, J, and Kissler S. "Anti-CD3 antibody for the prevention of type 1 diabetes: a story of perseverance." Biochemistry 58.40 (2019): 4107-4111.

Caldas, Cristina, et al. "Humanization of the anti-CD18 antibody 6.7: an unexpected effect of a framework residue in binding to antigen." Molecular immunology 39.15 (2003): 941-952.

Du, Jiamu, et al. "Molecular basis of recognition of human osteopontin by 23C3, a potential therapeutic antibody for treatment of rheumatoid arthritis." Journal of molecular biology 382.4 (2008): 835-842.

Kunik, Vered, Bjoern Peters, and Yanay Ofran. "Structural consensus among antibodies defines the antigen binding site." PLoS computational biology 8.2 (2012): e1002388.

* cited by examiner

SEQUENCE LISTING

```
<160> NUMBER OF SEQ ID NOS: 134

<210> SEQ ID NO 1
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Xaa can be K, A, T, or V (Lys, Ala, Thr, or
      Val)

<400> SEQUENCE: 1

Xaa Gln Ser Tyr Phe Arg Arg Thr
1               5

<210> SEQ ID NO 2
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Ala Gln Ser Tyr Phe Arg Arg Thr
1               5

<210> SEQ ID NO 3
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Thr Gln Ser Tyr Phe Arg Arg Thr
1               5

<210> SEQ ID NO 4
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 4

Val Gln Ser Tyr Phe Arg Arg Thr
1               5

<210> SEQ ID NO 5
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Lys Gln Ser Tyr Phe Arg Arg Thr
1               5

<210> SEQ ID NO 6
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Ala or Val
<220> FEATURE:
<221> NAME/KEY: MOD_RES
<222> LOCATION: (7)..(7)
<223> OTHER INFORMATION: Arg or Gln

<400> SEQUENCE: 6

Xaa Arg Asp Ala Tyr Gly Xaa Tyr Phe Tyr Asp Val
1               5                   10

<210> SEQ ID NO 7
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (12)..(12)
<223> OTHER INFORMATION: Gly, Met, Asn, or Arg

<400> SEQUENCE: 7

Lys Ser Ser Gln Ser Leu Leu Asn Ala Arg Thr Xaa Lys Asn Tyr Leu
1               5                   10                  15

Ala

<210> SEQ ID NO 8
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Lys Ser Ser Gln Ser Leu Leu Asn Ala Arg Thr Gly Lys Asn Tyr Leu
1               5                   10                  15

Ala

<210> SEQ ID NO 9
```

```
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Lys Ser Ser Gln Ser Leu Leu Asn Ala Arg Thr Arg Lys Asn Tyr Leu
1               5                   10                  15
Ala

<210> SEQ ID NO 10
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Trp Ala Ser Thr Arg Glu Ser
1               5

<210> SEQ ID NO 11
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Trp Ala Ser Thr Arg Ser Ser
1               5

<210> SEQ ID NO 12
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (3)..(3)
<223> OTHER INFORMATION: Ile, Asn, or Val
<220> FEATURE:
<221> NAME/KEY: MOD_RES
<222> LOCATION: (8)..(8)
<223> OTHER INFORMATION: Met or Ile

<400> SEQUENCE: 12

Phe Asn Xaa Lys Asp Tyr Tyr Xaa His
1               5

<210> SEQ ID NO 13
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Phe Asn Ile Lys Asp Tyr Tyr Met His
1               5
```

```
<210> SEQ ID NO 14
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (5)..(5)
<223> OTHER INFORMATION: Glu or Asn
<220> FEATURE:
<221> NAME/KEY: MOD_RES
<222> LOCATION: (13)..(13)
<223> OTHER INFORMATION: Ala, His, or Thr
<220> FEATURE:
<221> NAME/KEY: MOD_RES
<222> LOCATION: (15)..(15)
<223> OTHER INFORMATION: Phe or Leu

<400> SEQUENCE: 14

Trp Ile Asp Leu Xaa Asn Ala Asn Thr Val Tyr Asp Xaa Lys Xaa Gln
1               5                   10                  15

Gly

<210> SEQ ID NO 15
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Trp Ile Asp Leu Glu Asn Ala Asn Thr Val Tyr Asp Ala Lys Phe Gln
1               5                   10                  15

Gly

<210> SEQ ID NO 16
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Trp Ile Asp Leu Glu Asn Ala Asn Thr Ile Tyr Asp Ala Lys Phe Gln
1               5                   10                  15

Gly

<210> SEQ ID NO 17
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 17

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45
```

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
        115

<210> SEQ ID NO 18
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 18

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
                20                  25                  30

Arg Thr Gly Lys Asn Tyr Leu Ala Trp Tyr Gln Gln Lys Pro Gly Gln
            35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Phe Arg Arg Thr Phe Gly Gly Gly Thr Lys Val Glu Ile Lys
                100                 105                 110

<210> SEQ ID NO 19
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
                20                  25                  30

Arg Thr Arg Lys Asn Tyr Leu Ala Trp Tyr Gln Gln Lys Pro Gly Gln
            35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Phe Arg Arg Thr Phe Gly Gly Gly Thr Lys Val Glu Ile Lys
                100                 105                 110

```
<210> SEQ ID NO 20
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 20

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Ala Arg Asp Thr Ser Ala Ser Thr Val Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 21
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Asp Ile Val Met Thr Gln Ser Pro Asp Ser Leu Ala Val Ser Leu Gly
1               5                   10                  15

Glu Arg Ala Ile Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                85                  90                  95

Ser Tyr Phe Arg Arg Thr Phe Gly Gly Gly Thr Lys Val Glu Ile Lys
            100                 105                 110

<210> SEQ ID NO 22
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Gln Val Gln Leu Val Gln Ser Gly Ala Glu Val Lys Lys Pro Gly Ala
```

```
1               5                   10                  15
Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Ala Ser Ala Ser Thr Ala Tyr
65                  70                  75                  80

Met Glu Leu Ser Ser Leu Arg Ser Glu Asp Thr Ala Val Tyr Tyr Cys
            85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 23
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Val Gln
            85                  90                  95

Ser Tyr Phe Arg Arg Thr Phe Gly Gly Gly Thr Lys Val Glu Ile Lys
                100                 105                 110

<210> SEQ ID NO 24
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
```

```
                65                  70                  75                  80
Met Glu Leu Gly Ser Leu Arg Ser Glu Asp Thr Ala Val Tyr Tyr Cys
                        85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 25
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Ala Gln
                85                  90                  95

Ser Tyr Phe Arg Arg Thr Phe Gly Gly Gly Thr Lys Val Glu Ile Lys
            100                 105                 110

<210> SEQ ID NO 26
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Val Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115
```

```
<210> SEQ ID NO 27
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Gln Val Gln Leu Val Gln Ser Gly Ala Glu Val Lys Lys Pro Gly Ala
1               5                   10                  15

Thr Val Lys Val Ser Cys Lys Ala Ser Gly Phe Asn Ile Lys Asp Tyr
            20                  25                  30

Tyr Ile His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 28
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Arg Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Val Gln
                85                  90                  95

Ser Tyr Phe Arg Arg Thr Phe Gly Gly Gly Thr Lys Val Glu Ile Lys
            100                 105                 110

<210> SEQ ID NO 29
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 29

Gln Val Gln Leu Val Gln Ser Gly Ala Glu Val Lys Arg Pro Gly Ala
1               5                   10                  15
```

```
Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 30
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Gln Val Gln Leu Val Gln Ser Glu Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 31
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60
```

```
Gln Gly Arg Val Thr Ile Thr Arg Asp Thr Ser Ala Ser Thr Ala Tyr
65                  70                  75                  80

Met Glu Leu Ser Asn Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 32
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Gln Tyr Phe Tyr Asp Val Trp Gly Gln Gly
            100                 105                 110

Thr Leu Val Thr Val Ser Ser
        115

<210> SEQ ID NO 33
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Val Arg Asp Ala Tyr Gly Arg Tyr Phe Tyr Asp Val Trp Gly Gln Gly
            100                 105                 110
```

```
Thr Leu Val Thr Val Ser Ser
        115
```

<210> SEQ ID NO 34
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

```
Asp Ile Val Met Ser Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Ser Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Val Gln
                85                  90                  95

Ser Tyr Phe Arg Arg Thr Phe Gly Gly Gly Thr Lys Val Glu Ile Lys
            100                 105                 110
```

<210> SEQ ID NO 35
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

```
Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Leu
    50                  55                  60

Gln Gly Arg Val Thr Ile Thr Arg Asp Thr Ser Ala Ser Thr Ala Tyr
65                  70                  75                  80

Met Glu Leu Ser Ser Leu Gly Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115
```

<210> SEQ ID NO 36
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                85                  90                  95

Ser Tyr Phe Arg Arg Thr Phe Gly Gly Gly Thr Lys Val Glu Ile Lys
            100                 105                 110

<210> SEQ ID NO 37
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Leu
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 38
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 38

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

```
Pro Pro Lys Leu Leu Ile Tyr Trp Ala Ser Ala Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                85                  90                  95

Ser Tyr Phe Arg Arg Thr Phe Gly Gly Gly Thr Lys Val Glu Ile Lys
            100                 105                 110
```

<210> SEQ ID NO 39
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

```
Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Glu Leu Leu Asn Ala
                20                  25                  30

Arg Thr Gly Lys Asn Tyr Leu Ala Trp Tyr Gln Gln Lys Pro Gly Gln
            35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Phe Arg Arg Thr Phe Gly Gly Gly Thr Lys Val Glu Ile Lys
            100                 105                 110
```

<210> SEQ ID NO 40
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

```
Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
                20                  25                  30

Tyr Met His Trp Val Arg Gln Ala Pro Gly Gln Arg Leu Glu Trp Ile
            35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Asn Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
            115
```

```
<210> SEQ ID NO 41
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Phe Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                85                  90                  95

Ser Tyr Phe Arg Arg Thr Phe Gly Gly Gly Thr Lys Val Glu Ile Lys
            100                 105                 110

<210> SEQ ID NO 42
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Met Arg Glu Ser Gly Val
    50                  55                  60

Pro Asp Arg Phe Ser Gly Ser Arg Ser Gly Thr Asp Phe Thr Leu Thr
65                  70                  75                  80

Ile Ser Ser Leu Gln Ala Glu Asp Val Ala Val Tyr Tyr Cys Ser Gln
                85                  90                  95

Ser Tyr Phe Arg Arg Thr Phe Gly Gly Gly Thr Lys Val Glu Ile Lys
            100                 105                 110

<210> SEQ ID NO 43
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
```

```
            20                  25                  30
Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Asn Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                85                  90                  95

Ser Tyr Phe Arg Arg Thr Phe Gly Gly Gly Thr Lys Val Glu Ile Lys
            100                 105                 110

<210> SEQ ID NO 44
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Gly Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 45
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Met Lys Asn Tyr Leu Ala Trp Tyr Gln Gln Lys Pro Gly Gln
        35                  40                  45

Pro Pro Lys Leu Leu Ile Tyr Ala Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Ala Gln
```

```
                    85                  90                  95

Ser Tyr Phe Arg Arg Thr Phe Gly Gly Gly Thr Lys Val Glu Ile Lys
                100                 105                 110

<210> SEQ ID NO 46
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 46

Asp Ile Val Met Thr Gln Ser Pro Asp Ser Leu Ala Val Ser Leu Gly
1               5                   10                  15

Glu Arg Ala Thr Ile Asn Cys Lys Thr Ser Gln Ser Leu Leu Asn Ala
            20                  25                  30

Arg Thr Asn Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Val Gln
                85                  90                  95

Ser Tyr Phe Arg Arg Thr Phe Gly Gly Gly Thr Lys Val Glu Ile Lys
                100                 105                 110

<210> SEQ ID NO 47
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Ala Ala Val Tyr Tyr Cys Ala Gln
                85                  90                  95

Ser Tyr Phe Arg Arg Thr Phe Gly Gly Gly Thr Lys Val Glu Ile Lys
                100                 105                 110

<210> SEQ ID NO 48
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48
```

-continued

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Arg Arg Asn Tyr Leu Ala Trp Tyr Gln Gln Lys Pro Gly Gln
        35                  40                  45

Pro Pro Lys Leu Leu Ile Tyr Trp Gly Ser Thr Arg Glu Ser Gly Val
50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Phe Arg Arg Thr Phe Gly Gly Gly Thr Lys Val Glu Ile Lys
            100                 105                 110

<210> SEQ ID NO 49
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

Gln Val Gln Leu Val Gln Ser Gly Ala Glu Val Glu Glu Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 50
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gln Val Gln Leu Val Gln Ser Gly Ala Glu Val Lys Lys Pro Gly Ala
1               5                   10                  15

Pro Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
        115

<210> SEQ ID NO 51
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Ile His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
        115

<210> SEQ ID NO 52
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Ala Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
        115

<210> SEQ ID NO 53
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

Asp Ile Val Met Thr Gln Ser Pro Asp Ser Leu Ala Val Ser Leu Gly
1               5                   10                  15

Gly Arg Ala Thr Ile Asn Cys Lys Ser Ser Gln Ser Leu Leu Asn Ala
            20                  25                  30

Arg Thr Gly Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Val Gln
                85                  90                  95

Ser Tyr Phe Arg Arg Thr Phe Gly Gly Gly Thr Lys Val Glu Ile Lys
            100                 105                 110

<210> SEQ ID NO 54
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 54

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Ala Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 55
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 55

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Ile Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 56
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 56

Gln Ala Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Thr Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 57
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
            35                  40                  45

Gly Trp Ile Asp Leu Glu Asn Ala Asn Thr Val Tyr Asp His Lys Phe
 50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 58
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

Gln Ala Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Pro Glu Trp Ile
            35                  40                  45

Gly Trp Ile Asp Leu Glu Asn Ala Asn Thr Val Tyr Asp Ala Lys Phe
 50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Ala Tyr Tyr Cys
                85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 59
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 59

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
            35                  40                  45

Gly Trp Ile Asp Leu Glu Asn Ala Asn Thr Val Tyr Asp Ala Lys Phe
 50                  55                  60

Gln Gly Arg Val Thr Ile Thr Arg Asp Thr Ser Ala Gly Thr Ala His
65                  70                  75                  80

Met Glu Leu Ser Ser Leu Arg Ser Glu Asp Thr Ala Val Tyr Tyr Cys
            85                  90                  95

Ala Arg Asp Ala Tyr Gly Arg Tyr Phe Tyr Asp Val Trp Gly Gln Gly
            100                 105                 110

Thr Pro Val Thr Val Ser Ser
        115

<210> SEQ ID NO 60
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 60

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Asn Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
            85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 61
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 61

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
            20                  25                  30

Arg Thr Arg Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
            85                  90                  95

Ser Tyr Phe Arg Arg Thr Phe Gly Gly Gly Thr Lys Val Glu Ile Lys
            100                 105                 110

<210> SEQ ID NO 62
<211> LENGTH: 119

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 62

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Leu
    50                  55                  60

Gln Gly Arg Val Thr Ile Thr Arg Asp Thr Ser Ala Ser Thr Ala Tyr
65                  70                  75                  80

Met Glu Leu Ser Ser Leu Gly Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Pro Val Thr Val Ser Ser
            115

<210> SEQ ID NO 63
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Ala Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
            115

<210> SEQ ID NO 64
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 64

Asp Ile Val Met Thr Gln Ser Pro Asp Ser Leu Ala Val Ser Leu Gly

```
            1               5                  10                 15
        Glu Arg Ala Thr Ile Asn Cys Lys Ser Ser Gln Ser Leu Leu Asn Ala
                        20                  25                  30

Arg Thr Arg Lys Asn Tyr Leu Ala Trp Tyr Gln Gln Lys Pro Gly Arg
                        35                  40                  45

Pro Pro Lys Leu Leu Ile Tyr Trp Ala Ser Thr Arg Glu Ser Gly Val
                        50                  55                  60

Pro Asp Arg Phe Ser Gly Ser Gly Ser Gly Thr Asp Phe Thr Leu Thr
        65                  70                  75                  80

Ile Ser Ser Leu Gln Ala Glu Asp Val Ala Val Tyr Tyr Cys Val Gln
                        85                  90                  95

Ser Tyr Phe Arg Arg Thr Phe Gly Gly Gly Thr Lys Val Glu Ile Lys
                        100                 105                 110
```

<210> SEQ ID NO 65
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 65

```
        Gln Val Gln Leu Val Gln Ser Gly Ala Glu Val Lys Lys Pro Gly Ala
        1               5                   10                  15

Ser Val Lys Val Ser Cys Lys Ala Ser Gly Phe Asn Ile Lys Asp Tyr
                        20                  25                  30

Tyr Met His Trp Val Arg Gln Ala Pro Gly Gln Arg Leu Glu Trp Ile
                        35                  40                  45

Gly Trp Ile Asp Leu Glu Asn Ala Asn Thr Val Tyr Asp Thr Lys Phe
                        50                  55                  60

Gln Gly Arg Val Thr Ile Thr Arg Asp Thr Ser Ala Ser Thr Ala Tyr
        65                  70                  75                  80

Met Glu Leu Ser Ser Leu Arg Ser Glu Asp Thr Ala Val Tyr Tyr Cys
                        85                  90                  95

Ala Arg Asp Ala Tyr Gly Arg Tyr Phe Tyr Asp Val Trp Gly Gln Gly
                        100                 105                 110

Thr Leu Val Thr Val Ser Ser
                115
```

<210> SEQ ID NO 66
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 66

```
        Asp Ile Val Met Thr Gln Ser Pro Asp Ser Leu Ala Val Ser Leu Gly
        1               5                   10                  15

Glu Arg Ala Thr Ile Asn Cys Lys Thr Ser Gln Gly Leu Leu Asn Ala
                        20                  25                  30

Arg Thr Asn Lys Asn Tyr Leu Ala Trp Tyr Gln Gln Lys Pro Gly Gln
                        35                  40                  45

Pro Pro Lys Leu Leu Ile Tyr Trp Ala Ser Thr Arg Glu Ser Gly Val
                        50                  55                  60

Pro Asp Arg Phe Ser Gly Ser Gly Ser Gly Thr Asp Phe Thr Leu Thr
```

```
                65                  70                  75                  80
Ile Ser Ser Leu Gln Ala Glu Asp Val Ala Val Tyr Tyr Cys Val Gln
                    85                  90                  95

Ser Tyr Phe Arg Arg Thr Phe Gly Gly Gly Thr Lys Val Glu Ile Lys
                100                 105                 110

<210> SEQ ID NO 67
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
                20                  25                  30

Tyr Met His Trp Val Arg Gln Ala Pro Gly Gln Arg Pro Glu Trp Ile
            35                  40                  45

Gly Trp Ile Asp Leu Glu Asn Ala Asn Thr Val Tyr Asp Ala Lys Phe
        50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Ala Ala Tyr Tyr Cys
                    85                  90                  95

Ala Arg Asp Ala Tyr Gly Arg Tyr Phe Tyr Asp Val Trp Gly Gln Gly
                100                 105                 110

Thr Leu Val Thr Val Ser Ser
            115

<210> SEQ ID NO 68
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ala
                20                  25                  30

Arg Thr Gly Lys Asn Tyr Leu Ala Trp Tyr Gln Gln Lys Pro Gly Gln
            35                  40                  45

Pro Pro Glu Leu Leu Ile Tyr Trp Ala Ser Thr Arg Glu Ser Gly Val
        50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Thr Gln
                    85                  90                  95

Ser Tyr Phe Arg Arg Thr Phe Gly Gly Gly Thr Lys Val Glu Ile Lys
                100                 105                 110

<210> SEQ ID NO 69
<211> LENGTH: 119
<212> TYPE: PRT
```

```
<213> ORGANISM: Artificial Sequence
<220> FEATURE:
<223> OTHER INFORMATION: Description of Artificial Sequence: Synthetic
      polypeptide

<400> SEQUENCE: 69

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Asn Lys Asp Tyr
            20                  25                  30

Tyr Met His Trp Val Arg Gln Ala Pro Gly Gln Arg Leu Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 70
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Gln Val Gln Leu Val Gln Ser Gly Ala Glu Val Lys Lys Pro Gly Ala
1               5                   10                  15

Ser Val Lys Val Ser Cys Lys Ala Ser Gly Phe Asn Ile Lys Asp Tyr
            20                  25                  30

Tyr Met His Trp Val Arg Gln Ala Pro Gly Gln Arg Pro Glu Trp Ile
        35                  40                  45

Gly Trp Ile Asp Leu Glu Asn Ala Asn Thr Val Tyr Asp Ala Lys Phe
    50                  55                  60

Gln Gly Arg Val Thr Ile Thr Arg Asp Thr Ser Ala Ser Thr Ala Tyr
65                  70                  75                  80

Met Glu Leu Ser Ser Leu Arg Ser Glu Asp Thr Ala Ala Tyr Tyr Cys
                85                  90                  95

Ala Arg Asp Ala Tyr Gly Arg Tyr Phe Tyr Asp Val Trp Gly Gln Gly
            100                 105                 110

Thr Leu Val Thr Val Ser Ser
        115

<210> SEQ ID NO 71
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Gln Val Gln Leu Val Gln Ser Gly Ala Glu Val Lys Lys Pro Gly Ala
1               5                   10                  15
```

Ser Val Lys Val Ser Cys Lys Ala Ser Gly
            20                  25

<210> SEQ ID NO 72
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 72

Gln Ala Gln Leu Val Gln Ser Gly Ala Glu Val Lys Lys Pro Gly Ala
1               5                   10                  15

Ser Val Lys Val Ser Cys Lys Ala Ser Gly
            20                  25

<210> SEQ ID NO 73
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 73

Gln Val Gln Leu Val Gln Ser Gly Ala Glu Val Glu Glu Pro Gly Ala
1               5                   10                  15

Ser Val Lys Val Ser Cys Lys Ala Ser Gly
            20                  25

<210> SEQ ID NO 74
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 74

Gln Val Gln Leu Val Gln Ser Gly Ala Glu Val Lys Lys Pro Gly Ala
1               5                   10                  15

Pro Val Lys Val Ser Cys Lys Ala Ser Gly
            20                  25

<210> SEQ ID NO 75
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Gln Val Gln Leu Val Gln Ser Gly Ala Glu Val Lys Lys Pro Gly Ala
1               5                   10                  15

Thr Val Lys Val Ser Cys Lys Ala Ser Gly
            20                  25

<210> SEQ ID NO 76
<211> LENGTH: 26
<212> TYPE: PRT
<213> ORGANISM: Artificial Sequence
<220> FEATURE:
<223> OTHER INFORMATION: Description of Artificial Sequence: Synthetic peptide

<400> SEQUENCE: 76

Gln Val Gln Leu Val Gln Ser Gly Ala Glu Val Lys Arg Pro Gly Ala
1               5                   10                  15

Ser Val Lys Val Ser Cys Lys Ala Ser Gly
            20                  25

<210> SEQ ID NO 77
<211> LENGTH: 26
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

Gln Val Gln Leu Val Gln Ser Glu Ala Glu Val Lys Lys Pro Gly Ala
1               5                   10                  15

Ser Val Lys Val Ser Cys Lys Ala Ser Gly
            20                  25

<210> SEQ ID NO 78
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 78

Phe Asn Asn Lys Asp Tyr Tyr Met His
1               5

<210> SEQ ID NO 79
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 79

Phe Asn Ile Lys Asp Tyr Tyr Ile His
1               5

<210> SEQ ID NO 80
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

Phe Asn Val Lys Asp Tyr Tyr Met His
1               5

<210> SEQ ID NO 81
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 81

```
Trp Val Arg Gln Ala Pro Gly Gln Arg Leu Glu Trp Ile Gly
1               5                   10
```

<210> SEQ ID NO 82
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 82

```
Trp Val Arg Gln Ala Pro Gly Gln Arg Pro Glu Trp Ile Gly
1               5                   10
```

<210> SEQ ID NO 83
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 83

```
Trp Val Arg Gln Ala Pro Gly Gln Arg Leu Glu Trp Leu Gly
1               5                   10
```

<210> SEQ ID NO 84
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 84

```
Trp Ile Asp Leu Glu Asn Ala Asn Thr Val Tyr Asp Ala Lys Leu Gln
1               5                   10                  15

Gly
```

<210> SEQ ID NO 85
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 85

```
Trp Ile Asp Leu Glu Asn Ala Asn Thr Val Tyr Asp Thr Lys Phe Gln
1               5                   10                  15

Gly
```

<210> SEQ ID NO 86
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 86

```
Trp Ile Asp Leu Glu Asn Ala Asn Thr Val Tyr Asp His Lys Phe Gln
1               5                   10                  15

Gly
```

<210> SEQ ID NO 87
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 87

Trp Ile Asp Leu Asn Asn Ala Asn Thr Val Tyr Asp Ala Lys Phe Gln
1               5                   10                  15

Gly

<210> SEQ ID NO 88
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 88

Trp Ile Asp Leu Glu Asn Ala Asn Ala Val Tyr Asp Ala Lys Phe Gln
1               5                   10                  15

Gly

<210> SEQ ID NO 89
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

Arg Val Thr Ile Thr Arg Asp Thr Ser Ala Ser Thr Ala Tyr Met Glu
1               5                   10                  15

Leu Ser Ser Leu Arg Ser Glu Asp Thr Ala Val Tyr Tyr Cys
                20                  25                  30

<210> SEQ ID NO 90
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 90

Arg Val Thr Ile Thr Arg Asp Thr Ser Ala Ser Thr Ala Tyr Met Glu
1               5                   10                  15

Leu Ser Asn Leu Arg Ser Glu Asp Thr Ala Val Tyr Tyr Cys
                20                  25                  30

<210> SEQ ID NO 91
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 91

Arg Val Thr Ile Thr Arg Asp Thr Ser Ala Ser Thr Ala Tyr Met Glu

```
                1               5                  10                  15
Leu Ser Ser Leu Arg Ser Glu Asp Ala Ala Tyr Tyr Cys
            20                  25                  30

<210> SEQ ID NO 92
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 92

Arg Val Thr Ile Thr Arg Asp Thr Ser Ala Ser Thr Ala Tyr Met Glu
1               5                  10                  15

Leu Ser Ser Leu Arg Ser Glu Asp Thr Ala Ala Tyr Tyr Cys
            20                  25                  30

<210> SEQ ID NO 93
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Arg Val Thr Ile Thr Arg Asp Thr Ser Ala Ser Thr Ala Tyr Met Glu
1               5                  10                  15

Leu Ser Ser Leu Gly Ser Glu Asp Thr Ala Val Tyr Tyr Cys
            20                  25                  30

<210> SEQ ID NO 94
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 94

Arg Val Thr Ile Thr Arg Asp Thr Ser Ala Gly Thr Ala His Met Glu
1               5                  10                  15

Leu Ser Ser Leu Arg Ser Glu Asp Thr Ala Val Tyr Tyr Cys
            20                  25                  30

<210> SEQ ID NO 95
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Arg Val Thr Ile Thr Arg Asp Thr Ser Ala Ser Ile Ala Tyr Met Glu
1               5                  10                  15

Leu Ser Ser Leu Arg Ser Glu Asp Thr Ala Val Tyr Tyr Cys
            20                  25                  30

<210> SEQ ID NO 96
<211> LENGTH: 30
<212> TYPE: PRT
<213> ORGANISM: Artificial Sequence
<220> FEATURE:
```

```
<223> OTHER INFORMATION: Description of Artificial Sequence: Synthetic
      polypeptide

<400> SEQUENCE: 96

Arg Val Thr Ile Thr Arg Asp Thr Ser Ala Ser Ala Ala Tyr Met Glu
1               5                   10                  15

Leu Ser Ser Leu Arg Ser Glu Asp Thr Ala Val Tyr Tyr Cys
            20                  25                  30

<210> SEQ ID NO 97
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Arg Val Ala Ile Thr Arg Asp Thr Ser Ala Ser Thr Ala Tyr Met Glu
1               5                   10                  15

Leu Ser Ser Leu Arg Ser Glu Asp Thr Ala Val Tyr Tyr Cys
            20                  25                  30

<210> SEQ ID NO 98
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 98

Arg Val Thr Ile Ala Arg Asp Thr Ser Ala Ser Thr Val Tyr Met Glu
1               5                   10                  15

Leu Ser Ser Leu Arg Ser Glu Asp Thr Ala Val Tyr Tyr Cys
            20                  25                  30

<210> SEQ ID NO 99
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 99

Arg Val Thr Ile Thr Arg Asp Ala Ser Ala Ser Thr Ala Tyr Met Glu
1               5                   10                  15

Leu Ser Ser Leu Arg Ser Glu Asp Thr Ala Val Tyr Tyr Cys
            20                  25                  30

<210> SEQ ID NO 100
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 100

Arg Val Thr Ile Thr Arg Asp Thr Ser Ala Ser Thr Ala Tyr Met Glu
1               5                   10                  15

Leu Gly Ser Leu Arg Ser Glu Asp Thr Ala Val Tyr Tyr Cys
            20                  25                  30
```

<210> SEQ ID NO 101
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 101

Arg Val Thr Ile Thr Arg Asp Thr Ser Ala Ser Thr Ala Tyr Met Glu
1               5                   10                  15

Leu Asn Ser Leu Arg Ser Glu Asp Thr Ala Val Tyr Tyr Cys
            20                  25                  30

<210> SEQ ID NO 102
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 102

Arg Val Thr Ile Thr Arg Asp Thr Ser Ala Gly Thr Ala Tyr Met Glu
1               5                   10                  15

Leu Ser Ser Leu Arg Ser Glu Asp Thr Ala Val Tyr Tyr Cys
            20                  25                  30

<210> SEQ ID NO 103
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 103

Ala Arg Asp Ala Tyr Gly Arg Tyr Phe Tyr Asp Val
1               5                   10

<210> SEQ ID NO 104
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 104

Ala Arg Asp Ala Tyr Gly Gln Tyr Phe Tyr Asp Val
1               5                   10

<210> SEQ ID NO 105
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 105

Val Arg Asp Ala Tyr Gly Arg Tyr Phe Tyr Asp Val
1               5                   10

<210> SEQ ID NO 106
<211> LENGTH: 11

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 106

Trp Gly Gln Gly Thr Leu Val Thr Val Ser Ser
1               5                   10

<210> SEQ ID NO 107
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 107

Trp Gly Gln Gly Thr Pro Val Thr Val Ser Ser
1               5                   10

<210> SEQ ID NO 108
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 108

Asp Ile Val Met Thr Gln Ser Pro Asp Ser Leu Ala Val Ser Leu Gly
1               5                   10                  15

Glu Arg Ala Thr Ile Asn Cys
            20

<210> SEQ ID NO 109
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 109

Asp Ile Val Met Ser Gln Ser Pro Asp Ser Leu Ala Val Ser Leu Gly
1               5                   10                  15

Glu Arg Ala Thr Ile Asn Cys
            20

<210> SEQ ID NO 110
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 110

Asp Ile Val Met Thr Gln Ser Pro Asp Ser Leu Ala Val Ser Leu Gly
1               5                   10                  15

Gly Arg Ala Thr Ile Asn Cys
            20

<210> SEQ ID NO 111
<211> LENGTH: 23
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 111

Asp Ile Val Met Thr Gln Ser Pro Asp Ser Leu Ala Val Ser Leu Gly
1               5                   10                  15

Glu Arg Ala Ile Ile Asn Cys
            20

<210> SEQ ID NO 112
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 112

Lys Thr Ser Gln Gly Leu Leu Asn Ala Arg Thr Asn Lys Asn Tyr Leu
1               5                   10                  15

Ala

<210> SEQ ID NO 113
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 113

Lys Ser Ser Gln Ser Leu Leu Asn Ala Arg Thr Arg Arg Asn Tyr Leu
1               5                   10                  15

Ala

<210> SEQ ID NO 114
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 114

Lys Ser Ser Gln Glu Leu Leu Asn Ala Arg Thr Gly Lys Asn Tyr Leu
1               5                   10                  15

Ala

<210> SEQ ID NO 115
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 115

Lys Ser Ser Gln Ser Leu Leu Asn Ala Arg Thr Met Lys Asn Tyr Leu
1               5                   10                  15

Ala
```

-continued

```
<210> SEQ ID NO 116
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 116

Lys Thr Ser Gln Ser Leu Leu Asn Ala Arg Thr Asn Lys Asn Tyr Leu
1               5                   10                  15

Ala

<210> SEQ ID NO 117
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 117

Trp Tyr Gln Gln Lys Pro Gly Gln Pro Pro Lys Leu Leu Ile Tyr
1               5                   10                  15

<210> SEQ ID NO 118
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 118

Trp Tyr Gln Gln Lys Pro Gly Gln Pro Pro Glu Leu Leu Ile Tyr
1               5                   10                  15

<210> SEQ ID NO 119
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 119

Trp Tyr Gln Gln Lys Pro Gly Arg Pro Pro Lys Leu Leu Ile Tyr
1               5                   10                  15

<210> SEQ ID NO 120
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 120

Trp Ala Ser Ala Arg Glu Ser
1               5

<210> SEQ ID NO 121
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 121

Trp Gly Ser Thr Arg Glu Ser
1               5

<210> SEQ ID NO 122
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 122

Trp Ala Phe Thr Arg Glu Ser
1               5

<210> SEQ ID NO 123
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 123

Trp Ala Ser Met Arg Glu Ser
1               5

<210> SEQ ID NO 124
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 124

Trp Ala Ser Thr Arg Glu Asn
1               5

<210> SEQ ID NO 125
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 125

Ala Ala Ser Thr Arg Glu Ser
1               5

<210> SEQ ID NO 126
<211> LENGTH: 32
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 126

Gly Val Pro Asp Arg Phe Ser Gly Ser Gly Ser Gly Thr Asp Phe Thr
1               5                   10                  15

Leu Thr Ile Ser Ser Leu Gln Ala Glu Asp Val Ala Val Tyr Tyr Cys
                20                  25                  30
```

```
<210> SEQ ID NO 127
<211> LENGTH: 32
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 127

Gly Val Pro Asp Arg Phe Ser Gly Ser Gly Ser Gly Thr Asp Phe Thr
1               5                   10                  15

Leu Thr Ile Ser Ser Leu Gln Ala Glu Asp Ala Ala Val Tyr Tyr Cys
            20                  25                  30

<210> SEQ ID NO 128
<211> LENGTH: 32
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 128

Gly Val Pro Asp Arg Phe Ser Gly Ser Arg Ser Gly Thr Asp Phe Thr
1               5                   10                  15

Leu Thr Ile Ser Ser Leu Gln Ala Glu Asp Val Ala Val Tyr Tyr Cys
            20                  25                  30

<210> SEQ ID NO 129
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 129

Ser Gln Ser Tyr Phe Arg Arg Thr
1               5

<210> SEQ ID NO 130
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 130

Phe Gly Gly Gly Thr Lys Val Glu Ile Lys
1               5                   10

<210> SEQ ID NO 131
<211> LENGTH: 335
<212> TYPE: PRT
<213> ORGANISM: Homo sapiens

<400> SEQUENCE: 131

Gln Asp Gly Asn Glu Glu Met Gly Gly Ile Thr Gln Thr Pro Tyr Lys
1               5                   10                  15

Val Ser Ile Ser Gly Thr Thr Val Ile Leu Thr Cys Pro Gln Tyr Pro
            20                  25                  30

Gly Ser Glu Ile Leu Trp Gln His Asn Asp Lys Asn Ile Gly Gly Asp
        35                  40                  45
```

Glu Asp Asp Lys Asn Ile Gly Ser Asp Glu Asp His Leu Ser Leu Lys
 50                  55                  60

Glu Phe Ser Glu Leu Glu Gln Ser Gly Tyr Tyr Val Cys Tyr Pro Arg
 65                  70                  75                  80

Gly Ser Lys Pro Glu Asp Ala Asn Phe Tyr Leu Tyr Leu Arg Ala Arg
                 85                  90                  95

Val Cys Glu Asn Cys Met Glu Met Asp Gly Ser Asp Lys Thr His
            100                 105                 110

Thr Cys Pro Pro Cys Pro Ala Pro Glu Leu Leu Gly Gly Pro Ser Val
            115                 120                 125

Phe Leu Phe Pro Pro Lys Pro Lys Asp Thr Leu Met Ile Ser Arg Thr
130                 135                 140

Pro Glu Val Thr Cys Val Val Val Asp Val Ser His Glu Asp Pro Glu
145                 150                 155                 160

Val Lys Phe Asn Trp Tyr Val Asp Gly Val Glu Val His Asn Ala Lys
                165                 170                 175

Thr Lys Pro Arg Glu Glu Gln Tyr Ala Ser Thr Tyr Arg Val Val Ser
            180                 185                 190

Val Leu Thr Val Leu His Gln Asp Trp Leu Asn Gly Lys Glu Tyr Lys
            195                 200                 205

Cys Lys Val Ser Asn Lys Ala Leu Pro Ala Pro Ile Glu Lys Thr Ile
210                 215                 220

Ser Lys Ala Lys Gly Gln Pro Arg Glu Pro Gln Val Tyr Thr Leu Pro
225                 230                 235                 240

Pro Ser Arg Asp Glu Leu Thr Lys Asn Gln Val Ser Leu Thr Cys Leu
                245                 250                 255

Val Lys Gly Phe Tyr Pro Ser Asp Ile Ala Val Glu Trp Glu Ser Asn
            260                 265                 270

Gly Gln Pro Glu Asn Asn Tyr Lys Thr Thr Pro Pro Val Leu Asp Ser
            275                 280                 285

Asp Gly Ser Phe Phe Leu Tyr Ser Lys Leu Thr Val Asp Lys Ser Arg
290                 295                 300

Trp Gln Gln Gly Asn Val Phe Ser Cys Ser Val Met His Glu Ala Leu
305                 310                 315                 320

His Asn His Tyr Thr Gln Lys Ser Leu Ser Leu Ser Pro Gly Lys
                325                 330                 335

<210> SEQ ID NO 132
<211> LENGTH: 326
<212> TYPE: PRT
<213> ORGANISM: Cynomolgus

<400> SEQUENCE: 132

Gln Asp Gly Asn Glu Glu Met Gly Ser Ile Thr Gln Thr Pro Tyr Gln
 1               5                   10                  15

Val Ser Ile Ser Gly Thr Thr Val Ile Leu Thr Cys Ser Gln His Leu
                20                  25                  30

Gly Ser Glu Ala Gln Trp Gln His Asn Gly Lys Asn Lys Glu Asp Ser
            35                  40                  45

Gly Asp Arg Leu Phe Leu Pro Glu Phe Ser Glu Met Glu Gln Ser Gly
 50                  55                  60

Tyr Tyr Val Cys Tyr Pro Arg Gly Ser Asn Pro Glu Asp Ala Ser His
 65                  70                  75                  80

His Leu Tyr Leu Lys Ala Arg Val Cys Glu Asn Cys Met Glu Met Asp
                85                  90                  95

Gly Gly Ser Asp Lys Thr His Thr Cys Pro Cys Pro Ala Pro Glu
            100                 105                 110

Leu Leu Gly Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
    130                 135                 140

Val Ser His Glu Asp Pro Glu Val Lys Phe Asn Trp Tyr Val Asp Gly
145                 150                 155                 160

Val Glu Val His Asn Ala Lys Thr Lys Pro Arg Glu Glu Gln Tyr Ala
                165                 170                 175

Ser Thr Tyr Arg Val Val Ser Val Leu Thr Val Leu His Gln Asp Trp
            180                 185                 190

Leu Asn Gly Lys Glu Tyr Lys Cys Lys Val Ser Asn Lys Ala Leu Pro
        195                 200                 205

Ala Pro Ile Glu Lys Thr Ile Ser Lys Ala Lys Gly Gln Pro Arg Glu
    210                 215                 220

Pro Gln Val Tyr Thr Leu Pro Pro Ser Arg Asp Glu Leu Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Val Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Pro Gly Lys
            325

<210> SEQ ID NO 133
<211> LENGTH: 7
<212> TYPE: PRT
<213> ORGANISM: Artificial Sequence
<220> FEATURE:
<223> OTHER INFORMATION: Artificial Sequence: Synthetic peptide
<220> FEATURE:
<221> NAME/KEY: misc_feature
<222> LOCATION: (6)..(6)
<223> OTHER INFORMATION: Xaa can be any naturally occurring amino acid

<400> SEQUENCE: 133

Trp Ala Ser Thr Arg Xaa Ser
1               5

<210> SEQ ID NO 134
<211> LENGTH: 8
<212> TYPE: PRT
<213> ORGANISM: Artificial Sequence
<220> FEATURE:

```
<223> OTHER INFORMATION: Artificial Sequence: Synthetic peptide
<220> FEATURE:
<221> NAME/KEY: misc_feature
<222> LOCATION: (1)..(1)
<223> OTHER INFORMATION: Xaa can be any naturally occurring amino acid

<400> SEQUENCE: 134

Xaa Gln Ser Tyr Phe Arg Arg Thr
1               5
```

HIGH AFFINITY ANTI-CD3 ANTIBODIES, AND METHODS FOR THEIR GENERATION AND USE

RELATED APPLICATIONS

This application is a U.S. Nat'l Phase Appl. submitted under 35 U.S.C. 371 based on Int'l Appl. No. PCT/US2020/036653, filed Jun. 8, 2020, which claims priority to U.S. Provisional Appl. No. 62/858,949, filed on Jun. 7, 2019, all of which are hereby incorporated by reference in their entirety.

SEQUENCE LISTING

The instant application contains a Sequence Listing which has been submitted in ASCII format via EFS-Web and is hereby incorporated by reference in its entirety. Said ASCII copy, created on Dec. 6, 2021, is named "1160430o001801" and is 92,369 bytes in size.

FIELD OF THE INVENTION

The invention relates, inter alia, to anti-Cluster of Differentiation 3 (CD3) antibodies, including multispecific antibodies, and functional fragments thereof, and methods and reagents for their identification, isolation, preparation, and use.

BACKGROUND OF THE INVENTION

Cell proliferative disorders, such as cancer, are characterized by the uncontrolled growth of cell subpopulations. They are the leading cause of death in the developed world and the second leading cause of death in developing countries, with a total number of new cancer cases per year expected to rise to 23.6 million by 2030. The National Cancer Institute estimates that almost 2 million new cases of cancer will be diagnosed in the U.S. and greater than 600,000 Americans will die of cancer in 2018. Cancer care thus represents a significant and ever-increasing societal burden.

The idea of using the cytotoxic capacity of T cells to kill tumor cells through use of CD3 targeting bispecific antibodies dates back to the mid-1980s. (Staerz et al. Nature 1985 314: 628-32). Many bispecific antibodies developed to date contain a first binding site specific to CD3 for T-cell recruitment and activation, and a second binding site for a targeted disease-associated antigen, such as an antigen produced by a tumor cell. CD3 bispecific antibodies trigger the CD3 surface receptor on T cells by binding to their second target protein expressed on tumors such that available T cells can bind to target-expressing cells via bridging by the CD3 bispecific antibody, irrespective of the peptide/MHC specificity of their T-cell receptor. (See, e.g., Bassan, 2012, Blood 120:5094-95). Bridging of T cells and tumor cells using CD3 bispecific antibodies can induce dramatic regression of advanced-stage malignancies and, in some cases, lead to complete remission. Currently, more than 25 different CD3 bispecific antibodies are in clinical development for treatment of hematologic malignancies or solid cancers by targeting CD19, CD20, CD33, and CD123, or EpCAM, HER2, PSMA, and CEA, respectively. (See e.g., Liu et al. Front Immunol 2017 8:38).

While bispecific antibodies have shown considerable benefits over monospecific antibodies for the treatment and the detection of cancer, broad commercial application of bispecific antibodies has been hampered by the lack of efficient/low-cost production methods, the lack of stability of bispecific polypeptides and the lack of long half-lives in humans. A large variety of methods have been developed over the last few decades to produce bispecific monoclonal antibodies. However, many candidate bispecific antibodies with exquisite selectivity and high potency toward the target of interest often have problems in downstream development and clinical efficacy activities, including polyspecific binding (or "polyspecificity"); off-target binding; nonspecific binding; poor expression levels or profiles in eukaryotic host cells, such as mammalian host cells and yeast cells; poor chemical and physical properties, such as poor stability during storage (e.g., poor/low "shelf-life" stability), poor (low) solubility, poor (high) viscosity, propensity to aggregate, and the like; and poor clinical and biophysical profiles, such as poor pharmacokinetic profiles, poor pharmacodynamic profiles, fast or poor in vivo clearance rates, short circulation half-life, some of which result in termination of their development.

Certain techniques and assays exist to assess many of the aforementioned developability characteristics for discovered antibodies in the context of downstream development activities ("post-discovery antibodies"), such as CIC, SIC, BVP-ELISA, TMA, and other assays; however, such assays are typically not amenable to high-throughput formats in early antibody discovery platforms. Furthermore, assessment of these attributes typically requires milligram to gram quantities of protein, thus often imposing a defacto limitation on the number of leads that can be pragmatically considered for development, and consequently reducing the likelihood of program success. Consequently, significant resources are often expended attempting to fix poorly behaving lead candidates with few backups available in later stages of development.

A variety of CD3 antibodies are known in the art, including monoclonal and bispecific antibody formats. See, e.g., U.S. Pat. Nos. 7,262,276; 7,635,472; 7,862,813; 9,587,021; and 10,174,124. However, many of these CD3 antibodies possess developability issues, such as those outlined above, and/or possess insufficiently high binding affinity to CD3 for a particular multispecific format or chimeric antigen receptor (CAR) format or delivery approach or the like. Accordingly, there is an unmet need in the field of bispecific antibodies for anti-CD3 antibodies that display desirable developability profiles and possess high affinity for CD3 for use in cancer treatment.

SUMMARY OF THE INVENTION

The present disclosure relates to anti-CD3 antibodies and methods of using them, which antibodies have particularly high affinity for CD3, e.g., a monovalent $K_D$ of about 250 picomolar or less.

The present disclosure provides an anti-CD3 antibody and/or antigen-binding fragment comprising a complementarity determining region (CDR) in a light chain variable region, CDRL3, wherein the CDRL3 comprises an amino acid sequence of $X_1$QSYFRRT (SEQ ID NO: 1), wherein $X_1$ is K, A, T, or V. In some embodiments, $X_1$ is A, T or V. In certain embodiments, CDRL3 comprises AQSYFRRT (SEQ ID NO: 2); TQSYFRRT (SEQ ID NO: 3); VQSYFRRT (SEQ ID NO: 4); or KQSYFRRT (SEQ ID NO: 5).

In some embodiments, an anti-CD3 antibody and/or antigen-binding fragment further comprises a complementarity determining region (CDR) in a heavy chain variable region, CDRH3, wherein the CDRH3 comprises an amino acid sequence of X₃RDAYGX₄YFYDV (SEQ ID NO: 6), wherein $X_3$ is A or V and $X_4$ is R or Q. In certain embodiments, $X_3$ is A.

In other embodiments, an anti-CD3 antibody and/or antigen-binding fragment further comprise a complementarity determining region (CDR) in a light chain variable region, CDRL1, wherein the CDRL1 comprises an amino acid sequence of KSSQSLLNARTX₅KNYLA (SEQ ID NO: 7), wherein $X_5$ is G, M, N, or R. In certain embodiments, $X_5$ is G or R. In some embodiments, CDRL1 may comprise KSSQSLLNARTGKNYLA (SEQ ID NO: 8) or KSSQSLLNARTRKNYLA (SEQ ID NO: 9).

In some embodiments, an anti-CD3 antibody and/or antigen-binding fragment further comprises a complementarity determining region (CDR) in a light chain variable region, CDRL2, wherein the CDRL2 comprises an amino acid sequence of WASTRES (SEQ ID NO: 10) or WASTRSS (SEQ ID NO: 11).

In some embodiments, an anti-CD3 antibody and/or antigen-binding fragment further comprises a complementarity determining region (CDR) in a heavy chain variable region, CDRH1, wherein the CDRH1 comprises an amino acid sequence of FNX₆KDYYX₇H (SEQ ID NO: 12), wherein $X_6$ is I, N or V and $X_7$ is M or I. In certain embodiments, $X_6$ is I and/or $X_7$ is M. In certain embodiments, CDRH1 comprises FNIKDYYMH (SEQ ID NO: 13).

In some embodiments, an anti-CD3 antibody and/or antigen-binding fragment further comprises a complementarity determining region (CDR) in a heavy chain variable region, CDRH2, wherein CDRH2 comprises an amino acid sequence of WIDLX₈NANTVYDX₉KX₁₀QG (SEQ ID NO: 14), wherein $X_8$ is E or N, $X_9$ is A, H, or T, and $X_{10}$ is F or L. In certain embodiments, $X_8$ is E and/or $X_9$ is A and/or $X_{10}$ is F. In certain embodiments, CDRH2 comprises WIDLENANTVYDAKFQG (SEQ ID NO: 15) or WIDLENANTIYDAKFQG (SEQ ID NO: 16).

In some embodiments, the disclosure provides an anti-CD3 antibody and/or antigen-binding fragment thereof comprising one or more of a CDRL1, a CDRL2, and a CDRL3. Such an antibody, in some embodiments, further comprises a CDRH1, a CDRH2, and a CDRH3.

In some embodiments, anti-CD3 antibodies and/or antigen-binding fragments thereof as described herein comprise a binding affinity ($K_D$) of about 500 pM or less. In some embodiments, anti-CD3 antibodies and/or antigen-binding fragments thereof comprise a binding affinity ($K_D$) of about 250 pM or less. In some embodiments, anti-CD3 antibodies and/or antigen-binding fragments thereof comprise a binding affinity ($K_D$) of about 100 pM or less.

Moreover, the present disclosure generally relates to an anti-cluster of differentiation three ("CD3") antibody or antigen-binding antibody fragment, wherein said anti-CD3 antibody or antigen-binding antibody fragment comprises: a. a variable heavy ($V_H$) chain polypeptide comprising: i. a VH CDR1 (CDRH1) of FNIKDYYMH (SEQ ID NO: 13); ii. a $V_H$ CDR2 (CDRH2) of WIDLENANTVYDAKFQG (SEQ ID NO: 15); iii. a $V_H$ CDR3 (CDRH3) of ARDAYGRYFYDV (SEQ ID NO: 103); and/or b. a variable light ($V_L$) chain polypeptide comprising: i. a $V_L$ CDR1 (CDRL1) of KSSQSLLNARTGKNYLA (SEQ ID NO: 8); ii. a $V_L$ CDR2 (CDRL2) of WASTRX₁S (SEQ ID NO: 133); and iii. a $V_L$ CDR3 (CDRL3) of X₂QSYFRRT (SEQ ID NO: 134); $X_1$ and $X_2$ are each independently any amino acid. In some embodiments, $X_1$ is E or S; and/or $X_2$ is K or V. In some embodiments, said antibody or antigen-binding antibody fragment comprises a CDRL2 of SEQ ID NO: 10 or SEQ ID NO: 11; and/or a CDRL3 of SEQ ID NO: 5 or SEQ ID NO: 4. In some embodiments, said anti-CD3 antibody or antigen-binding antibody fragment is selected from the group consisting of: a. one which comprises a $V_H$ chain CDR1 (CDRH1) of FNIKDYYMH (SEQ ID NO: 13), a $V_H$ chain CDR2 (CDRH2) of WIDLENANTVYDAKFQG (SEQ ID NO: 15), and a $V_H$ chain CDR3 (CDRH3) of ARDAYGRYFYDV (SEQ ID NO: 103); and/or a $V_L$ chain CDR1 (CDRL1) of KSSQSLLNARTGKNYLA (SEQ ID NO: 8), a $V_L$ chain CDR2 (CDRL2) of WASTRES (SEQ ID NO: 10), and a $V_L$ chain CDR3 (CDRL3) of KQSYFRRT (SEQ ID NO: 5); and b. one which comprises a $V_H$ chain CDR1 (CDRH1) of FNIKDYYMH (SEQ ID NO: 13), a $V_H$ chain CDR2 (CDRH2) of WIDLENANTVYDAKFQG (SEQ ID NO: 15), and a $V_H$ chain CDR3 (CDRH3) of ARDAYGRYFYDV (SEQ ID NO: 103); and/or a $V_L$ chain CDR1 (CDRL1) of KSSQSLLNARTGKNYLA (SEQ ID NO: 8), a $V_L$ chain CDR2 (CDRL2) of WASTRSS (SEQ ID NO: 11), and a $V_L$ chain CDR3 (CDRL3) of VQSYFRRT (SEQ ID NO: 4).

In some embodiments, said anti-CD3 antibody or antigen-binding antibody fragment comprises a $V_L$ chain polypeptide comprising an amino acid sequence that possesses at least 90% sequence identity to SEQ ID NO: 18 or SEQ ID NO: 34. In some embodiments, said anti-CD3 antibody or antigen-binding antibody fragment comprises a $V_L$ chain polypeptide comprising an amino acid sequence that possesses at least 95% sequence identity to SEQ ID NO: 18 or SEQ ID NO: 34. In some embodiments, said anti-CD3 antibody or antigen-binding antibody fragment comprises a $V_L$ chain polypeptide comprising the amino acid sequence of SEQ ID NO: 18 or SEQ ID NO: 34. In some embodiments, said anti-CD3 antibody or antigen-binding antibody fragment comprises a $V_H$ chain polypeptide comprising an amino acid sequence that possesses at least 90% sequence identity to SEQ ID NO: 17. In some embodiments, said anti-CD3 antibody or antigen-binding antibody fragment comprises a $V_H$ chain polypeptide comprising an amino acid sequence that possesses at least 95% sequence identity to SEQ ID NO: 17. In some embodiments, said anti-CD3 antibody or antigen-binding antibody fragment comprises a $V_H$ chain comprising the amino acid sequence of SEQ ID NO: 17. In some embodiments, said anti-CD3 antibody or antigen-binding antibody fragment comprises a $V_L$ chain polypeptide comprising an amino acid sequence that possesses at least 90% sequence identity to SEQ ID NO: 18 or SEQ ID NO: 34; and a $V_H$ chain polypeptide comprising an amino acid sequence that possesses at least 90% sequence identity to SEQ ID NO: 17. In some embodiments, said anti-CD3 antibody or antigen-binding antibody fragment comprises a $V_L$ chain polypeptide comprising an amino acid sequence that possesses at least 95% sequence identity to SEQ ID NO: 18 or SEQ ID NO: 34; and a $V_H$ chain polypeptide comprising an amino acid sequence that possesses at least 95% sequence identity to SEQ ID NO: 17. In some embodiments, said anti-CD3 antibody or antigen-binding antibody fragment comprises a $V_L$ chain polypeptide comprising the amino acid sequence of SEQ ID NO: 18 or SEQ ID NO: 34; and a $V_H$ chain comprising the amino acid sequence of SEQ ID NO: 17. In some embodiments, said anti-CD3 antibody or antigen-binding antibody fragment comprises a $V_L$ chain polypeptide comprising the amino acid sequence of SEQ ID NO: 18; and a $V_H$ chain comprising the amino acid sequence of SEQ ID NO: 17. In some embodiments, said anti-CD3 antibody or antigen-binding antibody fragment comprises a $V_L$ chain polypeptide comprising the amino acid sequence of SEQ ID NO: 34; and a $V_H$ chain comprising the amino acid sequence of SEQ ID NO: 17.

In some embodiments, said anti-CD3 antibody or antigen-binding antibody fragment binds to CD3 with a dissociation constant ($K_D$) of about 500 pM or less, about 450 pM or less, about 400 pM or less, about 350 pM or less, about 300 pM or less, about 250 pM or less, about 200 pM or less, about 150 pM or less, or about 100 pM or less, optionally wherein said CD3 is human and/or cynomolgus, further optionally wherein said binding affinity is measured by surface plasmon resonance. In some embodiments, wherein said $K_D$ is a monovalent $K_D$ and/or wherein said $K_D$ is measured using an scFv fragment of said anti-CD3 antibody or antibody fragment.

In some embodiments, said antibody or antigen-binding antibody fragment elicits T cell activation or T cell killing while displaying a decreased propensity to elicit cytokine production to levels capable of inducing cytokine release syndrome. In some embodiments, the antibody or antigen-binding antibody fragment comprises a multispecific antibody. In some embodiments, the antibody or antigen-binding antibody fragment comprises a bispecific antibody. In some embodiments, the antibody or antigen-binding antibody fragment comprises an scFv. In some embodiments, the antibody or antigen-binding antibody fragment comprises at least a second antigen binding domain that specifically binds to an oncology target; an immune-oncology target; a neurodegenerative disease targets; an autoimmune disorder target; an infectious disease target; a metabolic disease target; a cognitive disorder target; a blood-brain barrier target; or a blood disease target. In some embodiments, the antibody or antigen-binding antibody fragment comprises at least a second antigen binding domain that specifically binds to an antigen selected from the group consisting of: 17-IA, 4-1BB, 4Dc, 6-keto-PGFla, 8-iso-PGF2a, 8-oxo-dG, Al Adenosine Receptor, A33, ACE, ACE-2, Activin, Activin A, Activin AB, Activin B, Activin C, Activin RIA, Activin RIA ALK-2, Activin RIB ALK-4, Activin RIIA, Activin RUB, ADAM, ADAM10, ADAM12, ADAM 15, ADAM 17/T ACE, ADAM8, ADAM9, ADAMTS, ADAMTS4, ADAMTS5, Addressins, aFGF, ALCAM, ALK, ALK-1, ALK-7, alpha-l-antitrypsin, alpha-V/beta-1 antagonist, ANG, Ang, APAF-1, APE, APJ, APP, APRIL, AR, ARC, ART, Artemin, anti-Id, ASPARTIC, Atrial natriuretic factor, av/b3 integrin, Axl, b2M, B7-1, B7-2, B7-H, B-lymphocyte Stimulator (BlyS), BACE, BACE-1, Bad, BAFF, BAFF-R, Bag-1, BAK, Bax, BCA-1, BCAM, Bel, BCMA, BDNF, b-ECGF, bFGF, BID, Bik, BFM, BLC, BL-CAM, BLK, BMP, BMP-2 BMP-2a, BMP-3 Osteogenin, BMP-4 BMP-2b, BMP-5, BMP-6 Vgr-1, BMP-7 (OP-1), BMP-8 (BMP-8a, OP-2), BMPR, BMPR-IA (ALK-3), BMPR-IB (ALK-6), BRK-2, RPK-1, BMPR-II (BRK-3), BMPs, b-NGF, BOK, Bombesin, Bone-derived neurotrophic factor, BPDE, BPDE-DNA, BTC, complement factor 3 (C3), C3a, C4, C5, C5a, CIO, CA125, CAD-8, Calcitonin, cAMP, carcinoembryonic antigen (CEA), carcinoma-associated antigen, Cathepsin A, Cathepsin B, Cathepsin C/DPPI, Cathepsin D, Cathepsin E, Cathepsin H, Cathepsin L, Cathepsin O, Cathepsin S, Cathepsin V, Cathepsin X/Z/P, CBL, CCI, CCK2, CCL, CCL1, CCL11, CCL12, CCL13, CCL 14, CCL15, CCL16, CCL1 7, CCL18, CCL19, CCL2, CCL20, CCL21, CCL22, CCL23, CCL24, CCL25, CCL26, CCL27, CCL28, CCL3, CCL4, CCL5, CCL6, CCL7, CCL8, CCL9/10, CCR, CCR1, CCR10, CCR10, CCR2, CCR3, CCR4, CCR5, CCR6, CCR7, CCR8, CCR9, CD1, CD2, CD4, CD5, CD6, CD7, CD8, CD10, CDlla, CDllb, CDllc, CD13, CD14, CD15, CD16, CD18, CD19, CD20, CD21, CD22, CD23, CD25, CD27L, CD28, CD29, CD30, CD30L, CD32, CD33 (p67 proteins), CD34, CD38, CD40, CD40L, CD44, CD45, CD46, CD49a, CD52, CD54, CD55, CD56, CD61, CD64, CD66e, CD74, CD80 (B7-1), CD89, CD95, CD123, CD137, CD138, CD140a, CD146, CD147, CD148, CD152, CD164, CEACAM5, CFTR, cGMP, CINC, *Clostridium botulinum* toxin, *Clostridium perfringens* toxin, CKb8-1, CLC, CMV, CMV UL, CNTF, CNTN-1, COX, C-Ret, CRG-2, CT-1, CTACK, CTGF, CTLA-4, CX3CL1, CX3CR1, CXCL, CXCL1, CXCL2, CXCL3, CXCL4, CXCL5, CXCL6, CXCL7, CXCL8, CXCL9, CXCL10, CXCL11, CXCL12, CXCL13, CXCL14, CXCL15, CXCL16, CXCR, CXCR1, CXCR2, CXCR3, CXCR4, CXCR5, CXCR6, cytokeratin tumor-associated antigen, DAN, DCC, DcR3, DC-SIGN, Decay accelerating factor, des(1-3)-IGF-I (brain IGF-1), Dhh, digoxin, DNAM-1, Dnase, Dpp, DPPIV/CD26, Dtk, ECAD, EDA, EDA-A1, EDA-A2, EDAR, EGF, EGFR (ErbB-1), EMA, EMMPRIN, EN A, endothelin receptor, Enkephalinase, eNOS, Eot, eotaxinl, EpCAM, Ephrin B2/EphB4, EPO, ERCC, E-selectin, ET-1, Factor IIa, Factor VII, Factor VIIIc, Factor IX, fibroblast activation protein (FAP), Fas, FcRl, FEN-1, Ferritin, FGF, FGF-19, FGF-2, FGF3, FGF-8, FGFR, FGFR-3, Fibrin, FL, FLIP, Flt-3, Flt-4, Follicle stimulating hormone, Fractalkine, FZD1, FZD2, FZD3, FZD4, FZD5, FZD6, FZD7, FZD8, FZD9, FZD10, G250, Gas 6, GCP-2, GCSF, GD2, GD3, GDF, GDF-1, GDF-3 (Vgr-2), GDF-5 (BMP-14, CDMP-1), GDF-6 (BMP-13, CDMP-2), GDF-7 (BMP-12, CDMP-3), GDF-8 (Myostatin), GDF-9, GDF-15 (MIC-1), GDNF, GFAP, GFRa-1, GFR-alphal, GFR-alpha2, GFR-alpha3, GITR, Glucagon, Glut 4, glycoprotein IIb/IIIa (GP IIb/IIIa), GM-CSF, gpl30, gp72, GRO, Growth hormone releasing factor, Hapten (NP-cap or NIP-cap), HB-EGF, HCC, HCMV gB envelope glycoprotein, HCMV) gH envelope glycoprotein, HCMV UL, Hemopoietic growth factor (HGF), Hep B gpl20, heparanase, Her2, Her2/neu (ErbB-2), Her3 (ErbB-3), Her4 (ErbB-4), herpes simplex virus (HSV) gB glycoprotein, HSV gD glycoprotein, HGFA, High molecular weight melanoma-associated antigen (HMW-MAA), HIV gpl20, HIV IIIB gp 120 V3 loop, HLA, HLA-DR, HM1.24, HMFG PEM, HRG, Hrk, human cardiac myosin, human cytomegalovirus (HCMV), human growth hormone (HGH), HVEM, 1-309, IAP, ICAM, ICAM-1, ICAM-3, ICE, ICOS, IFNg, Ig, IgA receptor, IgE, IGF, IGF binding proteins, IGF-1R, IGFBP, IGF-I, IGF-II, IL, IL-1, IL-1R, IL-2, IL-2R, IL-4, IL-4R, IL-5, IL-5R, IL-6, IL-6R, IL-8, IL-9, IL-10, IL-12, IL-13, IL-15, IL-18, IL-18R, IL-23, interferon (INF)-alpha, INF-beta, INF-gamma, Inhibin, iNOS, Insulin A-chain, Insulin B-chain, Insulin-like growth factor 1, integrin alpha2, integrin alpha3, integrin alpha4, integrin alpha4/betal, integrin, alpha4/beta7, integrin alpha5 (alphaV), integrin alpha5/betal, integrin alpha5/beta3, integrin alpha6, integrin betal, integrin beta2, interferon gamma, IP-10, 1-TAC, JE, Kallikrein 2, Kallikrein 5, Kallikrein 6, Kallikrein 11, Kallikrein 12, Kallikrein 14, Kallikrein 15, Kallikrein LI, Kallikrein L2, Kallikrein L3, Kallikrein L4, KC, KDR, Keratinocyte Growth Factor (KGF), laminin 5, LAMP, LAP, LAP (TGF-1), Latent TGF-1, Latent TGF-1 bpl, LBP, LDGF, LECT2, Lefty, Lewis-Y antigen, Lewis-Y related antigen, LFA-1, LFA-3, Lfo, LIF, LIGHT, lipoproteins, LIX, LKN, Lptn, L-Selectin, LT-a, LT-b, LTB4, LTBP-1, Lung surfactant, Luteinizing hormone, Lymphotoxin Beta Receptor, Mac-1, MAdCAM, MAG, MAP2, MARC, MCAM, MCAM, MCK-2, MCP, M-CSF, MDC, Mer, a metalloprotease, MGDF receptor, MGMT, MHC (HLA- DR), MIF, MIG, MIP, MIP-1-alpha, MK, MMAC1, MMP, MMP-1, MMP-10, MMP-11, MMP-12, MMP-13, MMP-14, MMP-15, MMP-2, MMP-24, MMP-3, MMP-7, MMP-8, MMP-9, MPIF, Mpo, MSK, MSP, mucin (Mucl), MUC18, Muellerian-inhibiting substance, Mug, MuSK, NAIP, NAP, NCAD, N-Cadherin, NCA 90, NCAM, NCAM, Neprilysin, Neurotrophin-3, -4, or -6, Neurturin, Neuronal growth factor (NGF), NGFR, NGF-beta, nNOS, NO, NOS, Npn, NRG-3, NT, NTN, OB, OGG1, OPG, OPN, OSM, OX40L, OX40R, p150, p95, PADPr, Parathyroid hormone, PARC, PARP, PBR, PBSF, PCAD, P-Cadherin, PCNA, PDGF, PDGF, PDK-1, PECAM, PEM, PF4, PGE, PGF, PGI2, PGJ2, PIN, PLA2, placental alkaline phosphatase (PLAP), PlGF, PLP, PP14, Proinsulin, Prorelaxin, Protein C, PS, PSA, PSCA, prostate specific membrane antigen (PSMA), PTEN, PTHrp, Ptk, PTN, R51, RANK, RANKL, RANTES, Relaxin A-chain, Relaxin B-chain, renin, respiratory syncytial virus (RSV) F, RSV Fgp, Ret, Rheumatoid factors, RLIP76, RPA2, RSK, S100, SCF/KL, SDF-1, SERINE, Serum albumin, sFRP-3, Shh, SIGIRR, SK-1, SLAM, SLPI, SMAC, SMDF, SMOH, SOD, SPARC, Stat, STEAP, STEAP-II, TACE, TACI, TAG-72 (tumor-associated glycoprotein-72), TARC, TCA-3, T-cell receptors (e.g., T-cell receptor alpha/beta), TdT, TECK, TEM1, TEM5, TEM7, TEM8, TERT, testicular PLAP-like alkaline phosphatase, TfR, TGF, TGF-alpha, TGF-beta, TGF-beta Pan Specific, TGF-beta RI (ALK-5), TGF-beta RII, TGF-beta Rllb, TGF-beta RIII, TGF-betal, TGF-beta2, TGF-beta3, TGF-beta4, TGF-beta5, Thrombin, Thymus Ck-1, Thyroid stimulating hormone, Tie, TIMP, TIQ, Tissue Factor, TMEFF2, Tmpo, TMPRSS2, TNF, TNF-alpha, TNF-alpha beta, TNF-beta2, TNFc, TNF-RI, TNF-RII, TNFRSF10A (TRAIL Rl Apo-2, DR4), TNFRSFIOB (TRAIL R2 DR5, KILLER, TRICK-2A, TRICK-B), TNFRSF10C (TRAIL R3 DcRl, LIT, TRID), TNFRSF10D (TRAIL R4 DcR2, TRUNDD), TNFRSF11A (RANK ODF R, TRANCE R), TNFRSFllB (OPG OCIF, TR1), TNFRSF12 (TWEAK R FN14), TNFRSF13B (TACI), TNFRSF13C (BAFF R), TNFRSF14 (HVEM ATAR, HveA, LIGHT R, TR2), TNFRSF16 (NGFR p75NTR), TNFRSF17 (BCMA), TNFRSF 18 (GITR AITR), TNFRSF19 (TROY TAJ, TRADE), TNFRSF19L (RELT), TNFRSFIA (TNF RI CD120a, p55-60), TNFRSFIB (TNF RII CD120b, p75-80), TNFRSF26 (TNFRH3), TNFRSF3 (LTbR TNF RIII, TNFC R), TNFRSF4 (OX40 ACT35, TXGP1 R), TNFRSF 5 (CD40 p50), TNFRSF6 (Fas Apo-1, APT1, CD95), TNFRSF6B (DcR3 M68, TR6), TNFRSF7 (CD27), TNFRSF8 (CD30), TNFRSF9 (4-1BB CD137, ILA), TNFRSF21 (DR6), TNFRSF22 (DcTRAIL R2 TNFRH2), TNFRST23 (DcTRAIL R1 TNFRH1), TNFRSF25 (DR3 Apo-3, LARD, TR-3, TRAMP, WSL-1), TNFSF10 (TRAIL Apo-2 Ligand, TL2), TNFSF11 (TRANCE/RANK Ligand ODF, OPG Ligand), TNFSF12 (TWEAK Apo-3 Ligand, DR3 Ligand), TNFSF13 (APRIL TALL2), TNFSF13B (BAFF BLYS, TALL1, THANK, TNFSF20), TNFSF14 (LIGHT HVEM Ligand, LTg), TNFSF15 (TLIA/VEGI), TNFSF18 (GITR Ligand AITR Ligand, TL6), TNFSFIA (TNF-a Conectin, DIF, TNFSF2), TNFSF1B (TNF-b LTa, TNFSF1), TNFSF3 (LTb TNFC, p33), TNFSF4 (OX40 Ligand gp34, TXGP1), TNFSF5 (CD40 Ligand CD154, gp39, HIGM1, IMD3, TRAP), TNFSF6 (Fas Ligand Apo-1 Ligand, APT1 Ligand), TNFSF7 (CD27 Ligand CD70), TNFSF8 (CD30 Ligand CD153), TNFSF9 (4-1BB Ligand CD137 Ligand), TP-1, t-PA, Tpo, TRAIL, TRAIL R, TRAIL-R1, TRAIL-R2, TRANCE, transferring receptor, TRF, Trk, TROP-2, TSG, TSLP, tumor-associated antigen CA 125, tumor-associated antigen expressing Lewis Y related carbohydrate, TWEAK, TXB2, Ung, uPAR, uPAR-1, Urokinase, VCAM, VCAM-1, VECAD, VE-Cadherin, VE-cadherin-2, VEFGR-1 (fit-1), VEGF, VEGFR, VEGFR-3 (fit-4), VEGI, VFM, Viral antigens, VLA, VLA-1, VLA-4, VNR integrin, von Willebrands factor, WIF-1, WNT1, WNT2, WNT2B/13, WNT3, WNT3A, WNT4, WNT5A, WNT5B, WNT6, WNT7A, WNT7B, WNT8A, WNT8B, WNT9A, WNT9A, WNT9B, WNT10A, WNT10B, WNT11, WNT16, XCL1, XCL2, XCR1, XCR1, XEDAR, XIAP, XPD, CTLA4 (cytotoxic T lymphocyte antigen-4), PD1 (programmed cell death protein 1), PD-L1 (programmed cell death ligand 1), LAG-3 (lymphocyte activation gene-3), TIM-3 (T cell immunoglobulin and mucin protein-3), hormone receptors and growth factors.

In some embodiments, the antibody or antigen-binding antibody fragment comprises at least a second antigen binding domain that specifically binds to an antigen selected from the group consisting of: BCMA, CTLA4 (cytotoxic T lymphocyte antigen-4), PD1 (programmed cell death protein 1), PD-L1 (programmed cell death ligand 1), LAG-3 (lymphocyte activation gene-3), TIM-3, CD20, CD2, CD19, Her2, EGFR, EpCAM, FcyRIIIa (CD16), FcyRIIa (CD32a), FcyRIIb (CD32b), FcyRI (CD64), Toll-like receptors (TLRs), TLR4, TLR9, cytokines, IL-2, IL-5, IL-13, IL-6, IL-17, IL-12, IL-23, TNFa, TGFb, cytokine receptors, IL-2R, chemokines, chemokine receptors, growth factors, VEGF, and HGF. In some embodiments, the antibody or antigen-binding antibody fragment is comprised in a chimeric antigen receptor (CAR), which optionally comprises at least one transmembrane domain, and at least one intracellular domain from a T-cell receptor, optionally a CD3subunit, and at least one co-stimulatory domain. In some embodiments, the antibody or antigen-binding antibody fragment comprises an scFv2-Fc2 and/or scFv-IgG. In some embodiments, the antibody or antigen-binding antibody fragment comprises an IgG constant domain. In some embodiments, k. the antibody or antigen-binding antibody fragment comprises at least a second antigen binding domain that specifically binds to an antigen, wherein said antibody comprises a multispecific format selected from the group consisting of: Fab-Fc-scFv, "bottle-opener, Mab-scFv, Mab-Fv, Dual scFv, central Fv, central scFv, one-arm central scFv, Fab-Fab, Fab-Fv, mAb-Fv, mAb-Fab, DART, BiTE, common light chain-IgG, TandAb, Cross-Mab, SEED, BEAT, TrioMab, and DuetMab. Moreover, the present disclosure generally relates to an isolated or recombinant nucleic acid sequence encoding an antibody or antigen-binding antibody fragment as described herein. Furthermore, the present disclosure generally relates to an expression vector comprising an isolated or recombinant nucleic acid sequence as described herein. Furthermore, the present disclosure generally relates to a host cell transfected, transformed, or transduced with a nucleic acid sequence, optionally a mammalian or yeast cell, or a vector containing said nucleic acid sequence as described herein.

Moreover, the present disclosure generally relates to a pharmaceutical composition comprising an antibody or antigen-binding antibody fragment as described herein; and a pharmaceutically acceptable carrier and/or excipient.

Furthermore, the present disclosure generally relates to a method of treating a disorder in a mammal in need of such treatment, wherein the disorder comprises a proliferative disorder, an oncological disorder, an immuno-oncological disorder, a neurological disorder, a neurodegenerative disorder, or an autoimmune disorder, comprising administering an effective amount of one or more antibodies or antibody fragments as described herein, or a host cell which expresses one of said antibodies or antibody fragments as described herein, optionally an immune cell, further optionally a T or NK cell. In some embodiments, the method further comprises administering to the mammal an additional therapeutic agent, optionally wherein the mammal is a human.

Moreover, the present disclosure generally relates to an anti-cluster of differentiation three ("CD3") antibody or antibody fragment, wherein said anti-CD3 antibody or antigen-binding antibody fragment comprises one or more CDRs of any one or more of Ab1-Ab50. Furthermore, the present disclosure generally relates to an anti-cluster of differentiation three ("CD3") antibody or antibody fragment, wherein said anti-CD3 antibody or antigen-binding antibody fragment comprises one or more $V_H$ and/or $V_L$ chains comprising an amino acid sequence selected from those in Table 4.

DETAILED DESCRIPTION OF THE INVENTION

Unless defined otherwise, all technical and scientific terms used herein have the same meaning as commonly understood by one of ordinary skill in the art to which this invention belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.).

It is understood that aspects and embodiments of the invention described herein include "comprising," "consisting," and "consisting essentially of" aspects and embodiments.

Provided herein are anti-CD3 antibodies and/or antigen-binding fragments thereof having high affinity ($K_D$) for CD3. In some embodiments, the $K_D$ of the anti-CD3 is about 500 pM or less. In some embodiments, the $K_D$ is about 250 pM or less. In some embodiments, the $K_D$ is about 100 pM or less. In some embodiments, said anti-CD3 antibody or antigen-binding antibody fragment binds to CD3 with a dissociation constant ($K_D$) of about 500 pM or more, about 500 pM or less, about 470 pM or less, about 450 pM or less, about 400 pM or less, about 350 pM or less, about 300 pM or less, about 250 pM or less, about 200 pM or less, about 150 pM or less, or about 100 pM or less, optionally wherein said CD3 is human and/or cynomolgus, further optionally wherein said binding affinity is measured by surface plasmon resonance. In some embodiments, said $K_D$ is a monovalent $K_D$ and/or wherein said $K_D$ is measured using an scFv fragment of said anti-CD3 antibody or antibody fragment. In some embodiments, the anti-CD3 antibodies and/or antigen binding fragments thereof comprise certain CDR sequence motifs. In some embodiments, a CDR sequence motif comprises CDRL3 comprising SEQ ID NO: 1. In some embodiments, the anti-CD3 antibodies have favorable developability profiles.

Exemplary High Affinity Anti-CD3 Antibodies and Antigen-Binding Fragments Thereof "Cluster of Differentiation 3" or "CD3", generally refers to any native CD3 from any vertebrate source, including mammals such as primates (e.g., humans) and rodents (e.g., mice and rats), unless otherwise indicated, including, for example, CD3ε, CD3γ, CD3α, and CD3β chains. The term encompasses "full-length," unprocessed CD3 (e.g., unprocessed or unmodified CD3ε or CD3γ), as well as any form of CD3 that results from processing in the cell. The term also encompasses naturally occurring variants of CD3, including, for example, splice variants or allelic variants. CD3 includes, for example, human CD3ε protein (NCBI RefSeq No. NP-000724), which is 207 amino acids in length, and human CD3γ protein (NCBI RefSeq No. NP-000064), which is 182 amino acids in length. The term also refers to either the human or cynomolgus CD3epsilon protein, the amino acid sequence for which is SEQ ID NOs: 131 and 132, respectively (Table 7). "CD3εN27" and "CD3εN13" refer to the N-terminal 27 amino acids and the N-terminal 13 amino acids, respectively, of CD3, and optionally containing chemical modifications or conjugations made thereto.

An "anti-CD3 antibody" refers to an antibody or an antigen-binding fragment thereof capable of binding to CD3, e.g., CD3ε and/or CD3γ, e.g., human CD3ε and/or CD3γ, with sufficient affinity and/or specificity such that the antibody is useful as a diagnostic and/or therapeutic agent in targeting CD3. The anti-CD3 antibodies and antigen-binding fragments thereof described herein have particularly high affinity for CD3.

The term "high affinity" refers to those antibodies having a binding affinity to CD3, expressed as $K_D$. In some embodiments, the $K_D$ is about $5 \times 10^{-10}$ M or less. In some embodiments, the $K_D$ is about $2.5 \times 10^{-10}$ M or less. In some embodiments, the $K_D$ is about $1 \times 10^{-11}$ M or less. In some embodiments, said anti-CD3 antibody or antigen-binding antibody fragment binds to CD3 with a dissociation constant ($K_D$) of about 500 pM or more, about 500 pM or less, about 470 pM or less, about 450 pM or less, about 400 pM or less, about 350 pM or less, about 300 pM or less, about 250 pM or less, about 200 pM or less, about 150 pM or less, or about 100 pM or less, optionally wherein said CD3 is human and/or cynomolgus, further optionally wherein said binding affinity is measured by surface plasmon resonance. In some embodiments, the $K_D$ is measured by surface plasmon resonance, e.g., BIACORE® biomolecule analyzer, biolayer interferometry measurements using, e.g., a FORTEBIO® biomolecule analyzer OCTET® HTX instrument (Pall Life Sciences), or solution-affinity ELISA. In some embodiments, the $K_D$ is measured using an scFv fragment of the anti-CD3 antibody. In some embodiments, the monovalent $K_D$ is measured.

In some embodiments, an anti-CD3 antibody binds to CD3 with a dissociation constant ($K_D$) of less than about 500 pM ($5 \times 10^{-10}$ M). In some embodiments, an anti-CD3 antibody binds to CD3 with a dissociation constant ($K_D$) of less than about 250 pM. In some embodiments, an anti-CD3 antibody binds to CD3 with a dissociation constant ($K_D$) of about 100 pM. In certain embodiments, the anti-CD3 antibody binds to an epitope of CD3 that is conserved among CD3 from different species, e.g., human and cyno cross-reactive.

The $K_D$ can be measured using assays well-known to a skilled artisan, including, but not limited to: biolayer interferometry (BLI), surface plasmon resonance (SPR), solution equilibrium based kinetic exclusion assays, KinExA direct association, assays using FORTEBIO® instruments and reagents, such as Octet® RED 384 and HTX BLI-based instruments, enzyme-linked immunosorbent assays (ELISA), or radioimmunoassay (RIA). The $K_D$ measurement may be performed with an intact anti-CD3 antibody or an antigen-binding fragment thereof, e.g., scFv, using a BIACORE® surface plasmon resonance assay.

While high affinity CD3 binders have been associated with triggering or contributing to cytokine release syndrome (CRS) in patients, the binding affinity of an antibody for CD3 is not the sole determinant of CRS. For example, a high affinity anti-CD3 antibody (~low single digit nM $K_D$) used in a bispecific format, successfully demonstrated potent T-cell cytotoxicity for target tumor cells with limited cytokine (IFNγ, IL-6, TNFα) release (See, e.g., *Mol Cancer Ther.* 2016 September; 15(9); 2155-65 and APTEVO AACR Poster regarding preclinical studies of APOV436, presented Apr. 16, 2018). Without being bound by theory, a high affinity anti-CD3 antibody may be particularly beneficial for providing specific targeting and minimal CRS risk in multispecific antibodies with certain formats, e.g., scFv2-Fc2 or scFv-IgG or other like polymeric formats) or chimeric antigen receptors with various components assembled in different orders.

The term "cytokine release syndrome" (or "CRS") refers to a pro-inflammatory, positive feedback loop between cytokines and immune cells leading to excessive or uncontrolled release of pro-inflammatory cytokines by cells within the immune system (see, e.g., Lee et al., Blood, Vol. 124, pages 188-195 (2014) and Tisoncik et al., Microbiol Mol Biol Rev, Vol. 76, pages 16-32 (2012). Upon stimulation and activation, T cells release a series of cytokines to a level and degree that generates untoward biological/physiological effects of varying degree and severity, including acute inflammation characterized by, e.g., rubor (redness), swelling or edema, calor (heat), dolor (pain), and "functio laesa" (loss of function). When localized in skin or other tissue, biological/physiological effects comprise increased blood flow, enabling vascular leukocytes and plasma proteins to reach extravascular sites of injury, increasing local temperatures and generation of pain, tissue edema and extravascular pressure and a reduction in tissue perfusion. Other biological/physiological effects comprise organ and system dysfunction, such as cardiac dysfunction, adult respiratory distress syndrome, neurologic toxicity, renal and/or hepatic failure, and disseminated intravascular coagulation. Elevated levels of IFNγ, IL-6, TNFα, TGFbeta, IL-2, granulocyte macrophage-colony-stimulating factor (GM-CSF), IL-10, IL-8, IL-5, and/or fractalkine are implicated as predictive and/or causative of CRS or the propensity to elicit CRS upon T-cell stimulation.

In certain embodiments, the anti-CD3 antibodies and/or antigen-binding fragments thereof described herein are detuned and/or modified to reduce the likelihood or severity of CRS induced by the antibody. Non-limiting exemplary modifications may include silent Fc regions (e.g., removing the Fc completely or modifying the Fc region to reduce or eliminate effector function), and/or masking (e.g., a polypeptide mask that is positioned such that it reduces or inhibits the ability of the antibody or antigen-binding fragment thereof to specifically bind CD3).

The term "antibody" is used herein in the broadest sense and encompasses various antibody structures, including but not limited to monoclonal antibodies, polyclonal antibodies, multispecific antibodies (e.g., bispecific antibodies), and/or antibody fragments (preferably those fragments that exhibit the desired antigen-binding activity).

A "monoclonal antibody" or "mAb" refers to an antibody obtained from a population of substantially homogeneous antibodies, i.e., the individual antibodies comprising the population are identical and/or bind the same epitope, except for possible variant antibodies (e.g., containing naturally occurring mutations or arising during production of a monoclonal antibody preparation), such variants generally being present in minor amounts. In contrast to polyclonal antibody preparations, which typically include different antibodies directed against different determinants (epitopes), each monoclonal antibody of a monoclonal antibody preparation is directed against a single determinant on an antigen.

With regard to multispecific antibodies, such antibodies comprise at least two different antigen binding domains which recognize and specifically bind to at least two different antigens. With regard to bispecific antibodies, such antibodies comprise two different antigen binding domains which recognize and specifically bind to at least two different antigens. A "different antigen" may refer to different and/or distinct proteins, polypeptides, or molecules; as well as different and/or distinct epitopes, which epitopes may be contained within one protein, polypeptide, or other molecule.

The term "epitope" refers to an antigenic determinant that interacts with a specific antigen binding site in the variable region of an antibody molecule known as a paratope. A single antigen may have more than one epitope. Thus, different antibodies may bind to different areas on an antigen and may have different biological effects. The term "epitope" also refers to a site on an antigen to which B and/or T cells respond. It also refers to a region of an antigen that is bound by an antibody. Epitopes may be defined as structural or functional. Functional epitopes are generally a subset of the structural epitopes and have those residues that directly contribute to the affinity of the interaction. Epitopes may also be conformational, that is, composed of non-linear amino acids. In certain embodiments, epitopes may include determinants that are chemically active surface groupings of molecules such as amino acids, sugar side chains, phosphoryl groups, or sulfonyl groups, and, in certain embodiments, may have specific three-dimensional structural characteristics, and/or specific charge characteristics.

In some instances, an antibody comprises four polypeptide chains: two heavy (H) chains and two light (L) chains interconnected by disulfide bonds. There are five major classes of antibodies: IgA, IgD, IgE, IgG, and IgM, and several of these may be further divided into subclasses (isotypes), e.g., $IgG_1$, $IgG_2$, $IgG_3$, $IgG_4$, $IgA_1$, and $IgA_2$. The heavy chain constant domains that correspond to the different classes of immunoglobulins are called α, δ, ε, γ, and μ, respectively.

In other instances, an antibody may instead comprise multimers thereof (e.g., IgM) or antigen-binding fragments thereof. Each heavy chain is comprised of a heavy chain variable region ("$V_H$") and a heavy chain constant region ("CH"), which is comprised of domains $C_H1$, $C_H2$ and $C_H3$. Each light chain is comprised of a light chain variable region ("$V_L$") and a light chain constant region ("CL"). The $V_H$ and $V_L$ regions can be further subdivided into regions of hypervariability, termed complementarity determining regions (CDRs), interspersed with regions that are more conserved, termed framework regions (FRs). Each $V_H$ and $V_L$ is composed of three CDRs and four FRs, arranged from amino-terminus to carboxy-terminus in the following order: FR1, CDR1, FR2, CDR2, FR3, CDR3, FR4. In certain embodiments of the invention, the FRs of the antibody (or antigen-binding fragment thereof) may be identical to the human germline sequences or may be naturally or artificially modified. An amino acid consensus sequence may be defined based on a side-by-side analysis of two or more CDRs. Accordingly, the CDRs in a heavy chain are designated "CDRH1", "CDRH2", and "CDRH3", respectively, and the CDRs in a light chain are designated "CDRL1", "CDRL2", and "CDRL3".

Unless specifically indicated otherwise, the term "antibody" as used herein encompasses molecules comprising two immunoglobulin heavy chains and two immunoglobulin light chains (i.e., "full antibody molecules" or "intact antibodies") as well as antigen-binding fragments thereof.

An "antigen-binding fragment" refers to a portion of an intact antibody that binds the antigen to which the intact antibody binds (in this case, CD3). The terms "full-length antibody," "intact antibody," and "whole antibody" or the like are used herein interchangeably and refer to an antibody having a structure substantially similar to a native antibody.

An antigen-binding fragment of an antibody includes any naturally occurring, enzymatically obtainable, synthetic, or genetically engineered polypeptide or glycoprotein that specifically binds an antigen to form a complex. Exemplary antibody fragments include, but are not limited to, Fv, Fab, Fab', Fab'-SH, F(ab')$_2$; diabodies; linear antibodies; single-chain antibody molecules (e.g. scFv or V$_H$ or V$_L$ domains only); and multispecific antibodies formed from antibody fragments. In some embodiments, the antigen-binding fragments of the anti-CD3 antibodies described herein are scFvs.

As with full antibody molecules, antigen-binding fragments may be mono-specific or multispecific (e.g., bispecific). A multi-specific antigen-binding fragment of an antibody may comprise at least two different variable domains, wherein each variable domain is capable of specifically binding to a separate antigen or to a different epitope on the same antigen. A variety of multi-specific antibody formats may be used in the context of an antigen-binding fragment of anti-CD3 antibody described herein. Non-limiting examples of multispecific and bispecific formats include, e.g., Fab-Fc-scFv ("bottle-opener") (XENCOR), Mab-scFv (XENCOR), Mab-Fv (XENCOR), Dual scFv (XENCOR), central Fv (XENCOR), central scFv (XENCOR), one-arm central scFv (XENCOR), Fab-Fab (XENCOR), Fab-Fv (XENCOR), mAb-Fv (XENCOR), mAb-Fab (XENCOR), DART® (MACROGENICS), BiTE® (AMGEN/MICROMET), KiTE®, common light chain-IgG (Genentech), TandAb™ (SFFIMED) Cross-Mab™ (ROCHE), SEED™ (EMD SERONO), BEAT™ (GLENMARK), TrioMab™ (TRION PHARMA/FRESENIUS BIOTECH), DuetMab™ (MEDIMMUNE), and others, as disclosed, e.g., in (WO 95/09917; WO 2008/119566; WO 2008/119567; WO2011/121110; WO 2010/037835; WO 2007/042261; WO 2007/110205; WO 2011/121110; WO 2012/055961; WO 2012/16067; WO 2016/086189; WO 2016/182751; WO 2015/006749; WO 2014/049003; WO 2013/177101; WO 2015/128509; U.S. Pat. No. 7,951,917; US 2009/0252729; US 2014/0348839; U.S. Pat. No. 7,183,076; Mazor et al., *Mabs*, Vol. 7, pages 377-389 (2015); Muda et al., *Protein Engineering, Design, & Selection*, Vol. 24, pages 447-454 (2011); and Del Bano et al., *Antibodies*, Vol. 5, pages 1-23 (2016). In some embodiments, the anti-CD3 scFv fragments described herein comprise one or more variable domains of a multispecific (e.g., bispecific) antibody.

In certain embodiments, anti-CD3 antibodies and/or antigen-binding fragments thereof as described herein are contained in a multispecific antibody, in particular, a bispecific antibody that has binding specificity for a second antigen. Such a second antigen may be a different target altogether than the first target, or a different epitope present on the same target. In some embodiments, the binding specificities are to two different epitopes of CD3 (e.g., CD3ε or CD3γ). In other embodiments, one of the binding specificities is for CD3 (e.g., CD3ε or CD3γ) and the other is for a different biological molecule (e.g., a cell surface antigen, e.g., a tumor antigen).

Non-limiting examples of a second antigen, toward which a bispecific antibody comprising anti-CD3 antibodies and/or antigen-binding fragments thereof as described herein, comprises targets selected from the group consisting of: 17-IA, 4-1BB, 4Dc, 6-keto-PGFla, 8-iso-PGF2a, 8-oxo-dG, Al Adenosine Receptor, A33, ACE, ACE-2, Activin, Activin A, Activin AB, Activin B, Activin C, Activin RIA, Activin RIA ALK-2, Activin RIB ALK-4, Activin RIIA, Activin RUB, ADAM, ADAM10, ADAM12, ADAM15, ADAM17/TACE, ADAM8, ADAM9, ADAMTS, ADAMTS4, ADAMTS5, Addressins, aFGF, ALCAM, ALK, ALK-1, ALK-7, alpha-l-antitrypsin, alpha-V/beta-1 antagonist, ANG, Ang, APAF-1, APE, APJ, APP, APRIL, AR, ARC, ART, Artemin, anti-Id, ASPARTIC, Atrial natriuretic factor, av/b3 integrin, Axl, b2M, B7-1, B7-2, B7-H, B-lymphocyte Stimulator (BlyS), BACE, BACE-1, Bad, BAFF, BAFF-R, Bag-1, BAK, Bax, BCA-1, BCAM, Bel, BCMA, BDNF, b-ECGF, bFGF, BID, Bik, BIM, BLC, BL-CAM, BLK, BMP, BMP-2 BMP-2a, BMP-3 Osteogenin, BMP-4 BMP-2b, BMP-5, BMP-6 Vgr-1, BMP-7 (OP-1), BMP-8 (BMP-8a, OP-2), BMPR, BMPR-IA (ALK-3), BMPR-IB (ALK-6), BRK-2, RPK-1, BMPR-II (BRK-3), BMPs, b-NGF, BOK, Bombesin, Bone-derived neurotrophic factor, BPDE, BPDE-DNA, BTC, complement factor 3 (C3), C3a, C4, C5, C5a, CIO, CA125, CAD-8, Calcitonin, cAMP, carcinoembryonic antigen (CEA), carcinoma-associated antigen, Cathepsin A, Cathepsin B, Cathepsin C/DPPI, Cathepsin D, Cathepsin E, Cathepsin H, Cathepsin L, Cathepsin O, Cathepsin S, Cathepsin V, Cathepsin X/Z/P, CBL, CCI, CCK2, CCL, CCLl, CCLll, CCL12, CCL13, CCL 14, CCL15, CCL16, CCL1 7, CCL18, CCL19, CCL2, CCL20, CCL21, CCL22, CCL23, CCL24, CCL25, CCL26, CCL27, CCL28, CCL3, CCL4, CCL5, CCL6, CCL7, CCL8, CCL9/10, CCR, CCR1, CCR10, CCR10, CCR2, CCR3, CCR4, CCR5, CCR6, CCR7, CCR8, CCR9, CD1, CD2, CD4, CD5, CD6, CD7, CD8, CD10, CDlla, CDllb, CDllc, CD13, CD14, CD15, CD16, CD18, CD19, CD20, CD21, CD22, CD23, CD25, CD27L, CD28, CD29, CD30, CD30L, CD32, CD33 (p67 proteins), CD34, CD38, CD40, CD40L, CD44, CD45, CD46, CD49a, CD52, CD54, CD55, CD56, CD61, CD64, CD66e, CD74, CD80 (B7-1), CD89, CD95, CD123, CD137, CD138, CD140a, CD146, CD147, CD148, CD152, CD164, CEACAM5, CFTR, cGMP, CINC, *Clostridium botulinum* toxin, *Clostridium perfringens* toxin, CKb8-1, CLC, CMV, CMV UL, CNTF, CNTN-1, COX, C-Ret, CRG-2, CT-1, CTACK, CTGF, CTLA-4, CX3CL1, CX3CR1, CXCL, CXCLl, CXCL2, CXCL3, CXCL4, CXCL5, CXCL6, CXCL7, CXCL8, CXCL9, CXCL10, CXCL11, CXCL12, CXCL13, CXCL14, CXCL15, CXCL16, CXCR, CXCR1, CXCR2, CXCR3, CXCR4, CXCR5, CXCR6, cytokeratin tumor-associated antigen, DAN, DCC, DcR3, DC-SIGN, Decay accelerating factor, des(1-3)-IGF-I (brain IGF-1), Dhh, digoxin, DNAM-1, Dnase, Dpp, DPPIV/CD26, Dtk, ECAD, EDA, EDA-A1, EDA-A2, EDAR, EGF, EGFR (ErbB-1), EMA, EMMPRIN, EN A, endothelin receptor, Enkephalinase, eNOS, Eot, eotaxinl, EpCAM, Ephrin B2/EphB4, EPO, ERCC, E-selectin, ET-1, Factor IIa, Factor VII, Factor VIIIc, Factor IX, fibroblast activation protein (FAP), Fas, FcRl, FEN-1, Ferritin, FGF, FGF-19, FGF-2, FGF3, FGF-8, FGFR, FGFR-3, Fibrin, FL, FLIP, Flt-3, Flt-4, Follicle stimulating hormone, Fractalkine, FZD1, FZD2, FZD3, FZD4, FZD5, FZD6, FZD7, FZD8, FZD9, FZD10, G250, Gas 6, GCP-2, GCSF, GD2, GD3, GDF, GDF-1, GDF-3 (Vgr-2), GDF-5 (BMP-14, CDMP-1), GDF-6 (BMP-13, CDMP-2), GDF-7 (BMP-12, CDMP-3), GDF-8 (Myostatin), GDF-9, GDF-15 (MIC-1), GDNF, GDNF, GFAP, GFRa-1, GFR-alphal, GFR-alpha2, GFR-alpha3, GITR, Glucagon, Glut 4, glycoprotein IIb/IIIa (GP IIb/IIIa), GM-CSF, gpl30, gp72, GRO, Growth hormone releasing factor, Hapten (NP-cap or NIP-cap), HB-EGF, HCC, HCMV gB envelope glycoprotein, HCMV) gH envelope glycoprotein, HCMV UL, Hemopoietic growth factor (HGF), Hep B gpl20, heparanase, Her2, Her2/neu (ErbB-2), Her3 (ErbB-3), Her4 (ErbB-4), herpes simplex virus (HSV) gB glycoprotein, HSV gD glycoprotein, HGFA, High molecular weight melanoma-associated antigen (HMW-MAA), HIV gpl20, HIV IIIB gp 120 V3 loop, HLA, HLA-DR, HM1.24, HMFG PEM, HRG, Hrk, human cardiac myosin, human cytomegalovirus (HCMV), human growth hormone (HGH), HVEM, 1-309, IAP, ICAM, ICAM-1, ICAM-3, ICE, ICOS, IFNg, Ig, IgA receptor, IgE, IGF, IGF binding proteins, IGF-1R, IGFBP, IGF-I, IGF-II, IL, IL-1, IL-1R, IL-2, IL-2R, IL-4, IL-4R, IL-5, IL-5R, IL-6, IL-6R, IL-8, IL-9, IL-10, IL-12, IL-13, IL-15, IL-18, IL-18R, IL-23, interferon (INF)-alpha, INF-beta, INF-gamma, Inhibin, iNOS, Insulin A-chain, Insulin B-chain, Insulin-like growth factor 1, integrin alpha2, integrin alpha3, integrin alpha4, integrin alpha4/betal, integrin, alpha4/beta7, integrin alpha5 (alphaV), integrin alpha5/betal, integrin alpha5/beta3, integrin alpha6, integrin betal, integrin beta2, interferon gamma, IP-10, 1-TAC, JE, Kallikrein 2, Kallikrein 5, Kallikrein 6, Kallikrein 11, Kallikrein 12, Kallikrein 14, Kallikrein 15, Kallikrein LI, Kallikrein L2, Kallikrein L3, Kallikrein L4, KC, KDR, Keratinocyte Growth Factor (KGF), laminin 5, LAMP, LAP, LAP (TGF-1), Latent TGF-1, Latent TGF-1 bpl, LBP, LDGF, LECT2, Lefty, Lewis-Y antigen, Lewis-Y related antigen, LFA-1, LFA-3, Lfo, LIF, LIGHT, lipoproteins, LIX, LKN, Lptn, L-Selectin, LT-a, LT-b, LTB4, LTBP-1, Lung surfactant, Luteinizing hormone, Lymphotoxin Beta Receptor, Mac-1, MAdCAM, MAG, MAP2, MARC, MCAM, MCAM, MCK-2, MCP, M-CSF, MDC, Mer, METALLOPROTEASES, MGDF receptor, MGMT, MHC (HLA-DR), MIF, MIG, MIP, MIP-1-alpha, MK, MMAC1, MMP, MMP-1, MMP-10, MMP-11, MMP-12, MMP-13, MMP-14, MMP-15, MMP-2, MMP-24, MMP-3, MMP-7, MMP-8, MMP-9, MPIF, Mpo, MSK, MSP, mucin (Mucl), MUC18, Muellerian-inhibitin substance, Mug, MuSK, NAIP, NAP, NCAD, N-Cadherin, NCA 90, NCAM, NCAM, Neprilysin, Neurotrophin-3, -4, or -6, Neurturin, Neuronal growth factor (NGF), NGFR, NGF-beta, nNOS, NO, NOS, Npn, NRG-3, NT, NTN, OB, OGG1, OPG, OPN, OSM, OX40L, OX40R, p150, p95, PADPr, Parathyroid hormone, PARC, PARP, PBR, PBSF, PCAD, P-Cadherin, PCNA, PDGF, PDGF, PDK-1, PECAM, PEM, PF4, PGE, PGF, PGI2, PGJ2, PIN, PLA2, placental alkaline phosphatase (PLAP), P1GF, PLP, PP14, Proinsulin, Prorelaxin, Protein C, PS, PSA, PSCA, prostate specific membrane antigen (PSMA), PTEN, PTHrp, Ptk, PTN, R51, RANK, RANKL, RANTES, RANTES, Relaxin A-chain, Relaxin B-chain, renin, respiratory syncytial virus (RSV) F, RSV Fgp, Ret, Rheumatoid factors, RLIP76, RPA2, RSK, S100, SCF/KL, SDF-1, SERINE, Serum albumin, sFRP-3, Shh, SIGIRR, SK-1, SLAM, SLPI, SMAC, SMDF, SMOH, SOD, SPARC, Stat, STEAP, STEAP-II, TACE, TACI, TAG-72 (tumor-associated glycoprotein-72), TARC, TCA-3, T-cell receptors (e.g., T-cell receptor alpha/beta), TdT, TECK, TEM1, TEM5, TEM7, TEM8, TERT, testicular PLAP-like alkaline phosphatase, TfR, TGF, TGF-alpha, TGF-beta, TGF-beta Pan Specific, TGF-beta RI (ALK-5), TGF-beta RII, TGF-beta Rllb, TGF-beta RIII, TGF-betal, TGF-beta2, TGF-beta3, TGF-beta4, TGF-beta5, Thrombin, Thymus Ck-1, Thyroid stimulating hormone, Tie, TIMP, TIQ, Tissue Factor, TMEFF2, Tmpo, TMPRSS2, TNF, TNF-alpha, TNF-alpha beta, TNF-beta2, TNFc, TNF-RI, TNF-RII, TNFRSF10A (TRAIL Rl Apo-2, DR4), TNFRSFIOB (TRAIL R2 DR5, KILLER, TRICK-2A, TRICK-B), TNFRSF10C (TRAIL R3 DcR1, LIT, TRID), TNFRSF10D (TRAIL R4 DcR2, TRUNDD), TNFRSF11A (RANK ODF R, TRANCE R), TNFRSFllB (OPG OCIF, TR1), TNFRSF12 (TWEAK R FN14), TNFRSF13B (TACI), TNFRSF13C (BAFF R), TNFRSF14 (HVEM ATAR, HveA, LIGHT R, TR2), TNFRSF16 (NGFR p75NTR), TNFRSF17 (BCMA), TNFRSF18 (GITR AITR), TNFRSF19 (TROY TAJ, TRADE), TNFRSF19L (RELT), TNFRSFIA (TNF RI CD120a, p55-60), TNFRSFIB (TNF RII CD120b, p75-80), TNFRSF26 (TNFRH3), TNFRSF3 (LTbR TNF RIII, TNFC R), TNFRSF4 (OX40 ACT35, TXGP1 R), TNFRSF5 (CD40 p50), TNFRSF6 (Fas Apo-1, APT1, CD95), TNFRSF6B (DcR3 M68, TR6), TNFRSF7 (CD27), TNFRSF8 (CD30), TNFRSF9 (4-1BB CD137, ILA), TNFRSF21 (DR6), TNFRSF22 (DcTRAIL R2 TNFRH2), TNFRST23 (DcTRAIL Rl TNFRH1), TNFRSF25 (DR3 Apo-3, LARD, TR-3, TRAMP, WSL-1), TNFSF10 (TRAIL Apo-2 Ligand, TL2), TNFSF11 (TRANCE/RANK Ligand ODF, OPG Ligand), TNFSF12 (TWEAK Apo-3 Ligand, DR3 Ligand), TNFSF13 (APRIL TALL2), TNFSF13B (BAFF BLYS, TALL1, THANK, TNFSF20), TNFSF14 (LIGHT HVEM Ligand, LTg), TNFSF15 (TL1A/VEGI), TNFSF18 (GITR Ligand AITR Ligand, TL6), TNFSFIA (TNF-a Conectin, DIF, TNFSF2), TNFSF1B (TNF-b LTa, TNFSF1), TNFSF3 (LTb TNFC, p33), TNFSF4 (OX40 Ligand gp34, TXGP1), TNFSF5 (CD40 Ligand CD154, gp39, HIGM1, IMD3, TRAP), TNFSF6 (Fas Ligand Apo-1 Ligand, APT1 Ligand), TNFSF7 (CD27 Ligand CD70), TNFSF8 (CD30 Ligand CD153), TNFSF9 (4-lBB Ligand CD137 Ligand), TP-1, t-PA, Tpo, TRAIL, TRAIL R, TRAIL-R1, TRAIL-R2, TRANCE, transferring receptor, TRF, Trk, TROP-2, TSG, TSLP, tumor-associated antigen CA 125, tumor-associated antigen expressing Lewis Y related carbohydrate, TWEAK, TXB2, Ung, uPAR, uPAR-1, Urokinase, VCAM, VCAM-1, VECAD, VE-Cadherin, VE-cadherin-2, VEFGR-1 (fit-1), VEGF, VEGFR, VEGFR-3 (fit-4), VEGI, VIM, Viral antigens, VLA, VLA-1, VLA-4, VNR integrin, von Willebrands factor, WIF-1, WNT1, WNT2, WNT2B/13, WNT3, WNT3A, WNT4, WNT5A, WNT5B, WNT6, WNT7A, WNT7B, WNT8A, WNT8B, WNT9A, WNT9A, WNT9B, WNT10A, WNT10B, WNT11, WNT16, XCL1, XCL2, XCR1, XCR1, XEDAR, XIAP, XPD, CTLA4 (cytotoxic T lymphocyte antigen-4), PD1 (programmed cell death protein 1), PD-L1 (programmed cell death ligand 1), LAG-3 (lymphocyte activation gene-3), TIM-3 (T cell immunoglobulin and mucin protein-3), receptors for hormones, and growth factors.

Multispecifics comprising anti-CD3 antibodies and antigen-binding fragments disclosed herein may be prepared according to a variety of techniques including, but not limited to, recombinant co-expression of two immunoglobulin heavy chain-light chain pairs having different specificities (see Milstein and Cuello, Nature 305: 537 (1983)), WO 93/08829, and Traunecker et al., EMBO J. 10: 3655 (1991)) "knob-in-hole" engineering (see, e.g., U.S. Pat. No. 5,731,168); immunoglobulin crossover (also known as Fab domain exchange or CrossMab™ format) technology (see e.g., WO2009/080253; Schaefer et al., Proc. Natl. Acad. Sci. USA, 108:11187-11192 (2011)); engineering electrostatic steering effects for antibody Fc-heterodimeric molecules (WO 2009/089004A1); cross-linking two or more antibodies or fragments (see, e.g., U.S. Pat. No. 4,676,980, and Brennan et al., Science, 229: 81 (1985)); leucine zippers (see, e.g., Kostelny et al., J. Immunol, 148(5):1547-1553 (1992)); "diabody" technology (see, e.g., Hollinger et al., Proc. Natl. Acad. Sci. USA, 90:6444-6448 (1993)); single-chain Fv (sFv) dimers (see, e.g. Gruber et al., J. ImmunoL, 152:5368 (1994)); and trispecific antibodies as described, e.g., in Tutt et al. J. ImmunoL 147: 60 (1991).

The present disclosure also contemplates modification of anti-CD3 antibodies disclosed herein, such modifications comprising one or more amino acid substitutions, insertions and/or deletions in the FR and/or CDR regions of the heavy and light chain variable domains. Once obtained, such derivative antibodies and/or antigen-binding fragments can be tested for one or more desired properties, such as improved binding specificity, increased binding affinity, improved developability, etc.

In some embodiments, anti-CD3 antibodies and/or antigen-binding fragments thereof comprise a heavy chain (HC) sequence, light chain (LC) sequence, CDRH3 sequence, CDRH2 sequence, CHRH1 sequence, CDRL3 sequence, CDRL2 sequence, CDRL1 sequence, and/or framework sequence. In some embodiments, anti-CD3 antibodies and/or antigen-binding fragments thereof have amino acid sequence identity to corresponding sequences of anti-CD3 antibodies disclosed in Table 4 (Ab1-Ab50) by at least about 100%, at least about 99%, at least about 98%, at least about 97%, at least about 96%, at least about 95%, at least about 94%, at least about 93%, at least about 92%, at least about 91%, at least about 90%, at least about 89%, at least about 88%, at least about 87%, at least about 86%, at about 85%, at least about 84%, at least about 83%, at least about 82%, at least about 80%; and/or all percentages of identity in between. In some embodiments, percent identity is measured by any well-known algorithm of sequence identity, such as FASTA, BLAST or GAP.

In some embodiments, residue positions that are not identical differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent or degree of similarity may be adjusted upwards to correct for the conservative nature of the substitution. Means for making this adjustment are well known to those of skill in the art. (See, e.g., Pearson (1994) Methods Mol. Biol. 24: 307-331). Examples of groups of amino acids that have side chains with similar chemical properties include 1) aliphatic side chains: glycine, alanine, valine, leucine and isoleucine; 2) aliphatic-hydroxyl side chains: serine and threonine; 3) amide-containing side chains: asparagine and glutamine; 4) aromatic side chains: phenylalanine, tyrosine, and tryptophan; 5) basic side chains: lysine, arginine, and histidine; 6) acidic side chains: aspartate and glutamate, and 7) sulfur-containing side chains: cysteine and methionine. In some embodiments, conservative amino acids substitution groups are: valine-leucine-isoleucine, phenylalanine-tyrosine, lysine-arginine, alanine-valine, glutamate-aspartate, and asparagine-glutamine. Alternatively, in some embodiments, a conservative replacement comprises any change having a positive value in the PAM250 log-likelihood matrix disclosed in Gonnet et al. (1992) Science 256: 1443 45. In some embodiments, a "moderately conservative" replacement comprises any change having a nonnegative value in a PAM250 log-likelihood matrix.

Substitution of one or more CDR residues or omission of one or more CDRs is also possible. Antibodies have been described in which one or two CDRs can be dispensed to alter binding in the scientific literature. Padlan et al. (1995 FASEB J. 9:133-139) analyzed contact regions between antibodies and their antigens based on published crystal structures, and concluded that only about one fifth to one third of CDR residues actually contact their associated antigen. Padlan also found many antibodies in which one or two CDRs had zero amino acids in contact with an antigen (see also, Vajdos et al. 2002 *J Mol Biol* 320:415-428). CDR residues not contacting an antigen can be identified based on previous studies (for example residues H60-H65 in CDRH2 are often not required), from regions of Kabat CDRs lying outside Chothia CDRs, by molecular modeling and/or empirically. If a CDR or residue(s) thereof is omitted, it is usually substituted with an amino acid occupying the corresponding position in another human antibody sequence or a consensus of such sequences. Positions for substitution within CDRs and amino acids to substitute can also be selected empirically.

In certain embodiments, substitutions, insertions, or deletions may occur within one or more CDRs of anti-CD3 antibodies described herein so long as such alterations do not substantially reduce the ability of the antibody to bind its antigen. For example, conservative alterations (e.g., conservative substitutions as provided herein) that do not substantially reduce binding affinity may be made in CDRs. Such alterations may, for example, be outside of antigen contacting residues in the CDRs. In certain embodiments of the variant VH and VL sequences provided above, each CDR either is unaltered, or contains no more than one, two or three amino acid substitutions.

A useful method for identification of residues or regions of an antibody that may be targeted for mutagenesis is called "alanine scanning mutagenesis" as described by Cunningham and Wells (1989) Science, 244:1081-1085. In this method, a residue or group of target residues (e.g., charged residues such as arg, asp, his, lys, and glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of an antibody molecule include fusion to the N- or C-terminus of the antibody to an enzyme (e.g. for ADEPT) or a polypeptide which increases serum half-life of the antibody.

As described throughout, anti-CD3 antibodies and/or antigen-binding fragments thereof as provided herein possess favorable developability and are, thus, relatively developable.

The term "developable" refers to the extent to which one or more polypeptides in a plurality of polypeptides possess desirable characteristics, such as, e.g., desirable expression, for example, in mammalian cells; solubility; viscosity; aggregation; chemical and/or physical stability; desirable shelf-life; melting temperature; pharmacokinetic profiles; circulation half-life; and clearance characteristics. Such characteristics may serve as indicia, independently, as combinations of sub-sets of such indicia, or in totality, for the likelihood that such one or more polypeptides may be successfully developed as a therapeutic candidate, and ultimately an approved drug. Accordingly, as understood in the art, generally, polypeptides with desirable developability characteristics possess, e.g., relatively high solubility, relatively low viscosity, relatively low propensity for aggregation, relatively high chemical stability, relatively high physical stability, relatively long shelf life, relatively high melting temperature, relatively long circulation half-life, relatively long clearance time, and the like. Polypeptides with undesirable developability characteristics possess, e.g., relatively low solubility, relatively high viscosity, relatively high propensity for aggregation, relatively poor chemical stability, relatively poor physical stability, relatively short shelf life, relatively low melting temperature, relatively short circulation half-life, relatively short clearance time, and the like.

Methods and assays that may be employed to ascertain the degree to which polypeptides, such as anti-CD3 antibodies and/or antigen-binding fragments thereof as described herein, possess desirable developability characteristics are available in the art, and include, for example; PSR assays (WO 2014/179363 and Xu et al., Protein Eng Des Sol, Vol. 26, pages 663-670 (2013)); SMP and SCP assays and the like; cross interaction chromatography (CIC); self-interaction chromatography (SIC); dynamic light scattering; size exclusion chromatography (SEC), dynamic light scattering (DLS) spectroscopy; photon correlation spectroscopy; quasi-elastic light scattering, circular dichroism (CD), viscosity measurements; whole cell binding; tissue micro array methodologies; BVP ELISA assays; AC-SINS assays (Liu et al; MAbs, Vol. 6, pages 483-492 (2014); differential scanning calorimetry; and the like (see, e.g., He et al., J. Pharm. Sci., Vol. 100(4), pp. 1330-1340 (2011); Wagner et al., Pharm. Develop. & Technol (posted online 2012; hyper-text transfer protocol: informahealthcare.com/doi/abs/10.3109/10837450.2011.649851); Hotzel et al., mAbs, Vol. 4(6), pages 753-7601 (2012); Weiqiang et al., J. Pharm. Sci., Vol. 101(5), pp. 1701-1720 (2012); Banks et al., J. Pharm. Sci., Vol. 101(8), pp. 2720-2732 (2012); Lie et al., J. Pharm. Sci., Vol. 94(9), pp. 1928-1948 (2005); and Payne et al., Biopolymers, Vol. 85(5), pp. 527-533 (2006)).

In some embodiments, antibodies that are identified as possessing decreased developability are so detected by virtue of their interaction with a polyspecificity reagent ("PSR") and, as such, are referred to as "polyspecific" polypeptides. Such polyspecific antibodies may be referred to as relatively "undevelopable" or relatively "non-developable".

A "developability profile" refers to an index that may be assigned to antibodies upon assessing their developability. A developability profile is a measure or metric by which developability of anti-CD3 antibodies may be assessed, compared, and/or ranked. Such developability profiles serve as a measure of the degree of interaction of CD3 binders and antibodies comprising them. The degree of interaction may be assessed by any number of means available in the art that provides an output value that correlates with a strength or affinity of a polypeptide for a moiety to which it is bound. Exemplary means include flow cytometry means, such as FACS; ELISA; quantitative immunoaffinity assays or immunoprecipitation assays; mammalian two-hybrid or yeast two-hybrid assays, and the like. In the context of FACS, as demonstrated in the Examples, a degree of interaction between polypeptides in the plurality and the PSR may be ascertained by generating a mean fluorescence intensity (MFI) for each polypeptide-PSR interaction that is detected, and then ordering the MFI in either ascending or descending order, thereby ranking the polypeptides in the plurality according to the relative degree of interaction between each detected polypeptide and the PSR. Such a ranking provides for a ranking of polypeptides of the plurality such that those polypeptides possessing enhanced developability are readily ascertained, as are those polypeptides possessing decreased developability.

A developability profile may also take the form of a normalized score, for example, by normalizing developability of anti-CD3 antibodies described herein to the developability of a standard (or control) antibody, e.g., anti-HEL antibody.

In certain embodiments, inventive CD3 binding domains and antibodies comprising them may be further modified to contain additional nonproteinaceous moieties that are known in the art and are readily available. Moieties suitable for derivatization of an antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone)polyethylene glycol, polypropylene glycol homopolymers, polypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight and may be branched or unbranched. The number of polymers attached to the antibody may vary, and if more than one polymer is attached, they can be the same or different molecules. In general, the number and/or type of polymers used for derivatization can be determined based on considerations including, but not limited to, the particular properties or functions of the antibody to be improved, whether the antibody derivative will be used in a therapy under defined conditions, etc.

In certain embodiments, the inventive CD3 binding domains and antibodies comprising them are provided which display an enhanced developability profile. The developability profile for anti-CD3 antibodies is obtained by performing one or more of a PSR assay; an SCP assay; AC-SINS; an ELISA; a DSF assay; a Tm assay; a HIC assay; a CIC assay; or combinations thereof.

In other embodiments, anti-CD3 antibodies and/or antigen-binding fragments thereof as described herein display a poly-specificity reagent (PSR) score of between about 0.0 and about 0.45; between about 0.0 and about 0.4; between about 0.0 and about 0.35; between about 0.0 and about 0.3; between about 0.0 and about 0.25; between about 0.0 and about 0.2; between about 0.0 and about 0.15; or between about 0.0 and about 0.1. A score of 0.0-0.1 is "clean PSR". A score of 0.1 to 0.33 is "low PSR". A score of 0.33 to 0.66 is "medium PSR". A score of 0.66-1.00 is "high PSR". A high PSR score is indicative of decreased (or poor) developability. Generally, the lower the PSR score the more favorable the developability of the antibody.

In still other embodiments, anti-CD3 antibodies and/or antigen-binding fragments thereof as described herein display a HIC score of less than about 10.5 minutes (a clean to low HIC score); between about 10.5 minutes and 11.5 minutes (a medium HIC score); or greater than about 11.5 minutes (a high HIC score). Generally, the lower the HIC score the more favorable the developability of the antibody.

In yet other embodiments, anti-CD3 antibodies and/or antigen-binding fragments thereof as described herein display an SEC score of less than about 95%, which indicates that the antibody is a monomer, i.e., not aggregating.

In still other embodiments, anti-CD3 antibodies and/or antigen-binding fragments thereof as described herein display a Tm of less than about 65° C.

In some embodiments, anti-CD3 antibodies and/or antigen-binding fragments thereof as described herein may be further modified to minimize effector function, e.g., a silent Fc.

"Effector function" refers to biological activities attributable to the Fc region of an antibody, which varies by antibody isotype. Exemplary effector functions include: C1q binding and complement dependent cytotoxicity (CDC); Fc receptor binding; antibody-dependent cell-mediated cytotoxicity (ADCC); phagocytosis; down regulation of cell surface receptors (e.g., B cell receptor); and B cell activation.

"Fc region" is a C-terminal region of an immunoglobulin heavy chain that contains at least a portion of the constant region, including native sequence Fc regions and variant Fc regions. A human IgG heavy chain Fc region can extend from Cys226, or from Pro230, to the carboxyl-terminus of the heavy chain. However, the C-terminal lysine (Lys447) of the Fc region may or may not be present. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, Md., 1991.

In certain embodiments, one or more amino acid modifications may be introduced into the Fc region of an anti-CD3 antibody of the disclosure, thereby generating an Fc region variant (see e.g., US 2012/0251531). An Fc region variant may comprise a human Fc region sequence (e.g., a human IgG1, IgG2, IgG3 or IgG4 Fc region) comprising an amino acid modification (e.g., a substitution) at one or more amino acid positions.

In certain embodiments, the disclosure contemplates an anti-CD3 antibody variant that possesses some but not all effector functions, which make it a desirable candidate for applications in which the half-life of an antibody in vivo is important, yet certain effector functions (such as complement and ADCC) are unnecessary or deleterious. In vitro and/or in vivo cytotoxicity assays can be conducted to confirm reduction/depletion of CDC and/or ADCC activities. For example, Fc receptor (FcR) binding assays can be conducted to ensure that an antibody lacks FcγR binding (hence likely lacking ADCC activity) but retains FcRn binding ability. The primary cells for mediating ADCC (e.g. NK cells) express FcγRIII only, whereas monocytes express FcγRI, FcγRII and FcγRIII. FcR expression on hematopoietic cells is summarized in Table 3 on page 464 of Ravetch and Kinet, Annu. Rev. Immunol. 9:457-492 (1991). Non-limiting examples of in vitro assays to assess ADCC activity of a molecule of interest is described in U.S. Pat. No. 5,500,362 (see, e.g. Hellstrom, I. et al. Proc. Nat'l Acad. Sci. USA 83:7059-7063 (1986)) and Hellstrom, I et al., Proc. Nat'l Acad. Sci. USA 82:1499-1502 (1985); U.S. Pat. No. 5,821,337 (see Bruggemann, M. et al., J. Exp. Med. 166: 1351-1361 (1987)). Alternatively, non-radioactive assay methods may be employed (see, for example, ACTI™ non-radioactive cytotoxicity assay for flow cytometry (Cell Technology, Inc. Mountain View, Calif.); and CytoTox 96® non-radioactive cytotoxicity assay (Promega, Madison, Wis.)). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. Proc. Nat'l Acad. Sci. USA 95:652-656 (1998). C1q binding assays may also be carried out to confirm that an antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al. J. ImmunoL Methods 202:163 (1996); Cragg, M. S. et al. Blood. 101:1045-1052 (2003); and Cragg, M. S. and M. J. Glennie Blood. 103:2738-2743 (2004)). FcRn binding and in vivo clearance/half-life determinations can also be performed using methods known in the art (see, e.g., Petkova, S. B. et al. Int'l. ImmunoL 18(12):1759-1769 (2006)).

In some embodiments, antibodies with reduced effector function include those with substitution of one or more of Fc region residues 238, 265, 269, 270, 297, 327 and 329 (U.S. Pat. Nos. 6,737,056 and 8,219,149). In some embodiments, Fc mutants include Fc mutants with substitutions at two or more of amino acid positions 265, 269, 270, 297 and 327, including the so-called "DANA" Fc mutant with substitution of residues 265 and 297 to alanine (U.S. Pat. Nos. 7,332,581 and 8,219,149).

In other embodiments, anti-CD3 antibodies and/or antigen-binding fragments thereof as described herein are further modified to include a masking agent, e.g., a polypeptide mask, attached via a cleavable linker.

In some embodiments, anti-CD3 antibodies and/or antigen-binding fragments thereof as described herein are conjugated to a therapeutic moiety thereby forming an immunoconjugate. An "immunoconjugate" is an antibody conjugated to one or more heterologous molecule(s) such as, e.g., an antibiotic, a second anti-CD3 antibody, a vaccine, or a toxoid, or any other therapeutic moiety.

In certain embodiments, anti-CD3 antibodies and/or antigen-binding fragments thereof as described herein are altered to increase or decrease the extent to which the antibody is glycosylated. Addition or deletion of glycosylation sites to an anti-CD3 antibody of the disclosure may be conveniently accomplished by altering the amino acid sequence such that one or more glycosylation sites is created or removed.

Moreover, the present disclosure generally relates to an anti-CD3 antibody or antibody fragment, wherein said anti-CD3 antibody or antigen-binding antibody fragment comprises: a. a variable heavy (VH) chain polypeptide comprising: i. a $V_H$ CDR1 (CDRH1) of FNIKDYYMH (SEQ ID NO: 13); ii. a $V_H$ CDR2 (CDRH2) of WIDLENANTVYDAKFQG (SEQ ID NO: 15); iii. a $V_H$ CDR3 (CDRH3) of ARDAYGRYFYDV (SEQ ID NO: 103); and/or b. a variable light ($V_L$) chain polypeptide comprising: i. a $V_L$ CDR1 (CDRL1) of KSSQSLLN-ARTGKNYLA (SEQ ID NO: 8); a $V_L$ CDR2 (CDRL2) of WASTRX$_1$S (SEQ ID NO: 133); and a $V_L$ CDR3 (CDRL3) of X$_2$QSYFRRT (SEQ ID NO: 134); wherein X$_1$ and X$_2$ are each independently any amino acid. In some embodiments, X$_1$ is E or S. In some embodiments, X$_2$ is K or V. In some embodiments, said antibody or antigen-binding antibody fragment comprises a CDRL2 of SEQ ID NO: 10 or SEQ ID NO: 11. In some embodiments, said antibody or antigen-binding antibody fragment comprises a CDRL3 of SEQ ID NO: 5 or SEQ ID NO: 4.

In some embodiments, said antibody or antigen-binding antibody fragment comprises a $V_H$ chain CDR1 (CDRH1) of FNIKDYYMH (SEQ ID NO: 13), a $V_H$ chain CDR2 (CDRH2) of WIDLENANTVYDAKFQG (SEQ ID NO: 15), and a $V_H$ chain CDR3 (CDRH3) of ARDAYGRYFYDV (SEQ ID NO: 103); and/or a $V_L$ chain CDR1 (CDRL1) of KSSQSLLNARTGKNYLA (SEQ ID NO: 8), a $V_L$ chain CDR2 (CDRL2) of WASTRES (SEQ ID NO: 10), and a $V_L$ chain CDR3 (CDRL3) of KQSYFRRT (SEQ ID NO: 5). In some embodiments, said antibody or antigen-binding antibody fragment comprises a $V_H$ chain CDR1 (CDRH1) of FNIKDYYMH (SEQ ID NO: 13), a $V_H$ chain CDR2 (CDRH2) of WIDLENANTVYDAKFQG (SEQ ID NO: 15), and a $V_H$ chain CDR3 (CDRH3) of ARDAYGRYFYDV (SEQ ID NO: 103); and/or a $V_L$ chain CDR1 (CDRL1) of KSSQSLLNARTGKNYLA (SEQ ID NO: 8), a $V_L$ chain CDR2 (CDRL2) of WASTRSS (SEQ ID NO: 11), and a $V_L$ chain CDR3 (CDRL3) of VQSYFRRT (SEQ ID NO: 4). In some embodiments, the anti-CD3 antibody may comprise any one or more CDRs of the antibody referred to as Ab1 and/or any one or more CDRs of the antibody referred to as Ab13. In some embodiments the anti-CD3 antibody may bind to the same or a substantially similar epitope or epitopes of CD3 as Ab1 and/or Ab13.

In some embodiments, said anti-CD3 antibody or antigen-binding antibody fragment comprises a $V_L$ chain polypeptide comprising an amino acid sequence that possesses at least 90% sequence identity to SEQ ID NO: 18 or SEQ ID NO: 34. In some embodiments, said anti-CD3 antibody or antigen-binding antibody fragment comprises a $V_L$ chain polypeptide comprising an amino acid sequence that possesses at least 95% sequence identity to SEQ ID NO: 18 or SEQ ID NO: 34. In some embodiments, said anti-CD3 antibody or antigen-binding antibody fragment comprises a $V_L$ chain polypeptide comprising the amino acid sequence of SEQ ID NO: 18 or SEQ ID NO: 34. In some embodiments, said anti-CD3 antibody or antigen-binding antibody fragment comprises a $V_H$ chain polypeptide comprising an amino acid sequence that possesses at least 90% sequence identity to SEQ ID NO: 17. In some embodiments, said anti-CD3 antibody or antigen-binding antibody fragment comprises a $V_H$ chain polypeptide comprising an amino acid sequence that possesses at least 95% sequence identity to SEQ ID NO: 17. In some embodiments, said anti-CD3 antibody or antigen-binding antibody fragment comprises a $V_H$ chain comprising the amino acid sequence of SEQ ID NO: 17.

In some embodiments, said anti-CD3 antibody or antigen-binding antibody fragment comprises a $V_L$ chain polypeptide comprising an amino acid sequence that possesses at least 90% sequence identity to SEQ ID NO: 18 or SEQ ID NO: 34; and a $V_H$ chain polypeptide comprising an amino acid sequence that possesses at least 90% sequence identity to SEQ ID NO: 17. In some embodiments, said anti-CD3 antibody or antigen-binding antibody fragment comprises a $V_L$ chain polypeptide comprising an amino acid sequence that possesses at least 95% sequence identity to SEQ ID NO: 18 or SEQ ID NO: 34; and a $V_H$ chain polypeptide comprising an amino acid sequence that possesses at least 95% sequence identity to SEQ ID NO: 17. In some embodiments, said anti-CD3 antibody or antigen-binding antibody fragment comprises a $V_L$ chain polypeptide comprising the amino acid sequence of SEQ ID NO: 18 or SEQ ID NO: 34; and a $V_H$ chain comprising the amino acid sequence of SEQ ID NO: 17. In some embodiments, said anti-CD3 antibody or antigen-binding antibody fragment comprises a $V_L$ chain polypeptide comprising the amino acid sequence of SEQ ID NO: 18; and a $V_H$ chain comprising the amino acid sequence of SEQ ID NO: 17. In some embodiments, said anti-CD3 antibody or antigen-binding antibody fragment comprises a $V_L$ chain polypeptide comprising the amino acid sequence of SEQ ID NO: 34; and a $V_H$ chain comprising the amino acid sequence of SEQ ID NO: 17.

In some embodiments, said anti-CD3 antibody or antigen-binding antibody fragment binds to CD3 with a dissociation constant ($K_D$) of about 500 pM or less, about 470 pM or less, about 450 pM or less, about 400 pM or less, about 350 pM or less, about 300 pM or less, about 250 pM or less, about 200 pM or less, about 150 pM or less, or about 100 pM or less, optionally wherein said CD3 is human and/or cynomolgus, further optionally wherein said binding affinity is measured by surface plasmon resonance. In some embodiments, said $K_D$ is a monovalent $K_D$ and/or wherein said $K_D$ is measured using an scFv fragment of said anti-CD3 antibody or antibody fragment.

Moreover, the present disclosure generally relates to an anti-cluster of differentiation three ("CD3") antibody or antibody fragment, wherein said anti-CD3 antibody or antigen-binding antibody fragment comprises one or more CDRs of any one or more of Ab1-Ab50 and/or binds to the same epitope(s) as any one or more of Ab1-Ab50. Furthermore, the present disclosure generally relates to an anti-cluster of differentiation three ("CD3") antibody or antibody fragment, wherein said anti-CD3 antibody or antigen-binding antibody fragment comprises one or more $V_H$ and/or $V_L$ chains comprising an amino acid sequence selected from those in Table 4.

Production of the Anti-CD3 Antibodies and Antigen-Binding Fragments Thereof

Anti-CD3 antibodies and/or antigen-binding fragments thereof may be produced using recombinant methods. For example, isolated nucleic acids encoding an anti-CD3 antibody as described herein is provided. Such nucleic acids may encode an amino acid sequence comprising the VL, and/or an amino acid sequence comprising the VH of the antibody (e.g., the light and/or heavy chains of the antibody). In a further embodiment, one or more vectors (e.g., expression vectors) comprising such nucleic acids are provided. In a further embodiment, a host cell comprising such nucleic acids is provided. In one such embodiment, a host cell comprises (e.g., has been transformed with): (1) a vector comprising a nucleic acid sequence that encodes an amino acid sequence comprising the VL of the antibody and an amino acid sequence comprising the VH of the antibody, or (2) a first vector comprising a nucleic acid that encodes an amino acid sequence comprising the VL of the antibody and a second vector comprising a nucleic acid that encodes an amino acid sequence comprising the VH of the antibody. In one embodiment, the host cell is eukaryotic, e.g. a Chinese Hamster Ovary (CHO) cell or lymphoid cell (e.g., Y0, NS0, Sp20 cell). In one embodiment, a method of making an anti-CD3 antibody is provided, wherein the method comprises culturing a host cell comprising a nucleic acid encoding the antibody, as provided above, under conditions suitable for expression of the antibody, and optionally recovering the antibody from the host cell (or host cell culture medium).

The term "host cell" refers to cells into which an exogenous nucleic acid sequence has been introduced, including the progeny of such cells. Host cells include transformants and transformed cells, which include the primary transformed cell and progeny derived therefrom without regard to the number of passages.

For recombinant production of an anti-CD3 antibody, nucleic acids encoding an antibody, e.g., as described above, is isolated and inserted into one or more vectors for further cloning and/or expression in a host cell. Such nucleic acids may be readily isolated and sequenced using conventional procedures (e.g., by using oligonucleotide probes that are capable of binding specifically to genes encoding the heavy and light chains of the antibody).

Suitable host cells for cloning and/or expression of antibody-encoding vectors include prokaryotic or eukaryotic cells. For example, antibodies may be produced in bacteria, in particular when glycosylation and Fc effector function are not needed. For expression of antibody fragments and polypeptides in bacteria, see, e.g., U.S. Pat. Nos. 5,648,237, 5,789,199, and 5,840,523. (See also Charlton, Methods in Molecular Biology, Vol. 248 (B. K. C. Lo, ed., Humana Press, Totowa, N.J., 2003), pp. 245-254, describing expression of antibody fragments in E. coli.) After expression, the antibody may be isolated from the bacterial cell paste in a soluble fraction and can be further purified. In addition to prokaryotes, eukaryotic microbes such as filamentous fungi or yeast are suitable cloning or expression hosts for antibody-encoding vectors, including fungi and yeast strains whose glycosylation pathways have been "humanized," resulting in the production of an antibody with a partially or fully human glycosylation pattern. See, e.g., Gerngross, Nat. Biotech. 22:1409-1414 (2004), and Li et al., Nat. Biotech. 24:210-215 (2006); WO 2009/036379; WO 2010/105256; and WO 2012/009568. Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antibodies in transgenic plants). Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., J. Gen Virol. 36:59 (1977)); baby hamster kidney cells (BHK); mouse sertoli cells (TM4 cells as described, e.g., in Mather, Biol. Reprod. 23:243-251 (1980)); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary tumor (MMT 060562); TRI cells, as described, e.g., in Mather et al., Annals N.Y. Acad. Sci. 383:44-68 (1982); MRC 5 cells; and FS4 cells. Other useful mammalian host cell lines include Chinese hamster ovary (CHO) cells, including DHFR-CHO cells (Urlaub et al., Proc. Natl. Acad. Sci. USA 77:4216 (1980)); and myeloma cell lines such as Y0, NS0 and Sp2/0. For a review of certain mammalian host cell lines suitable for antibody production, see, e.g., Yazaki and Wu, Methods in Molecular Biology, Vol. 248 (B. K. C. Lo, ed., Humana Press, Totowa, N.J.), pp. 255-268 (2003).

Anti-CD3 antibodies and/or antigen-binding fragments thereof may be identified, screened for, selected for or characterized for their physical/chemical properties and/or biological activities by various assays known in the art, e.g., ELISA, Western blot, etc. or competition assays may be used to identify an antibody that competes with an anti-CD3 antibody of the invention for binding to CD3. In an exemplary competition assay, immobilized CD3 is incubated in a solution comprising a first labeled antibody that binds to CD3 and a second unlabeled antibody that is being tested for its ability to compete with the first antibody for binding to CD3. The second antibody may be present in a hybridoma supernatant. As a control, immobilized CD3 is incubated in a solution comprising the first labeled antibody but not the second unlabeled antibody. After incubation under conditions permissive for binding of the first antibody to CD3, excess unbound antibody is removed, and the amount of label associated with immobilized CD3 is measured. If the amount of label associated with immobilized CD3 is substantially reduced in the test sample relative to the control sample, then that indicates that the second antibody is competing with the first antibody for binding to CD3. See, e.g., Harlow and Lane (1988) Antibodies: A Laboratory Manual. Ch.14 (Cold Spring Harbor Laboratory, Cold Spring Harbor, N.Y.).

Anti-CD3 antibodies and/or antigen-binding fragments thereof possessing biological activity may be identified using standard approaches. Biological activity may include, e.g., binding to CD3 on the surface of a T cell, either in vivo, in vitro, or ex vivo. In the case of a multispecific anti-CD3 antibody (such as a bispecific antibody with one arm that binds to CD3 and another arm that binds to a different target, e.g., a cell surface antigen, e.g., a tumor antigen), biological activity may also include effector cell activation (such as CD8+ and/or CD4+ T cell activation), effector cell population expansion (i.e., an increase in T cell count), target cell population reduction (i.e., a decrease in the population of cells expressing the second biological molecule on their cell surfaces), and/or target cell killing.

Diagnostic and Therapeutic Uses for the Anti-CD3 Antibodies and Antigen-Binding Fragments Thereof Anti-CD3 antibodies and/or antigen-binding fragments described herein may be used for diagnosis and/or detection. "Detection" as used herein encompasses quantitative or qualitative detection. In one embodiment, a method of detecting the presence of CD3 in a biological sample is provided. Such method comprises (i) contacting the biological sample with an anti-CD3 antibody as described herein under conditions permissive for binding of the anti-CD3 antibody to CD3, and (ii) detecting whether a complex is formed between the anti-CD3 antibody and CD3. Such method may be an in vitro or in vivo method. In certain embodiments, the biological sample comprises a cell or tissue(s).

In certain embodiments, labeled anti-CD3 antibodies are provided. The anti-CD3 antibodies and/or antigen-binding fragments thereof as described herein include a label or moiety that is detected directly (such as fluorescent, chromophoric, electron-dense, chemiluminescent, and radioactive labels or indirectly (such as enzymes or ligands). Non-limiting exemplary labels include, radioisotopes such as 32P, 14C, 125I, 3H, and 131I; fluorophores such as rare earth chelates or fluorescein and its derivatives, rhodamine and its derivatives, dansyl, umbelliferone, luceriferases, e.g., firefly luciferase and bacterial luciferase (U.S. Pat. No. 4,737,456), luciferin, 2,3-dihydrophthalazinediones, horseradish peroxidase (HRP), alkaline phosphatase, β-galactosidase, glucoamylase, lysozyme, saccharide oxidases, e.g., glucose oxidase, galactose oxidase, and glucose-6-phosphate dehydrogenase; heterocyclic oxidases such as uricase and xanthine oxidase, coupled with an enzyme that employs hydrogen peroxide to oxidize a dye precursor such as HRP, lactoperoxidase, or microperoxidase; biotin/avidin; spin labels; bacteriophage labels; stable free radicals; and the like.

CD3 antibodies and/or antigen-binding fragments thereof as described herein, as well as pharmaceutical compositions of such antibodies, may be used in therapeutic methods. In one embodiment, anti-CD3 antibodies and/or antigen-binding fragments thereof as described herein, or pharmaceutical compositions comprising such antibodies, may be used for treating or delaying progression of a cell proliferative disorder or an autoimmune disorder.

A "disorder" refers to any condition or disease that would benefit from treatment including, but not limited to, chronic and acute disorders or diseases including those pathological conditions which predispose a mammal to the disorder in question.

The terms "cell proliferative disorder" and "proliferative disorder" refer to disorders that are associated with some degree of abnormal cell proliferation. Cell proliferative disorders include cancer, e.g., a tumor.

"Tumor" as used herein refers to all neoplastic cell growth and proliferation, whether malignant or benign, and all pre-cancerous and cancerous cells and tissues.

"Cancer" refers to a physiological condition in mammals characterized by unregulated cell growth. Examples of cancer include, but are not limited to, carcinoma, lymphoma, blastoma, sarcoma, and leukemia or lymphoid malignancies; with more particular examples including squamous cell cancer (e.g., epithelial squamous cell cancer), lung cancer including small-cell lung cancer, non-small cell lung cancer, adenocarcinoma of the lung and squamous carcinoma of the lung, cancer of the peritoneum, hepatocellular cancer, gastric or stomach cancer including gastrointestinal cancer and gastrointestinal stromal cancer, pancreatic cancer, glioblastoma, cervical cancer, ovarian cancer, liver cancer, bladder cancer, cancer of the urinary tract, hepatoma, breast cancer, colon cancer, rectal cancer, colorectal cancer, endometrial or uterine carcinoma, salivary gland carcinoma, kidney or renal cancer, prostate cancer, vulval cancer, thyroid cancer, hepatic carcinoma, anal carcinoma, penile carcinoma, melanoma, superficial spreading melanoma, lentigo maligna melanoma, acral lentiginous melanomas, nodular melanomas, multiple myeloma and B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); hairy cell leukemia; chronic myeloblastic leukemia; and post-transplant lymphoproliferative disorder (PTLD), as well as abnormal vascular proliferation associated with phakomatoses, edema (such as that associated with brain tumors), Meigs' syndrome, brain, as well as head and neck cancer, and associated metastases. In certain embodiments, cancers that are amenable to treatment by antibodies of the disclosure include breast cancer, colorectal cancer, rectal cancer, non-small cell lung cancer, glioblastoma, non-Hodgkins lymphoma (NHL), renal cell cancer, prostate cancer, liver cancer, pancreatic cancer, soft-tissue sarcoma, kaposi's sarcoma, carcinoid carcinoma, head and neck cancer, ovarian cancer, mesothelioma, and multiple myeloma. In some embodiments, the cancer is selected from: small cell lung cancer, gliblastoma, neuroblastomas, melanoma, breast carcinoma, gastric cancer, colorectal cancer (CRC), and hepatocellular carcinoma. Yet, in some embodiments, the cancer is selected from: non-small cell lung cancer, colorectal cancer, glioblastoma and breast carcinoma, including metastatic forms of those cancers. In other embodiments, the cancer is selected from a class of mature B-Cell cancers excluding Hodgkin's Lymphoma but including germinal-center B-cell-like (GCB) DLBCL, activated B-cell-like (ABC) DLBCL, follicular lymphoma (FL), mantle cell lymphoma (MCL), acute myeloid leukemia (AML), chronic lymphoid leukemia (CLL), marginal zone lymphoma (MZL), small lymphocytic leukemia (SLL), lymphoplasmacytic lymphoma (LL), Waldenstrom macroglobulinemia (WM), central nervous system lymphoma (CNSL), Burkitt's lymphoma (BL), B-cell prolymphocytic leukemia, Splenic marginal zone lymphoma, Hairy cell leukemia, Splenic lymphoma/leukemia, unclassifiable, Splenic diffuse red pulp small B-cell lymphoma, Hairy cell leukemia variant, Waldenstrom macroglobulinemia, Heavy chain diseases, a Heavy chain disease, γ Heavy chain disease, μ Heavy chain disease, Plasma cell myeloma, Solitary plasmacytoma of bone, Extraosseous plasmacytoma, Extranodal marginal zone lymphoma of mucosa-associated lymphoid tissue (MALT lymphoma), Nodal marginal zone lymphoma, Pediatric nodal marginal zone lymphoma, Pediatric follicular lymphoma, Primary cutaneous follicle centre lymphoma, T-cell/histiocyte rich large B-cell lymphoma, Primary DLBCL of the CNS, Primary cutaneous DLBCL, leg type, EBV-positive DLBCL of the elderly, DLBCL associated with chronic inflammation, Lymphomatoid granulomatosis, Primary mediastinal (thymic) large B-cell lymphoma, Intravascular large B-cell lymphoma, ALK-positive large B-cell lymphoma, Plasmablastic lymphoma, Large B-cell lymphoma arising in HHV8-associated multicentric Castleman disease, Primary effusion lymphoma: B-cell lymphoma, unclassifiable, with features intermediate between diffuse large B-cell lymphoma and Burkitt lymphoma, and B-cell lymphoma, unclassifiable, with features intermediate between diffuse large B-cell lymphoma and classical Hodgkin lymphoma.

As used herein, "treatment" or "treat" or "treating" refer to clinical intervention in an attempt to alter the natural course of an individual being treated and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis.

As used herein, the terms "prevent," "preventing," and "prevention" refer to the prevention or inhibition of the development or onset of a disorder or disease.

As used herein, the terms "ameliorate" and "alleviate" refer to a reduction or diminishment in the severity a condition or any symptoms thereof.

In some embodiments, antibodies of the invention are used to delay development of a disorder or disease or to delay the progression of a disorder or disease. As used herein, "delaying progression" of a disorder or disease means to defer, hinder, slow, retard, stabilize, and/or postpone development of the disease or disorder (e.g., a cell proliferative disorder, e.g., cancer). The delay can be of varying lengths of time, depending on the history of the disease and/or individual being treated.

An effective amount of such antibody or composition may be administered to an individual suffering from cancer or arthritis, rheumatoid arthritis, colitis, inflammatory bowel disease, autoimmune type I diabetes, etc. An "effective amount" of an anti-CD3 antibody disclosed herein or a composition (e.g., pharmaceutical composition) comprising such antibody, is at least the minimum amount required to achieve the desired therapeutic or prophylactic result, e.g., a measurable improvement or prevention of a particular disorder, e.g., a cell proliferative disorder, e.g., cancer, preferably with minimal or no toxic or detrimental effects. An effective amount may vary according to inter alia disease state, age, sex, and weight of the patient, and the ability of the antibody (or antigen-binding fragment thereof) to elicit a desired response in the individual and, in some instances, by co-administering one or more additional therapeutic agents.

In some embodiments, anti-CD3 antibodies and/or antigen-binding fragments thereof as described herein may be used to enhance immune function in an individual having a cell proliferative disorder or an autoimmune disorder. Following administration, such antibody or composition may enhance immune function in an individual having a cell proliferative disorder or an autoimmune disorder by activating effector cells (e.g., T cells, e.g., CD8+ and/or CD4+ T cells including Tregs), expanding (increasing) the effector cell population, reducing the population of target cells (e.g., a cell expressing a second biological molecule recognized by an anti-CD3 antibody of the invention, such as a bispecific antibody), and/or killing a target cell (e.g., target tumor cell).

Anti-CD3 antibodies and/or antigen-binding fragments thereof as disclosed herein may be used to treat disorders including, but not limited to, a proliferative disorder, an oncological disorder, an immune-oncological disorder, a neurological disorder, a cognitive disorder, a neurodegenerative disorder, an autoimmune disorder. In one embodiment, an effective amount of such anti-CD3 antibody may be administered, alone or in combination with at least one additional agent, to an individual having such disorder. Such "individual" may be a mammal and, in particular, a human.

Non-limiting exemplary additional therapeutic agents include a chemotherapy agent, an antibody-drug conjugate (ADC), and/or a biological modifier. Chemotherapy agents may be selected from cyclophosphamide, doxorubicin, vincristine, and prednisolone (CHOP). ADC may be selected from an anti-CD79b antibody drug conjugate (such as anti-CD79b-MC-vc-PAB-MMAE or the anti-CD79b antibody drug conjugate described in any one of U.S. Pat. No. 8,088,378 and/or US 2014/0030280, or polatuzumab vedotin), an anti-CD19 antibody drug conjugate, an anti-CD22 antibody drug conjugate, an anti-CD45 antibody drug conjugate, and an anti-CD32 drug conjugate. A biological modifier may be selected from a BCL-2 inhibitor (such as GDC-0199/ABT-199), lenalidomide (Revlimid®), a PI3K-delta inhibitor (such as idelalisib (Zydelig®)), a PD-1 axis binding antagonist, an agonist, e.g., agonist antibody, directed against an activating co-stimulatory molecule, e.g., CD40, CD226, CD28, OX40 (e.g., AgonOX), GITR, CD137 (also known as TNFRSF9, 4-1 BB, or ILA), CD27 (e.g., CDX-1127), HVEM, or CD127, an antagonist, e.g., antagonist antibody, directed against an inhibitory co-stimulatory molecule, e.g., CTLA-4 (also known as CD152), PD-1, TIM-3, BTLA, VISTA, LAG-3, B7-H3, B7-H4, IDO (e.g., 1-methyl-D-tryptophan (also known as 1-D-MT)), TIGIT, MICA/B, GITR (e.g., TRX518) or arginase, ipilimumab (also known as MDX-010, MDX-101, or Yervoy®), tremelimumab (also known as ticilimumab or CP-675,206, urelumab (also known as BMS-663513), MGA271, an antagonist directed against a TGF beta, e.g., metelimumab (also known as CAT-192), fresolimumab (also known as GC1008), LY2157299k, and an adoptive transfer of a T cell (e.g., a cytotoxic T cell or CTL) expressing a chimeric antigen receptor (CAR), e.g., adoptive transfer of a T cell comprising a dominant-negative TGF beta receptor, e,g, a dominant-negative TGF beta type II receptor.

Anti-CD3 antibodies and/or antigen-binding fragments thereof as disclosed herein may be used to enhancing immune function in an individual, e.g., a human, having a disorder in an individual having such disorder. In one embodiment, a method of enhancing immune function comprises administering to an individual an effective amount of an anti-CD3 antibody to activate effector cells (e.g., T cells, e.g., CD8+ and/or CD4+ T cells), expand (increase) an effector cell population, reduce a target cell population, and/or kill a target cell (e.g., target tumor cell).

In a further aspect, pharmaceutical formulations comprising anti-CD3 antibodies and/or antigen-binding fragments as described herein are also provided, e.g., for use in any of the above therapeutic methods. A "pharmaceutical formulation" refers to a preparation in such form as to permit the biological activity of an active ingredient contained therein, such as the anti-CD3 antibodies described herein, to be effective, and which preferably contains no additional components which are unacceptably toxic to a subject to which the formulation would be administered.

In one embodiment, a pharmaceutical formulation comprises any of the anti-CD3 antibodies disclosed herein and a pharmaceutically acceptable carrier. A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative. In another embodiment, a pharmaceutical formulation comprises any of the anti-CD3 antibodies provided herein and at least one additional therapeutic agent.

Antibodies of the disclosure can be used either alone or in combination with other agents in a therapy, e.g., an anti-CD3 antibody and/or antigen-binding fragment thereof may be co-administered with at least one additional therapeutic agent. In certain embodiments, an additional therapeutic agent is a chemotherapeutic agent, growth inhibitory agent, cytotoxic agent, agent used in radiation therapy, anti-angiogenesis agent, apoptotic agent, anti-tubulin agent, or other agent, such as a epidermal growth factor receptor (EGFR) antagonist (e.g., a tyrosine kinase inhibitor), HER1/EGFR inhibitor (e.g., erlotinib (Tarceva®)), platelet derived growth factor inhibitor (e.g., Gleevec® (imatinib mesylate)), a COX-2 inhibitor (e.g., celecoxib), interferon, cytokine, antibody other than the anti-CD3 antibody of the invention, such as an antibody that bind to one or more of the following targets ErbB2, ErbB3, ErbB4, PDGFR-beta, BlyS, APRIL, BCMA VEGF, or VEGF receptor(s), TRAIL/Apo2, PD-1, PD-L1, PD-L2, or another bioactive or organic chemical agent.

In some embodiments, the disclosure provides a method wherein the additional therapeutic agent is a glucocorticoid. In one embodiment, the glucocorticoid is dexamethasone.

Such combination therapies noted above encompass combined administration (where two or more therapeutic agents are included in the same or separate formulations), and separate administration, in which case, administration of an antibody of the disclosure can occur prior to, simultaneously, and/or following, administration of additional therapeutic agent or agents. In one embodiment, administration of an anti-CD3 antibody and administration of an additional therapeutic agent occur within about one month, or within about one, two or three weeks, or within about one, two, three, four, five, or six days, of each other. Anti-CD3 antibodies of the disclosure (e.g., bispecific anti-CD3 antibodies of the invention that bind to CD3 and a second biological molecule, e.g., a cell surface antigen, e.g., a tumor antigen, such as a TDB antibody of the invention or variant thereof) can also be used in combination with radiation therapy.

An antibody of the disclosure (and/or any additional therapeutic agent) can be administered by any suitable means, including parenteral, intrapulmonary, and intranasal, and, if desired for local treatment, intralesional administration. Parenteral infusions include intramuscular, intravenous, intraarterial, intraperitoneal, or subcutaneous administration. In some embodiments, the antibody is administered by subcutaneous administration. In some embodiments, an anti-CD3 antibody administered by subcutaneous injection exhibits a less toxic response in a patient than the same anti-CD3 antibody administered by intravenous injection. Dosing can be by any suitable route, for example, by injections, such as intravenous or subcutaneous injections, depending in part on whether the administration is brief or chronic. Various dosing schedules including but not limited to single or multiple administrations over various time-points, bolus administration, and pulse infusion are contemplated herein.

Antibodies of the disclosure would be formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. The antibody need not, but may optionally be, formulated with one or more agents currently used to prevent or treat the disorder in question. The effective amount of such other agents depends on the amount of antibody present in the formulation, the type of disorder or treatment, and other factors discussed above. These are generally used in the same dosages and with administration routes as described herein, or about from 1 to 99% of the dosages described herein, or in any dosage and by any route that is empirically/clinically determined to be appropriate.

For the prevention or treatment of disease, the appropriate dosage of an antibody of the disclosure (when used alone or in combination with one or more other additional therapeutic agents) will depend on the type of disease to be treated, the type of antibody, the severity and course of the disease, whether the antibody is administered for preventive or therapeutic purposes, previous therapy, the patient's clinical history and response to the antibody, and the discretion of the attending physician. The antibody is suitably administered to the patient at one time or over a series of treatments.

As a general proposition, a therapeutically effective amount of the anti-CD3 antibody administered to human will be in the range of about 0.01 to about 100 mg/kg of patient body weight whether by one or more administrations. In some embodiments, an antibody used is administered in about 0.01 to about 45 mg/kg, about 0.01 to about 40 mg/kg, about 0.01 to about 35 mg/kg, about 0.01 to about 30 mg/kg, about 0.01 to about 25 mg/kg, about 0.01 to about 20 mg/kg, about 0.01 to about 15 mg/kg, about 0.01 to about 10 mg/kg, about 0.01 to about 5 mg/kg, or about 0.01 to about 1 mg/kg daily, for example. In one embodiment, an anti-CD3 antibody described herein is administered to a human at a dose of about 100 mg, about 200 mg, about 300 mg, about 400 mg, about 500 mg, about 600 mg, about 700 mg, about 800 mg, about 900 mg, about 1000 mg, about 1100 mg, about 1200 mg, about 1300 mg or about 1400 mg on day 1 of 21-day cycles. The dose may be administered as a single dose or as multiple doses (e.g., 2 or 3 doses), such as infusions. For repeated administrations over several days or longer, depending on the condition, the treatment would generally be sustained until a desired suppression of disease symptoms occurs. One exemplary dosage of the antibody would be in the range from about 0.05 mg/kg to about 10 mg/kg. Thus, one or more doses of about 0.5 mg/kg, 2.0 mg/kg, 4.0 mg/kg, or 10 mg/kg (or any combination thereof) may be administered to the patient. Such doses may be administered intermittently, for example, every week or every three weeks (e.g., such that the patient receives from about two to about twenty, or, for example, about six doses of the anti-CD3 antibody). An initial higher loading dose, followed by one or more lower doses, may be administered. The progress of this therapy is easily monitored by conventional techniques and assays.

In some embodiments, methods of the disclosure may further comprise an additional therapy. The additional therapy may be radiation therapy, surgery, chemotherapy, gene therapy, DNA therapy, viral therapy, RNA therapy, immunotherapy, bone marrow transplantation, nanotherapy, monoclonal antibody therapy, or a combination of the foregoing. The additional therapy may be in the form of adjuvant or neoadjuvant therapy. In some embodiments, the additional therapy is the administration of small molecule enzymatic inhibitor or anti-metastatic agent. In some embodiments, the additional therapy is the administration of side-effect limiting agents (e.g., agents intended to lessen the occurrence and/or severity of side effects of treatment, such as anti-nausea agents, etc.). In some embodiments, the additional therapy is radiation therapy. In some embodiments, the additional therapy is surgery. In some embodiments, the additional therapy is a combination of radiation therapy and surgery. In some embodiments, the additional therapy is gamma irradiation. In some embodiments, the additional therapy may be a separate administration of one or more of the therapeutic agents described above.

In another aspect of the disclosure, an article of manufacture containing materials useful for the treatment, prevention and/or diagnosis of the disorders described above is provided. The article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active agent in the composition is an antibody of the invention. The label or package insert indicates that the composition is used for treating the condition of choice. Moreover, the article of manufacture may comprise (a) a first container with a composition contained therein, wherein the composition comprises an antibody of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition. Alternatively, or additionally, the article of manufacture may further comprise a second (or third) container comprising a pharmaceutically acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

Accordingly, manufacture and/or preparation of a pharmaceutical composition comprising anti-CD3 antibodies and/or antigen-binding fragments as disclosed herein is also contemplated. The composition may be used alone or in combination with other active agents to treat a cell proliferative disorder (e.g., cancer) or an autoimmune disorder (e.g., arthritis, rheumatoid arthritis, colitis, inflammatory bowel disease, autoimmune type I diabetes, etc.).

In some embodiments, pharmaceutical compositions comprising anti-CD3 antibodies and/or antigen-binding fragments thereof as described herein are prepared, e.g., by mixing such an antibody having the desired degree of purity with one or more optional pharmaceutically acceptable carriers (Remington's Pharmaceutical Sciences 16th edition, Osol, A. Ed. (1980)), in the form of lyophilized formulations or aqueous solutions, optionally prepared for modified (e.g., sustained) release. Exemplary lyophilized antibody formulations are described in U.S. Pat. No. 6,267,958. Aqueous antibody formulations include those described in U.S. Pat. No. 6,171,586 and WO2006/044908, the latter formulations including a histidine-acetate buffer.

Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG). Exemplary pharmaceutically acceptable carriers herein further include insterstitial drug dispersion agents such as soluble neutral-active hyaluronidase glycoproteins (sHASEGP), for example, human soluble PH-20 hyaluronidase glycoproteins, such as rHuPH20 (HYLENEX®, Baxter International, Inc.). Certain exemplary sHASEGPs and methods of use, including rHuPH20, are described in US Patent Publication Nos. 2005/0260186 and 2006/0104968.

Such formulations may contain more than one active ingredient as necessary for the particular indication being treated, preferably those with complementary activities that do not adversely affect each other and present in amounts that are effective for the purpose intended. For example, it may be desirable to further provide an additional therapeutic agent (e.g., a chemotherapeutic agent, a cytotoxic agent, a growth inhibitory agent, and/or an anti-hormonal agent).

Active ingredients may be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are disclosed in Remington's Pharmaceutical Sciences 16th edition, Osol, A. Ed. (1980).

EXAMPLES

TABLE 1

Binding data for exemplary high affinity anti-CD3 antibodies in a bispecific format.

| Antibody | Biacore $K_D$ Biotinylated Human CD3 εδ Fc (M) Monovalent | Cell Binding Human CD3+ Jurkat Fold Over Background (FOB) | Cell Binding Cyno CD3+ Jurkat Fold Over Background (FOB) |
|---|---|---|---|
| ADI-42594 | 4.7E−10 | 14 | 16 |
| ADI-46357 | 2.5E−10 | 13 | 20 |
| ADI-46359 | 2.2E−10 | 15 | 28 |
| ADI-46366 | 2.3E−10 | 16 | 32 |
| ADI-46378 | 1.2E−10 | 17 | 30 |
| ADI-45959 | 1.2E−10 | 18 | 30 |
| ADI-45975 | 2.1E−10 | 10 | 17 |

TABLE 2

Developability profile of anti-CD3 antibodies in a bispecific format.

| | scFv-Fc or IgG $K_D$ Human CD3$_\varepsilon$δ-Fc (M) | scFv-Fc or IgG $K_D$ Cyno CD3$_\varepsilon$δ-Fc (M) | Cell Binding hCD3 (FOB) | Cell Binding cCD3 (FOB) | PSR Score (0-1) | HIC Retention Time (min) | SEC-HPLC % monomer ProA |
|---|---|---|---|---|---|---|---|
| ADI-42594 | 2.0E−10 | 2.0E−09 | 36 | 122 | 0.21 | 8.8 | 98.7 |
| ADI-42596 | 1.6E−10 | 2.4E−09 | 29 | 46 | 0.40 | 8.8 | 99.8 |
| ADI-45959 | 1.3E−10 | 1.7E−09 | 19 | 112 | 0.19 | 9.5 | 99.5 |
| ADI-45960 | 1.4E−10 | 1.8E−09 | 63 | 58 | 0.20 | 8.9 | 93.9 |
| ADI-45961 | 2.3E−10 | 3.0E−09 | 18 | 30 | 0.16 | 8.8 | 98.7 |
| ADI-45962 | 1.4E−10 | 1.4E−09 | 18 | 46 | 0.15 | 8.9 | 99.2 |
| ADI-45963 | 6.9E−11 | 2.1E−09 | 14 | 69 | 0.26 | 8.9 | 93.8 |
| ADI-45964 | 9.7E−11 | 2.0E−09 | 56 | 63 | 0.28 | 8.8 | 93.6 |
| ADI-45965 | 6.5E−11 | 1.4E−09 | 33 | 124 | 0.24 | 9.6 | 99.4 |
| ADI-45966 | 6.1E−11 | 1.2E−09 | 14 | 27 | 0.26 | 9.5 | 99.3 |
| ADI-45967 | 7.6E−11 | 1.4E−09 | 40 | 59 | 0.18 | 9.5 | 99.4 |
| ADI-45968 | 6.8E−11 | 1.4E−09 | 16 | 18 | 0.24 | 9.5 | 99.3 |
| ADI-45969 | 6.0E−11 | 1.5E−09 | 28 | 63 | 0.24 | 8.9 | 96.5 |
| ADI-45970 | 1.5E−10 | 1.6E−09 | 53 | 68 | 0.20 | 8.9 | 99.2 |
| ADI-45971 | 1.1E−10 | 1.9E−09 | 21 | 20 | 0.30 | 8.8 | 99.4 |
| ADI-45972 | 8.1E−11 | 1.4E−09 | 32 | 45 | 0.17 | 9.5 | 99.2 |
| ADI-45973 | 1.6E−10 | 1.8E−09 | 55 | 91 | 0.15 | 8.9 | 97.7 |
| ADI-45974 | 1.9E−10 | 2.1E−09 | 47 | 67 | 0.28 | 8.9 | 99.4 |

TABLE 2-continued

Developability profile of anti-CD3 antibodies in a bispecific format.

| | scFv-Fc or IgG $K_D$ Human $CD3_\epsilon\delta$-Fc (M) | scFv-Fc or IgG $K_D$ Cyno $CD3_\epsilon\delta$-Fc (M) | Cell Binding hCD3 (FOB) | Cell Binding cCD3 (FOB) | PSR Score (0-1) | HIC Retention Time (min) | SEC-HPLC % monomer ProA |
|---|---|---|---|---|---|---|---|
| ADI-45975 | 6.7E−11 | 1.4E−09 | 86 | 142 | 0.32 | 8.8 | 99.6 |
| ADI-45976 | 1.2E−10 | 1.8E−09 | 45 | 109 | 0.19 | 11.4 | 99.4 |
| ADI-45977 | 9.1E−11 | 1.1E−09 | 59 | 159 | 0.23 | 8.9 | 99.5 |
| ADI-45978 | 7.4E−11 | 1.2E−09 | 25 | 37 | 0.26 | 9.5 | 99.7 |
| ADI-45979 | 1.9E−10 | 1.7E−09 | 54 | 72 | 0.17 | 8.9 | 99.6 |
| ADI-45980 | 8.0E−11 | 1.2E−09 | 8 | 85 | 0.22 | 9.5 | 99.7 |
| ADI-45981 | 8.9E−11 | 1.6E−09 | 33 | 78 | 0.25 | 8.9 | 99.7 |
| ADI-45982 | 1.2E−10 | 1.4E−09 | 24 | 31 | 0.21 | 9.0 | 99.2 |
| ADI-45983 | 2.3E−10 | 2.0E−09 | 24 | 101 | 0.16 | 10.9 | 99.2 |
| ADI-45984 | 9.5E−11 | 1.3E−09 | 88 | 92 | 0.29 | 9.5 | 100.0 |
| ADI-45985 | 8.0E−11 | 1.2E−09 | 21 | 23 | 0.21 | 10.5 | 99.5 |
| ADI-42596 | 1.1E−09 | N.A. | 11 | 81 | 0.36 | 8.9 | 99.7 |
| ADI-46356 | 9.8E−10 | N.A. | 39 | 59 | 0.20 | 10.9 | 98.5 |
| ADI-46357 | 9.7E−10 | N.A. | 24 | 80 | 0.21 | 8.9 | 94.4 |
| ADI-46358 | 9.9E−10 | N.A. | 35 | 82 | 0.21 | 9.5 | 98.8 |
| ADI-46359 | 8.9E−10 | N.A. | 43 | 102 | 0.26 | 9.0 | 98.4 |
| ADI-46360 | 9.7E−10 | N.A. | 40 | 106 | 0.20 | 9.0 | 99.5 |
| ADI-46361 | 9.3E−10 | N.A. | 23 | 84 | 0.21 | 9.5 | 98.9 |
| ADI-46362 | 8.0E−10 | N.A. | 7 | 95 | 0.21 | 8.9 | 99.1 |
| ADI-46363 | 9.3E−10 | N.A. | 49 | 129 | 0.20 | 9.5 | 98.6 |
| ADI-46364 | 9.7E−10 | N.A. | 33 | 63 | 0.18 | 9.5 | 99.4 |
| ADI-46365 | 1.0E−09 | N.A. | 36 | 84 | 0.16 | 10.1 | 99.4 |
| ADI-46366 | 9.3E−10 | N.A. | 43 | 108 | 0.20 | 9.0 | 98.5 |
| ADI-46367 | 9.5E−10 | N.A. | 8 | 62 | 0.21 | 8.9 | 94.8 |
| ADI-46369 | 9.2E−10 | N.A. | 33 | 71 | 0.17 | 9.5 | 98.6 |
| ADI-46370 | 1.0E−09 | N.A. | 40 | 46 | 0.20 | 8.9 | 98.8 |
| ADI-46371 | 8.6E−10 | N.A. | 47 | 121 | 0.22 | 8.9 | 98.9 |
| ADI-46372 | 1.1E−09 | N.A. | 14 | 80 | 0.16 | 10.3 | 99.2 |
| ADI-46374 | 8.4E−10 | N.A. | 37 | 29 | 0.22 | 9.5 | 94.4 |
| ADI-46375 | 8.6E−10 | N.A. | 48 | 40 | 0.25 | 9.5 | 99.7 |
| ADI-46376 | 1.0E−09 | N.A. | 4 | 96 | 0.20 | 9.5 | 99.1 |
| ADI-46378 | 9.2E−10 | N.A. | 22 | 91 | 0.31 | 9.5 | 98.8 |
| ADI-46379 | 1.0E−09 | N.A. | 43 | 105 | 0.21 | 9.5 | 99.5 |
| ADI-46381 | 7.2E−10 | N.A. | 71 | 174 | 0.18 | 0.0 | 99.6 |
| ADI-26140 | N.B. | N.B. | 5 | 6 | N.A. | | N.A. |

TABLE 3

Thermostability measurements for exemplary anti-CD3 antibodies.

| ADI Name | scFv-Fc Tm DSF (° C.) |
|---|---|
| ADI-42594 | 66.0 |
| ADI-42596 | 66.0 |
| ADI-46356 | 62.0 |
| ADI-46357 | 66.5 |
| ADI-46358 | 62.0 |
| ADI-46359 | 62.5 |
| ADI-46360 | 52.5 |
| ADI-46361 | 58.5 |
| ADI-46362 | 59.0 |
| ADI-46363 | 58.5 |
| ADI-46364 | 58.0 |
| ADI-46365 | 58.5 |
| ADI-46366 | 63.5 |
| ADI-46367 | 66.5 |
| ADI-46369 | 62.5 |
| ADI-46370 | 62.0 |
| ADI-46371 | 59.0 |
| ADI-46372 | 59.0 |
| ADI-46374 | 64.0 |
| ADI-46375 | 58.5 |
| ADI-46376 | 57.0 |
| ADI-46378 | 58.5 |
| ADI-46379 | 58.5 |
| ADI-46381 | 56.5 |
| ADI-26140 | N.A. |

Materials and Methods

In addition to the description provided above, the following Materials and Methods were employed in the Examples.

FACS affinity pressured selection methods. Briefly, yeast cells (at least ~2×10$^7$ cells/labeling condition) were incubated with a volume of biotinylated antigen sufficient to represent a stoichiometric excess with respect to the average IgG presentation number. Antigen labeling conditions are 100 to 1 nM under equilibrium conditions, typically carried out for 20 min to several hours at room temperature in FACS wash buffer (phosphate-buffered saline (PBS)/0.1% bovine serum albumin (BSA)). After washing three times with wash buffer, yeast were then stained with secondary reagents anti-human light chain FITC conjugate (LC-FITC) diluted 1:100 and either streptavidin-633 (SA-633) diluted 1:500 or extravidin-phycoerythrin (EA-PE) diluted 1:50 for 15 min at 4° C. After washing twice with ice-cold wash buffer, the cell pellets were resuspended in wash buffer in a typical volume of at least 1 mL per 1×10 yeast and transferred to strainer-capped sort tubes. Sorting is performed using a BD FACSARIA® cell sorter (BD Biosciences) and sort gates were determined to select for binders. After the final round of sorting, yeast were plated and individual colonies picked for characterization.

FACS thermal pressured selection methods. The parent antibody was diversified by error-prone PCR to derive an optimization library in yeast. This yeast library first proceeds through a positive antigen selection round to select for expressing binders, using CD38N27. This enriched population then proceeded through a series of thermally pressured conditions ranging from ~50° C. up to 65° C. for 10 min with room temperature as a control. Optimally pressured conditions were gated on LC presentation (anti-human lambda PE) and antigen binding (SA-APC), reflecting the residual folded IgG competent to bind the selection reagents. Sorted cells are pelleted and the plasmids extracted using a commercial yeast plasmid purification kit (Zymo Research) in which the yeast cell walls are disrupted with Zymolase® enzyme and the DNA is subsequently purified by a DNA mini-column. Plasmid DNA is then transformed into *E. coli* for amplification, followed by mini-prep isolation of the plasmid DNA with an *E. coli* plasmid purification kit (Qiagen). Plasmid DNA is then prepared for transformation into the appropriate yeast strain for subsequent cycles selection or sequencing and IgG production.

Error-prone PCR optimization. Error-prone PCR-based mutagenesis of the heavy chain (VH) and/or light chain (VL) using standard molecular biology techniques introduced stochastic diversity. Briefly, mutagenic nucleotide analogues dPTP and 8-oxo-dGTP were incorporated into the VH and VL amplification process at 1 uM concentration to increase the base mis-incorporation frequency up to approx. 0.01 bp. The mutated PCR product was recombined in situ by homologous recombination with a linearized vector containing the HC or LC constant region sequences. This typically results in a library of $1\times10^{7-8}$ diversity. Affinity and expression co-pressures were applied by incubating the antigen antibody yeast complex at decreasing concentrations of antigen (equilibrium pressure) or with parental Fab competition (equilibrium and kinetic pressures) for varying amounts of time to select for the highest affinity antibodies on FACS over successive rounds of selection.

Oligonucleotide-based CDR H3 mutagenesis. Discovered or previously optimized antibodies can progress through additional optimization by diversification of the CDR H3 sequence. To do so, the light chain variable region of the starting antibody is PCR amplified, and then, using yeast homologous recombination, is inserted into a yeast strain containing the light chain empty vector. This constitutes the parental light chain yeast strain. The heavy chain of the starting antibody is used as PCR input in combination with germline specific primers that generate a PCR product that contains from framework 1 through framework three of the heavy chain. This amplification is perform using the mutagenic nucleotide 8-oxo-dGTP to provide additional low levels of mutagenesis in the amplified heavy chain region. In order to create designed diversity in the CDR H3 region of the starting antibody, a library of CDR H3 oligos is generated/ordered (i.e. from IDT). The oligo pool is amplified with primers containing 5' tails that allow for germline specific recombination with the amplified FW1-FW3 region and the empty. A universal 3' primer is used for FW4. Alternatively, mutagenic PCR can be performed that incorporates 8-oxo-dGTP into a PCR reaction using germline specific 5' primers, the universal 3' primer and VH DNA. Once the LC strain, HC FW1-FW3 and diversified CDR H3-FW4 inputs have been generated, a three piece transformation is performed by introducing the two HC components along with a HC empty vector into the LC strain. Subsequently, the cells are grown out under selective pressure to ensure HC and LC components are present.

Antibody yeast production and purification. Yeast clones were grown to saturation and then induced for 48 h at 30° C. with shaking. After induction, yeast cells were pelleted and the supernatants were harvested for purification. IgGs were purified using a Protein A column and eluted with acetic acid, pH 2.0. Fab fragments were generated by papain digestion and purified over a KappaSelect™ human Fab (kappa) fragment purification resin or a CaptureSelect® IgG-CH1 affinity resin (GE Healthcare LifeSciences).

Antibody HEK production and purification. Mammalian expression of IgG was done by sub-cloning antibodies into a new expression vector followed by transient transfection and expression in HEK293ADI1, a monoclonal cell line derived from HEK293 (DSMZ) selected for clump-free growth, growth rate, and transfectability. Briefly, expression vectors containing the antibody of interest were transfected by complexing with a transfection reagent followed by exposure to HEK cells for one hour followed by dilution of culture media to a final density of 4 million cells per mL. The cells were then cultured for 7 days with fresh feed media every 48 hours. After 7 days, the supernatant was collected following centrifugation and purification was performed using protein A. If necessary, a CHT column purification was added to reach >95% monomer.

ForteBio® KD measurements (Biolayer interferometry; BLI). ForteBio® affinity measurements were performed generally as previously described (Estep, P., et al., High throughput solution-based measurement of antibody-antigen affinity and epitope binning. MAbs, 2013. 5(2): p. 270-8.). Briefly, ForteBio® affinity measurements were performed by loading IgGs online onto AHQ sensors. Sensors were equilibrated off-line in assay buffer for 30 min and then monitored on-line for 60 seconds for baseline establishment. Sensors with loaded IgGs were exposed to 100 nM antigen for 5 min, afterwards they were transferred to assay buffer for 5 min for off-rate measurement. Kinetics was analyzed using the 1:1 binding model.

BiaCore® KD measurements (Surface plasmon resonance; SPR). Biosensor analysis was conducted at 25° C. in HBS-EP buffer system (10 mM HEPES pH 7.3, 150 mM NaCl, 3 mM EDTA, 0.05% Surfactant P20) using a Biacore® 8K optical biosensor docked with a CM5 sensor chip (GE Healthcare, Marlboro, MA). The sample hotel was maintained at 10° C. Goat anti-human IgG capture antibody (Jackson ImmunoResearch Laboratories, Inc., West Grove, PA; 109-005-098) was immobilized (11700+/−400 RU) to both flow cells of the sensor chip using standard amine coupling chemistry. This surface type provided a format for reproducibly capturing fresh analysis antigen after each regeneration step. Flow cell 2 was used to analyze captured antigen (35.7+/−0.8 RU) while flow cell 1 was used as a reference flow cell. Fab concentrations ranging from 100 to 0.412 nM (3-fold dilutions) were prepared in running buffer. Each of the Fab sample concentrations were run as a single replicate. Two blank (buffer) injections also were run and used to assess and subtract system artifacts. The association and dissociation phases for all Fab concentrations were monitored for 180 s each, at a flow rate of 30 μL/min. The surface was regenerated with 10 mM glycine, pH 1.5 for 30 s, at a flow rate of 30 μL/min. The data was aligned, double referenced, and fit using Biacore® 8K Evaluation Software, version 1.0.

Octet® Red384 Epitope Binning ligand blocking. Epitope binning/ligand blocking was performed using a standard sandwich format cross-blocking assay. Control anti-target IgG was loaded onto AHQ sensors and unoccupied Fc-binding sites on the sensor were blocked with an irrelevant human IgG1 antibody. The sensors were then exposed to 100 nM target antigen followed by a second anti-target antibody or ligand. Data was processed using ForteBio®'s Data Analysis Software 7.0. Additional binding by the second antibody or ligand after antigen association indicates an unoccupied epitope (non-competitor), while no binding indicates epitope blocking (competitor or ligand blocking).

Size Exclusion Chromatography. A TSKgel® SuperSW mAb HTP column (22855) was used for fast SEC analysis of yeast and mammalian produced mAbs at 0.4 m/min with a cycle time of 6 min/run. 200 mM Sodium Phosphate and 250 mM Sodium Chloride was used as the mobile phase.

Dynamic Scanning Fluorimetry (DSF). 10 µL of 20× Sypro® fluorescent chemical Orange is added to 20 µL of 0.2-1 mg/mL mAb or Fab solution. A RT-PCR instrument (BioRad CFX96™ RT PCR) is used to ramp the sample plate temperature from 40 to 95° C. at 0.5° C. increments, with 2 min equilibrate at each temperature. The negative of first derivative for the raw data is used to extract Tm.

PSR Preparation. Polyspecific reactivity reagent (PSR) was prepared as described in, e.g., WO 2014/179363 and Xu et al., mAbs, 2013. In brief, 2.5 liters CHO-S cells were used as starting material. The cells were pelleted at 2,400×g for 5 min in 500 mL centrifuge bottles filled to 400 mL. Cell pellets were combined and then resuspended in 25 ml Buffer B and pelleted at 2,400×g for 3 min. The buffer was decanted and the wash repeated one time. Cell pellets were resuspend in 3× the pellet volume of Buffer B containing 1× protease inhibitors (Roche, cOmplete™, EDTA-free) using a polytron homogenizer with the cells maintained on ice. The homogenate was then centrifuged at 2,400®×g for 5 min and the supernatant retained and pelleted one additional time (2,400×g/5 min) to ensure the removal of unbroken cells, cell debris and nuclei; the resultant supernatant is the total protein preparation. The supernatant was then transferred into two Nalgene® Oak Ridge 45 mL centrifuge tubes and pelleted at 40,000×g for 40 min at 4° C. The supernatants containing the Separated Cytosolic Proteins (SCPs) were then transferred into clean Oak Ridge tubes, and centrifuged at 40,000×g one more time. In parallel, the pellets containing the membrane fraction (EMF) were retained and centrifuged at 40,000 for 20 min to remove residual supernatant. The EMF pellets were then rinsed with Buffer B. 8 mL Buffer B was then added to the membrane pellets to dislodge the pellets and transfer into a Dounce Homogenizer. After the pellets were homogenized, they were transferred to a 50 mL conical tube and represented the final EMF preparation.

One billion mammalian cells (e.g. CHO, HEK293, Sf9) at $\sim 10^6$-$10^7$ cells/mL were transferred from tissue culture environment into 4×250 mL conical tubes and pelleted at 550×g for 3 min. All subsequent steps were performed at 4° C. or on ice with ice-cold buffers. Cells were washed with 100 mL of PBSF (1×PBS+1 mg/mL BSA) and combined into one conical tube. After removing the supernatant, the cell pellet was then re-suspended in 30 mL Buffer B (50 mM HEPES, 0.15 M NaCl, 2 mM $CaCl_2$), 5 mM KCl, 5 mM $MgCl_2$, 10% Glycerol, pH 7.2) and pelleted at 550×g for 3 min. Buffer B supernatant was decanted and cells re-suspended in 3× pellet volume of Buffer B plus 2.5× protease inhibitor (Roche, cOmplete™, EDTA-free). Protease inhibitors in Buffer B were included from here on forward. Cells were homogenized four times for 30 sec pulses (Polytron® homogenizer, PT1200E) and the membrane fraction was pelleted at 40,000×g for 1 hour at 4° C. The pellet is rinsed with 1 mL Buffer B; the supernatant is retained and represents the s. The pellet is transferred into a Dounce homogenizer with 3 mL of Buffer B and re-suspended by moving the pestle slowly up and down for 30-35 strokes. The enriched membrane fraction (EMF) is moved into a new collection tube, rinsing the pestle to collect all potential protein. Determine the protein concentration of the purified EMF using the Dc-protein assay kit (BioRad). To solubilize the EMF, transfer into Solubilization Buffer (50 mM HEPES, 0.15 M NaCl, 2 mM $CaCl_2$), 5 mM KCl, 5 mM $MgCl_2$, 1% n-Dodecyl-b-D-Maltopyranoside (DDM), 1× protease inhibitor, pH 7.2) to a final concentration of 1 mg/mL. Rotate the mixture overnight at 4° C. rotating followed by centrifugation in a 50 mL Oak Ridge tube (Fisher Scientific, 050529-ID) at 40,000×g for 1 hour. Collect the supernatant which represents the soluble membrane proteins (SMPs) and quantify the protein yield as described above.

For biotinylation, prepare the NHS-LC-Biotin stock solution according to manufacturer's protocol (Pierce, Thermo Fisher). In brief, 20 µl of biotin reagent is added for every 1 mg of EMF sample and incubated at 4° C. for 3 hours with gentle agitation. Adjust the volume to 25 mL with Buffer B and transfer to an Oak Ridge centrifuge tube. Pellet the biotinylated EMF (b-EMF) at 40,000×g for 1 hour, and rinse two times with 3 mL of Buffer C (Buffer B minus the glycerol) without disturbing the pellet. Remove the residual solution. Re-suspended the pellet with a Dounce homogenizer in 3 mL of Buffer C as described previously. The re-suspended pellet now represents biotinylated EMF (b-EMF). Solubilized as described above to prepare b-SMPs.

PSR Binding Analyses. Assays were performed generally as described in, e.g., Xu et al. To characterize the PSR profile of monoclonal antibodies presented on yeast, two million IgG-presenting yeast were transferred into a 96-well assay plate and pellet at 3000×g for 3 min to remove supernatant. Re-suspend the pellet in 50 µl of freshly prepared 1:10 dilution of stock b-PSRs and incubate on ice for 20 minutes. Wash the cells twice with 200 µl of cold PBSF and pellet re-suspended in 50 µl of secondary labeling mix (Extravidin-R-PE, anti-human LC-FITC, and propidium iodide). Incubate the mix on ice for 20 minutes followed by two washes with 200 pl ice-cold PBSF. Re-suspend the cells in 100 µl of ice-cold PBSF and run the plate on a BD FACSCanto® flow cytometer (BD Biosciences) using HTS sample injector. Flow cytometry data was analyzed for mean fluorescence intensity in the R-PE channel and normalized to proper controls in order to assess non-specific binding. Numerous methods for presentation or display of antibodies or antibody fragments on the surface of yeast have been described previously, all of which are consistent with this protocol (Blaise et al., 2004, Boder and Wittrup, 1997, Kuroda and Ueda, 2011, Orcutt and Wittrup, 2010, Rakestraw et al., 2011, Sazinsky et al., 2008, Tasumi et al., 2009, Vasquez et al., 2009).

ForteBio® Kinetics. FortBio® Octet® HTX instruments were used in 12 channel mode (8 sensors per channel, 96 sensors per experiment) with either AHC, SA, or AHQ sensors. Instrumentation was driven by manufacturer supplied software (versions 8.2 and 9.0). Sample names and concentrations were input into the plate data page, and sensor associated proteins were identified in the "information" column on the sensor data page. Kinetic experiments are collected with either a 90 or 180 s baseline, 180 s association phase, and 180 s dissociation phase. Binning experiments were collected in 5 steps: 90 s of baseline1, 90 s of a sensor binding check with the secondary binder, 90 s of baseline2, 180 s of association, and 180 s of dissociation in the well containing the secondary mAb. All files were saved into a shared network drive with a naming convention that identifies the format of the experiment.

HIC. IgG1 samples were buffer exchanged into 1 M ammonium sulfate and 0.1 M sodium phosphate at pH 6.5 using a Zeba 40 kDa 0.5 mL spin column (Thermo Pierce, cat #87766). A salt gradient was established on a Dionex® liquid chromatographic system ProPac® HIC-10 column from 1.8 M ammonium sulfate, 0.1 M sodium phosphate at pH 6.5 to the same condition without ammonium sulfate. The gradient ran for 17 min at a flow rate of 0.75 ml/min. An acetonitrile wash step was added at the end of the run to remove any remaining protein and the column was re-equilibrated over 7 column volumes before the next injection cycle. Peak retention times were monitored at A280 absorbance and concentrations of ammonium sulfate at elution were calculated based on gradient and flow rate.

LCMS. mAb samples were reduced by DTT, followed by middle down LCMS analysis on a Bruker® maXis™ 4G mass spectrometer coupled with an Agilent® 1100 HPLC (Agilent). A POROS® R2 10 μm (2.1×30 mm) reversed phase column was used to remove salt in the samples. A fast LC flow at 2 mL/min allows the separation between sample and salt and elution of samples and regeneration of column to finish within a 2.1 min cycle. A T-junction is used to deliver only 0.15 m/min sample flow into the mass spectrometer for sample analysis. The Bruker® maXis™ 4G mass spectrometer was run in positive ion mode with detection in the range of 750 to 2500 m/z. The remaining source parameters were set as follows; the capillary was set at 5500V, the Nebulizer at 4.0 Bar, dry gas at 4.0 l/min, and dry temp set at 200° C.

MS spectra were analyzed using Bruker® Data Analysis software version 4.1 and the deconvolution was accomplished using maximum entropy deconvolution with a mass range of 20 to 30 kDa.

An informal sequence listing is provided in Table 4. The informal sequence listing provides the heavy chain variable region ("HC") amino acid sequence, with each of the heavy chain variable region CDRs underlined, and the light chain variable region ("LC"), with each of the light chain variable region CDRs underlined.

TABLE 4

Informal sequence listing.

| Antibody No. | SEQ ID NO: | Sequence | Clone # (ADI) | Descriptors |
|---|---|---|---|---|
| Ab1 | 17 | QVQLVQSGAEVKKPGASVKVSCKASG<u>FNIKDYYMH</u>WVRQAPGQRLEWIG<u>WIDLENANTVYDAKFQG</u>RVTITRDTSASTAYMELSSLRSEDTAVYYC<u>ARDAYGRYFYDV</u>WGQGTLVTVSS | ADI-42594 | HC amino acid sequence |
| Ab1 | 18 | DIVMTQSPDSLAVSLGERATINC<u>KSSQSLLNARTGKNYLA</u>WYQQKPGQPPKLLIY<u>WASTRES</u>GVPDRFSGSGSGTDFTLTISSLQAEDVAVYYC<u>KQSYFRRT</u>FGGGTKVEIK | ADI-42594 | LC amino acid sequence |
| Ab2 | 17 | QVQLVQSGAEVKKPGASVKVSCKASG<u>FNIKDYYMH</u>WVRQAPGQRLEWIG<u>WIDLENANTVYDAKFQG</u>RVTITRDTSASTAYMELSSLRSEDTAVYYC<u>ARDAYGRYFYDV</u>WGQGTLVTVSS | ADI-42596 | HC amino acid sequence |
| Ab2 | 19 | DIVMTQSPDSLAVSLGERATINC<u>KSSQSLLNARTRKNYLA</u>WYQQKPGQPPKLLIY<u>WASTRES</u>GVPDRFSGSGSGTDFTLTISSLQAEDVAVYYC<u>KQSYFRRT</u>FGGGTKVEIK | ADI-42596 | LC amino acid sequence |
| Ab3 | 20 | QVQLVQSGAEVKKPGASVKVSCKASG<u>FNIKDYYMH</u>WVRQAPGQRLEWIG<u>WIDLENANTVYDAKFQG</u>RVTIARDTSASTVYMELSSLRSEDTAVYYC<u>ARDAYGRYFYDV</u>WGQGTLVTVSS | ADI-45967 | HC amino acid sequence |
| Ab3 | 21 | DIVMTQSPDSLAVSLGERAIINC<u>KSSQSLLNARTGKNYLA</u>WYQQKPGQPPKLLIY<u>WASTRES</u>GVPDRFSGSGSGTDFTLTISSLQAEDVAVYYC<u>TQSYFRRT</u>FGGGTKVEIK | ADI-45967 | LC amino acid sequence |
| Ab4 | 22 | QVQLVQSGAEVKKPGASVKVSCKASG<u>FNIKDYYMH</u>WVRQAPGQRLEWIG<u>WIDLENANTVYDAKFQG</u>RVTITRDASASTAYMELSSLRSEDTAVYYC<u>ARDAYGRYFYDV</u>WGQGTLVTVSS | ADI-45968 | HC amino acid sequence |
| Ab4 | 23 | DIVMTQSPDSLAVSLGERATINC<u>KSSQSLLNARTGKNYLA</u>WYQQKPGQPPKLLIY<u>WASTRES</u>GVPDRFSGSGSGTDFTLTISSLQAEDVAVYYC<u>VQSYFRRT</u>FGGGTKVEIK | ADI-45968 | LC amino acid sequence |
| Ab5 | 24 | QVQLVQSGAEVKKPGASVKVSCKASG<u>FNIKDYYMH</u>WVRQAPGQRLEWIG<u>WIDLENANTVYDAKFQG</u>RVTITRDTSASTAYMELGSLRSEDTAVYYC<u>ARDAYGRYFYDV</u>WGQGTLVTVSS | ADI-45969 | HC amino acid sequence |
| Ab5 | 25 | DIVMTQSPDSLAVSLGERATINC<u>KSSQSLLNARTGKNYLA</u>WYQQKPGQPPKLLIY<u>WASTRES</u>GVPDRFSGSGSGTDFTLTISSLQAEDVAVYYC<u>AQSYFRRT</u>FGGGTKVEIK | ADI-45969 | LC amino acid sequence |

TABLE 4-continued

Informal sequence listing.

| Antibody No. | SEQ ID NO: | Sequence | Clone # (ADI) | Descriptors |
|---|---|---|---|---|
| Ab6 | 26 | QVQLVQSGAEVKKPGASVKVSCKASGFNVKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45970 | HC amino acid sequence |
| Ab6 | 18 | DIVMTQSPDSLAVSLGERATINCKSSQSLLNARTGKN YLAWYQQKPGQPPKLLIYWASTRESGVPDRFSGSGS GTDFTLTISSLQAEDVAVYYCKQSYFRRTFGGGTKVE IK | ADI-45970 | LC amino acid sequence |
| Ab7 | 27 | QVQLVQSGAEVKKPGATVKVSCKASGFNIKDYYIHW VRQAPGQRLEWIGWIDLENANTVYDAKFQGRVTITR DTSASTAYMELSSLRSEDTAVYYCARDAYGRYFYDV WGQGTLVTVSS | ADI-45971 | HC amino acid sequence |
| Ab7 | 28 | DIVMTQSPDSLAVSLGERATINCKSSQSLLNARTRKN YLAWYQQKPGQPPKLLIYWASTRESGVPDRFSGSGS GTDFTLTISSLQAEDVAVYYCVQSYFRRTFGGGTKVE IK | ADI-45971 | LC amino acid sequence |
| Ab8 | 29 | QVQLVQSGAEVKRPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45972 | HC amino acid sequence |
| Ab8 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-45972 | LC amino acid sequence |
| Ab9 | 30 | QVQLVQSEAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45973 | HC amino acid sequence |
| Ab9 | 18 | DIVMTQSPDSLAVSLGERATINCKSSQSLLNARTGKN YLAWYQQKPGQPPKLLIYWASTRESGVPDRFSGSGS GTDFTLTISSLQAEDVAVYYCKQSYFRRTFGGGTKVE IK | ADI-45973 | LC amino acid sequence |
| Ab10 | 31 | QVQLVQSGAEVKKPGASVKVSCKASGFNIKDYYMH WVRQAPGQRLEWIGWIDLENANTVYDAKFQGRVTIT RDTSASTAYMELSNLRSEDTAVYYCARDAYGRYFY DVWGQGTLVTVSS | ADI-45974 | HC amino acid sequence |
| Ab10 | 18 | DIVMTQSPDSLAVSLGERATINCKSSQSLLNARTGKN YLAWYQQKPGQPPKLLIYWASTRESGVPDRFSGSGS GTDFTLTISSLQAEDVAVYYCKQSYFRRTFGGGTKVE IK | ADI-45974 | LC amino acid sequence |
| Ab11 | 32 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGQYFYD VWGQGTLVTVSS | ADI-45975 | HC amino acid sequence |
| Ab11 | 19 | DIVMTQSPDSLAVSLGERATINCKSSQSLLNARTRKN YLAWYQQKPGQPPKLLIYWASTRESGVPDRFSGSGS GTDFTLTISSLQAEDVAVYYCKQSYFRRTFGGGTKVE IK | ADI-45975 | LC amino acid sequence |
| Ab12 | 33 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCVRDAYGRYFYD VWGQGTLVTVSS | ADI-45976 | HC amino acid sequence |
| Ab12 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-45976 | LC amino acid sequence |
| Ab13 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45959 | HC amino acid sequence |

TABLE 4-continued

Informal sequence listing.

| Antibody No. | SEQ ID NO: | Sequence | Clone # (ADI) | Descriptors |
|---|---|---|---|---|
| Ab13 | 34 | DIVMSQSPDSLAVSLGERATINCKSSQSLLNARTGKN YLAWYQQKPGQPPKLLIYWASTRSSGVPDRFSGSGS GTDFTLTISSLQAEDVAVYYCVQSYFRRTFGGGTKVE IK | ADI-45959 | LC amino acid sequence |
| Ab14 | 35 | QVQLVQSGAEVKKPGASVKVSCKASGFNIKDYYMH WVRQAPGQRLEWIGWIDLENANTVYDAKLQGRVTI TRDTSASTAYMELSSLGSEDTAVYYCARDAYGRYFY DVWGQGTLVTVSS | ADI-45977 | HC amino acid sequence |
| Ab14 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-45977 | LC amino acid sequence |
| Ab15 | 37 | QVQLVQSGAEVKKPGASVKVSCKASGFNIKDYYMH WVRQAPGQRLEWLGWIDLENANTVYDAKFQGRVTI TRDTSASTAYMELSSLRSEDTAVYYCARDAYGRYFY DVWGQGTLVTVSS | ADI-45978 | HC amino acid sequence |
| Ab15 | 38 | DIVMTQSPDSLAVSLGERATINCKSSQSLLNARTGKN YLAWYQQKPGQPPKLLIYWASARESGVPDRFSGSGS GTDFTLTISSLQAEDVAVYYCTQSYFRRTFGGGTKVE IK | ADI-45978 | LC amino acid sequence |
| Ab16 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45979 | HC amino acid sequence |
| Ab16 | 39 | DIVMTQSPDSLAVSLGERATINCKSSQELLNARTGKN YLAWYQQKPGQPPKLLIYWASTRESGVPDRFSGSGS GTDFTLTISSLQAEDVAVYYCKQSYFRRTFGGGTKVE IK | ADI-45979 | LC amino acid sequence |
| Ab17 | 40 | QVQLVQSGAEVKKPGASVKVSCKASGFNIKDYYMH WVRQAPGQRLEWIGWIDLENANTVYDAKFQGRVTIT RDTSASTAYMELNSLRSEDTAVYYCARDAYGRYFY DVWGQGTLVTVSS | ADI-45980 | HC amino acid sequence |
| Ab17 | 41 | DIVMTQSPDSLAVSLGERATINCKSSQSLLNARTGKN YLAWYQQKPGQPPKLLIYWAFTRESGVPDRFSGSGS GTDFTLTISSLQAEDVAVYYCTQSYFRRTFGGGTKVE IK | ADI-45980 | LC amino acid sequence |
| Ab18 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45981 | HC amino acid sequence |
| Ab18 | 42 | DIVMTQSPDSLAVSLGERATINCKSSQSLLNARTGKN YLAWYQQKPGQPPKLLIYWASMRESGVPDRFSGSRS GTDFTLTISSLQAEDVAVYYCSQSYFRRTFGGGTKVE IK | ADI-45981 | LC amino acid sequence |
| Ab19 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-45982 | HC amino acid sequence |
| Ab19 | 43 | DIVMTQSPDSLAVSLGERATINCKSSQSLLNARTGKN YLAWYQQKPGQPPKLLIYWASTRENGVPDRFSGSGS GTDFTLTISSLQAEDVAVYYCTQSYFRRTFGGGTKVE IK | ADI-45982 | LC amino acid sequence |
| Ab20 | 44 | QVQLVQSGAEVKKPGASVKVSCKASGFNIKDYYMH WVRQAPGQRLEWIGWIDLENANTVYDAKFQGRVTIT RDTSAGTAYMELSSLRSEDTAVYYCARDAYGRYFY DVWGQGTLVTVSS | ADI-45983 | HC amino acid sequence |
| Ab20 | 45 | DIVMTQSPDSLAVSLGERATINCKSSQSLLNARTMKN YLAWYQQKPGQPPKLLIYAASTRESGVPDRFSGSGS GTDFTLTISSLQAEDVAVYYCAQSYFRRTFGGGTKVE IK | ADI-45983 | LC amino acid sequence |

TABLE 4-continued

Informal sequence listing.

| Antibody No. | SEQ ID NO: | Sequence | Clone # (ADI) | Descriptors |
|---|---|---|---|---|
| Ab21 | 17 | QVQLVQSGAEVKKPGASVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45984 | HC amino acid sequence |
| Ab21 | 28 | DIVMTQSPDSLAVSLGERATINCKSSQSLLNARTRKN<br>YLAWYQQKPGQPPKLLIYWASTRESGVPDRFSGSGS<br>GTDFTLTISSLQAEDVAVYYCVQSYFRRTFGGGTKVE<br>IK | ADI-45984 | LC amino acid sequence |
| Ab22 | 17 | QVQLVQSGAEVKKPGASVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45985 | HC amino acid sequence |
| Ab22 | 46 | DIVMTQSPDSLAVSLGERATINCKTSQSLLNARTNKN<br>YLAWYQQKPGQPPKLLIYWASTRESGVPDRFSGSGS<br>GTDFTLTISSLQAEDVAVYYCVQSYFRRTFGGGTKVE<br>IK | ADI-45985 | LC amino acid sequence |
| Ab23 | 17 | QVQLVQSGAEVKKPGASVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45960 | HC amino acid sequence |
| Ab23 | 47 | DIVMTQSPDSLAVSLGERATINCKSSQSLLNARTGKN<br>YLAWYQQKPGQPPKLLIYWASTRESGVPDRFSGSGS<br>GTDFTLTISSLQAEDAAVYYCAQSYFRRTFGGGTKVE<br>IK | ADI-45960 | LC amino acid sequence |
| Ab24 | 17 | QVQLVQSGAEVKKPGASVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45961 | HC amino acid sequence |
| Ab24 | 48 | DIVMTQSPDSLAVSLGERATINCKSSQSLLNARTRRN<br>YLAWYQQKPGQPPKLLIYWGSTRESGVPDRFSGSGS<br>GTDFTLTISSLQAEDVAVYYCKQSYFRRTFGGGTKVE<br>IK | ADI-45961 | LC amino acid sequence |
| Ab25 | 49 | QVQLVQSGAEVEEPGASVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45962 | HC amino acid sequence |
| Ab25 | 23 | DIVMTQSPDSLAVSLGERATINCKSSQSLLNARTGKN<br>YLAWYQQKPGQPPKLLIYWASTRESGVPDRFSGSGS<br>GTDFTLTISSLQAEDVAVYYCVQSYFRRTFGGGTKVE<br>IK | ADI-45962 | LC amino acid sequence |
| Ab26 | 50 | QVQLVQSGAEVKKPGAPVKVSCKASGFNIKDYYMH<br>WVRQAPGQRLEWIGWIDLENANTVYDAKFQGRVTIT<br>RDTSASTAYMELSSLRSEDTAVYYCARDAYGRYFYD<br>VWGQGTLVTVSS | ADI-45963 | HC amino acid sequence |
| Ab26 | 18 | DIVMTQSPDSLAVSLGERATINCKSSQSLLNARTGKN<br>YLAWYQQKPGQPPKLLIYWASTRESGVPDRFSGSGS<br>GTDFTLTISSLQAEDVAVYYCKQSYFRRTFGGGTKVE<br>IK | ADI-45963 | LC amino acid sequence |
| Ab27 | 51 | QVQLVQSGAEVKKPGASVKVSCKASGFNIKDYYIHW<br>VRQAPGQRLEWIGWIDLENANTVYDAKFQGRVTITR<br>DTSASTAYMELSSLRSEDTAVYYCARDAYGRYFYDV<br>WGQGTLVTVSS | ADI-45964 | HC amino acid sequence |
| Ab27 | 25 | DIVMTQSPDSLAVSLGERATINCKSSQSLLNARTGKN<br>YLAWYQQKPGQPPKLLIYWASTRESGVPDRFSGSGS<br>GTDFTLTISSLQAEDVAVYYCAQSYFRRTFGGGTKVE<br>IK | ADI-45964 | LC amino acid sequence |
| Ab28 | 52 | QVQLVQSGAEVKKPGASVKVSCKASGFNIKDYYMH<br>WVRQAPGQRLEWIGWIDLENANAVYDAKFQGRVTI<br>TRDTSASTAYMELSSLRSEDTAVYYCARDAYGRYFY<br>DVWGQGTLVTVSS | ADI-45965 | HC amino acid sequence |

TABLE 4-continued

Informal sequence listing.

| Antibody No. | SEQ ID NO: | Sequence | Clone # (ADI) | Descriptors |
|---|---|---|---|---|
| Ab28 | 53 | DIVMTQSPDSLAVSLGGRATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-45965 | LC amino acid sequence |
| Ab29 | 54 | QVQLVQSGAEVKKPGASVKVSCKASGFNIKDYYMH WVRQAPGQRLEWIGWIDLENANTVYDAKFQGRVAI TRDTSASTAYMELSSLRSEDTAVYYCARDAYGRYFY DVWGQGTLVTVSS | ADI-45966 | HC amino acid sequence |
| Ab29 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-45966 | LC amino acid sequence |
| Ab30 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-46357 | HC amino acid sequence |
| Ab30 | 25 | DIVMTQSPDSLAVSLGERATINCKSSQSLLNARTGKN YLAWYQQKPGQPPKLLIYWASTRESGVPDRFSGSGS GTDFTLTISSLQAEDVAVYYCAQSYFRRTFGGGTKVE IK | ADI-46357 | LC amino acid sequence |
| Ab31 | 31 | QVQLVQSGAEVKKPGASVKVSCKASGFNIKDYYMH WVRQAPGQRLEWIGWIDLENANTVYDAKFQGRVTIT RDTSASTAYMELSNLRSEDTAVYYCARDAYGRYFY DVWGQGTLVTVSS | ADI-46358 | HC amino acid sequence |
| Ab31 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46358 | LC amino acid sequence |
| Ab32 | 55 | QVQLVQSGAEVKKPGASVKVSCKASGFNIKDYYMH WVRQAPGQRLEWIGWIDLENANTVYDAKFQGRVTIT RDTSASIAYMELSSLRSEDTAVYYCARDAYGRYFYD VWGQGTLVTVSS | ADI-46367 | HC amino acid sequence |
| Ab32 | 25 | DIVMTQSPDSLAVSLGERATINCKSSQSLLNARTGKN YLAWYQQKPGQPPKLLIYWASTRESGVPDRFSGSGS GTDFTLTISSLQAEDVAVYYCAQSYFRRTFGGGTKVE IK | ADI-46367 | LC amino acid sequence |
| Ab33 | 56 | QAQLVQSGAEVKKPGASVKVSCKASGFNIKDYYMH WVRQAPGQRLEWIGWIDLENANTVYDTKFQGRVTIT RDTSASTAYMELSSLRSEDTAVYYCARDAYGRYFYD VWGQGTLVTVSS | ADI-46369 | HC amino acid sequence |
| Ab33 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46369 | LC amino acid sequence |
| Ab34 | 57 | QVQLVQSGAEVKKPGASVKVSCKASGFNIKDYYMH WVRQAPGQRLEWIGWIDLENANTVYDHKFQGRVTIT RDTSASTAYMELSSLRSEDTAVYYCARDAYGRYFYD VWGQGTLVTVSS | ADI-46370 | HC amino acid sequence |
| Ab34 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46370 | LC amino acid sequence |
| Ab35 | 58 | QAQLVQSGAEVKKPGASVKVSCKASGFNIKDYYMH WVRQAPGQRPEWIGWIDLENANTVYDAKFQGRVTIT RDTSASTAYMELSSLRSEDTAAYYCARDAYGRYFYD VWGQGTLVTVSS | ADI-46371 | HC amino acid sequence |
| Ab35 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46371 | LC amino acid sequence |

TABLE 4-continued

Informal sequence listing.

| Antibody No. | SEQ ID NO: | Sequence | Clone # (ADI) | Descriptors |
|---|---|---|---|---|
| Ab36 | 59 | QVQLVQSGAEVKKPGASVKVSCKASGFNIKDYYMH WVRQAPGQRLEWIGWIDLENANTVYDAKFQGRVTIT RDTSAGTAHMELSSLRSEDTAVYYCARDAYGRYFY DVWGQGTPVTVSS | ADI-46372 | HC amino acid sequence |
| Ab36 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46372 | LC amino acid sequence |
| Ab37 | 60 | QVQLVQSGAEVKKPGASVKVSCKASGFNIKDYYMH WVRQAPGQRLEWIGWIDLNNANTVYDAKFQGRVTI TRDTSASTAYMELSSLRSEDTAVYYCARDAYGRYFY DVWGQGTLVTVSS | ADI-46374 | HC amino acid sequence |
| Ab37 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46374 | LC amino acid sequence |
| Ab38 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-46375 | HC amino acid sequence |
| Ab38 | 61 | DIVMTQSPDSLAVSLGERATINCKSSQSLLNARTRKN YLAWYQQKPGQPPKLLIYWASTRESGVPDRFSGSGS GTDFTLTISSLQAEDVAVYYCTQSYFRRTFGGGTKVE IK | ADI-46375 | LC amino acid sequence |
| Ab39 | 62 | QVQLVQSGAEVKKPGASVKVSCKASGFNIKDYYMH WVRQAPGQRLEWIGWIDLENANTVYDAKLQGRVTI TRDTSASTAYMELSSLGSEDTAVYYCARDAYGRYFY DVWGQGTPVTVSS | ADI-46376 | HC amino acid sequence |
| Ab39 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46376 | LC amino acid sequence |
| Ab40 | 63 | QVQLVQSGAEVKKPGASVKVSCKASGFNIKDYYMH WVRQAPGQRLEWIGWIDLENANTVYDAKFQGRVTIT RDTSASAAYMELSSLRSEDTAVYYCARDAYGRYFY DVWGQGTLVTVSS | ADI-46378 | HC amino acid sequence |
| Ab40 | 64 | DIVMTQSPDSLAVSLGERATINCKSSQSLLNARTRKN YLAWYQQKPGRPPKLLIYWASTRESGVPDRFSGSGS GTDFTLTISSLQAEDVAVYYCVQSYFRRTFGGGTKVE IK | ADI-46378 | LC amino acid sequence |
| Ab41 | 63 | QVQLVQSGAEVKKPGASVKVSCKASGFNIKDYYMH WVRQAPGQRLEWIGWIDLENANTVYDAKFQGRVTIT RDTSASAAYMELSSLRSEDTAVYYCARDAYGRYFY DVWGQGTLVTVSS | ADI-46379 | HC amino acid sequence |
| Ab41 | 38 | DIVMTQSPDSLAVSLGERATINCKSSQSLLNARTGKN YLAWYQQKPGQPPKLLIYWASARESGVPDRFSGSGS GTDFTLTISSLQAEDVAVYYCQSYFRRTFGGGTKVE IK | ADI-46379 | LC amino acid sequence |
| Ab42 | 32 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGQYFYD VWGQGTLVTVSS | ADI-46359 | HC amino acid sequence |
| Ab42 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46359 | LC amino acid sequence |
| Ab43 | 65 | QVQLVQSGAEVKKPGASVKVSCKASGFNIKDYYMH WVRQAPGQRLEWIGWIDLENANTVYDTKFQGRVTIT RDTSASTAYMELSSLRSEDTAVYYCARDAYGRYFYD VWGQGTLVTVSS | ADI-46381 | HC amino acid sequence |

TABLE 4-continued

Informal sequence listing.

| Antibody No. | SEQ ID NO: | Sequence | Clone # (ADI) | Descriptors |
|---|---|---|---|---|
| Ab43 | 66 | DIVMTQSPDSLAVSLGERATINCKTSQGLLNARTNKN YLAWYQQKPGQPPKLLIYWASTRESGVPDRFSGSGS GTDFTLTISSLQAEDVAVYYCVQSYFRRTFGGGTKVE IK | ADI-46381 | LC amino acid sequence |
| Ab44 | 67 | QVQLVQSGAEVKKPGASVKVSCKASGFNIKDYYMH WVRQAPGQRPEWIGWIDLENANTVYDAKFQGRVTIT RDTSASTAYMELSSLRSEDAAAYYCARDAYGRYFY DVWGQGTLVTVSS | ADI-46360 | HC amino acid sequence |
| Ab44 | 68 | DIVMTQSPDSLAVSLGERATINCKSSQSLLNARTGKN YLAWYQQKPGQPPELLIYWASTRESGVPDRFSGSGS GTDFTLTISSLQAEDVAVYYCTQSYFRRTFGGGTKVE IK | ADI-46360 | LC amino acid sequence |
| Ab45 | 69 | QVQLVQSGAEVKKPGASVKVSCKASGFNNKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-46361 | HC amino acid sequence |
| Ab45 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46361 | LC amino acid sequence |
| Ab46 | 70 | QVQLVQSGAEVKKPGASVKVSCKASGFNIKDYYMH WVRQAPGQRPEWIGWIDLENANTVYDAKFQGRVTIT RDTSASTAYMELSSLRSEDTAAYYCARDAYGRYFYD VWGQGTLVTVSS | ADI-46362 | HC amino acid sequence |
| Ab46 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46362 | LC amino acid sequence |
| Ab47 | 17 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGRYFYD VWGQGTLVTVSS | ADI-46363 | HC amino acid sequence |
| Ab47 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46363 | LC amino acid sequence |
| Ab48 | 35 | QVQLVQSGAEVKKPGASVKVSCKASGFNIKDYYMH WVRQAPGQRLEWIGWIDLENANTVYDAKLQGRVTI TRDTSASTAYMELSSLGSEDTAVYYCARDAYGRYFY DVWGQGTLVTVSS | ADI-46364 | HC amino acid sequence |
| Ab48 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46364 | LC amino acid sequence |
| Ab49 | 59 | QVQLVQSGAEVKKPGASVKVSCKASGFNIKDYYMH WVRQAPGQRLEWIGWIDLENANTVYDAKFQGRVTIT RDTSAGTAHMELSSLRSEDTAVYYCARDAYGRYFY DVWGQGTPVTVSS | ADI-46365 | HC amino acid sequence |
| Ab49 | 36 | DIVMTQSPDSLAVSLGERATINCKSSQSLLNARTGKN YLAWYQQKPGQPPKLLIYWASTRESGVPDRFSGSGS GTDFTLTISSLQAEDVAVYYCTQSYFRRTFGGGTKVE IK | ADI-46365 | LC amino acid sequence |
| Ab50 | 32 | QVQLVQSGAEVKKPGASVKVSCKASGFNIKDYYMH WVRQAPGQRLEWIGWIDLENANTVYDAKFQGRVTIT RDTSASTAYMELSSLRSEDTAVYYCARDAYGQYFYD VWGQGTLVTVSS | ADI-46366 | HC amino acid sequence |
| Ab50 | 23 | DIVMTQSPDSLAVSLGERATINCKSSQSLLNARTGKN YLAWYQQKPGQPPKLLIYWASTRESGVPDRFSGSGS GTDFTLTISSLQAEDVAVYYCVQSYFRRTFGGGTKVE IK | ADI-46366 | LC amino acid sequence |

TABLE 5

Antibody VH sequence information.

| | VH FR1 | SEQ ID NO: | VH CDR1 | SEQ ID NO: | VH FR2 | SEQ ID NO: | VH CDR2 | SEQ ID NO: | VH FR3 | SEQ ID NO: | VH CDR3 | SEQ ID NO: | VH FR4 | SEQ ID NO: |
|---|---|---|---|---|---|---|---|---|---|---|---|---|---|---|
| ADI-42594 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-42596 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-46356 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-46357 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-46358 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSNLRSEDTAVYYC | 90 | ARDAYGRYFYDV | 103 | WGQGTLVTVSS | 106 |
| ADI-46359 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGQYFYDV | 104 | WGQGTLVTVSS | 106 |
| ADI-46360 | QVQLVQSGAEVKKPGASVKVSCKASG | 71 | FNIKDYYMH | 13 | WVRQAPGQRPEWIG | 82 | WIDLENANTVYDAKFQG | 15 | RVTIIRDTSASTAYMELSSLRSEDAAAYYC | 91 | ARDAYGRYFYDV | 103 | WGQGTLVTVSS | 106 |
| ADI-46361 | QVQLVQSGAEVKKPGASVKVSCKASG | 71 | FNNKDYYMH | 78 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-46362 | QVQLVQSGAEVKKPGASVKVSCKASG | 71 | FNIKDYYMH | 13 | WVRQAPGQRPEWIG | 82 | WIDLENANTVYDAKFQG | 15 | RVTIIRDTSASTAYMELSSLRSEDTAAYYC | 92 | ARDAYGRYFYDV | 103 | WGQGTLVTVSS | 106 |
| ADI-46363 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-46364 | QVQLVQSGAEVKKPGASVKVSCKASG | 71 | FNIKDYYMH | 13 | WVRQAPGQRLEWIG | 81 | WIDLENANTVYDAKFQG | 84 | RVTITRDTSASTAYMELSLGSEDTAVYYC | 93 | ARDAYGRYFYDV | 103 | WGQGTLVTVSS | 106 |
| ADI-46365 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSAGTAHMELSSLRSEDTAVYYC | 94 | ARDAYGRYFYDV | 103 | WGQGTLVTVSS | 107 |

TABLE 5-continued

Antibody VH sequence information.

| VH FR1 | SEQ ID NO: | VH CDR1 | SEQ ID NO: | VH FR2 | SEQ ID NO: | VH CDR2 | SEQ ID NO: | VH FR3 | SEQ ID NO: | VH CDR3 | SEQ ID NO: | VH FR4 | SEQ ID NO: |
|---|---|---|---|---|---|---|---|---|---|---|---|---|---|
| ADI-46366 QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGQYFYDV | 104 | WGQGTLVTVSS | 106 |
| ADI-46367 QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASIAYMELSSLRSEDTAVYYC | 95 | ARDAYGRYFYDV | 103 | WGQGTLVTVSS | 106 |
| ADI-46369 QAQLVQSGAEVKKPGASVKVSCKASG | 72 | FNIKDYYMH | 13 | WVRQAPGQRLEWIG | 81 | WIDLENANTVYDTKFQG | 85 | RVTITRDTSASTAYMELSSLRSEDTAVYYC | 89 | ARDAYGRYFYDV | 103 | WGQGTLVTVSS | 106 |
| ADI-46370 QVQLVQSGAEVKKPGASVKVSCKASG | 71 | FNIKDYYMH | 13 | WVRQAPGQRLEWIG | 81 | WIDLENANTVYDHKFQG | 86 | RVTIIRDTSASTAYMELSSLRSEDTAVYYC | 89 | ARDAYGRYFYDV | 103 | WGQGTLVTVSS | 106 |
| ADI-46371 QAQLVQSGAEVKKPGASVKVSCKASG | 72 | FNIKDYYMH | 13 | WVRQAPGQRPEWIG | 82 | WIDLENANTVYDAKFQG | 15 | RVTIIRDTSASTAYMELSSLRSEDTAAYYC | 92 | ARDAYGRYFYDV | 103 | WGQGTLVTVSS | 106 |
| ADI-46372 QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSAGTAHMELSSLRSEDTAVYYC | 94 | ARDAYGRYFYDV | 103 | WGQGTPVTVSS | 107 |
| ADI-46374 QVQLVQSGAEVKKPGASVKVSCKASG | 71 | FNIKDYYMH | 13 | WVRQAPGQRLEWIG | 81 | WIDLENANTVYDAKFQG | 87 | RVTIIRDTSASTAYMELSSLRSEDTAVYYC | 89 | ARDAYGRYFYDV | 103 | WGQGTLVTVSS | 106 |
| ADI-46375 QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-46376 QVQLVQSGAEVKKPGASVKVSCKASG | 71 | FNIKDYYMH | 13 | WVRQAPGQRLEWIG | 81 | WIDLENANTVYDAKFQG | 84 | RVTIIRDTSASTAYMELSLGSEDTAVYYC | 93 | ARDAYGRYFYDV | 103 | WGQGTPVTVSS | 107 |
| ADI-46378 QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASAAYMELSSLRSEDTAVYYC | 96 | ARDAYGRYFYDV | 103 | WGQGTLVTVSS | 106 |
| ADI-46379 QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASAAYMELSSLRSEDTAVYYC | 96 | ARDAYGRYFYDV | 103 | WGQGTLVTVSS | 106 |
| ADI-46381 QVQLVQSGAEVKKPGASVKVSCKASG | 71 | FNIKDYYMH | 13 | WVRQAPGQRLEWIG | 81 | WIDLENANTVYDAKFQG | 85 | RVTITRDTSASTAYMELSSLRSEDTAVYYC | 89 | ARDAYGRYFYDV | 103 | WGQGTLVTVSS | 106 |

TABLE 5-continued

Antibody VH sequence information.

| VH FR1 | SEQ ID NO: | VH CDR1 | SEQ ID NO: | VH FR2 | SEQ ID NO: | VH CDR2 | SEQ ID NO: | VH FR3 | SEQ ID NO: | VH CDR3 | SEQ ID NO: | VH FR4 | SEQ ID NO: |
|---|---|---|---|---|---|---|---|---|---|---|---|---|---|
| ADI-42596 QVQLVQS GAEVKKP GASVKVS CKASG | | FNIKDY YMH | 71 | WVRQAP GQRLEW IG | 13 | WIDLEN ANTVYD AKFQG | 81 | RVTITR DTSAST AYMELS SLRSED TAVYYC | 15 | ARDAYG RYFYDV | 89 | WGQGTL VTVSS | 103 | | 106 |
| ADI-45959 QVQLVQS GAEVKKP GASVKVS CKASG | | FNIKDY YMH | 71 | WVRQAP GQRLEW IG | 13 | WIDLEN ANTVYD AKFQG | 81 | RVTIIR DTSAST AYMELS SLRSED TAVYYC | 15 | ARDAYG RYFYDV | 89 | WGQGTL VTVSS | 103 | | 106 |
| ADI-45960 QVQLVQS GAEVKKP GASVKVS CKASG | | FNIKDY YMH | 71 | WVRQAP GQRLEW IG | 13 | WIDLEN ANTVYD AKFQG | 81 | RVTIIR DTSAST AYMELS SLRSED TAVYYC | 15 | ARDAYG RYFYDV | 89 | WGQGTL VTVSS | 103 | | 106 |
| ADI-45961 QVQLVQS GAEVKKP GASVKVS CKASG | | FNIKDY YMH | 71 | WVRQAP GQRLEW IG | 13 | WIDLEN ANTVYD AKFQG | 81 | RVTITR DTSAST AYMELS SLRSED TAVYYC | 15 | ARDAYG RYFYDV | 89 | WGQGTL VTVSS | 103 | | 106 |
| ADI-45962 QVQLVQS GAEVEEP GASVKVS CKASG | | FNIKDY YMH | 73 | WVRQAP GQRLEW IG | 13 | WIDLEN ANTVYD AKFQG | 81 | RVTITR DTSAST AYMELS SLRSED TAVYYC | 15 | ARDAYG RYFYDV | 89 | WGQGTL VTVSS | 103 | | 106 |
| ADI-45963 QVQLVQS GAEVKKP GAPVKVS CKASG | | FNIKDY YMH | 74 | WVRQAP GQRLEW IG | 13 | WIDLEN ANTVYD AKFQG | 81 | RVTITR DTSAST AYMELS SLRSED TAVYYC | 15 | ARDAYG RYFYDV | 89 | WGQGTL VTVSS | 103 | | 106 |
| ADI-45964 QVQLVQS GAEVKKP GASVKVS CKASG | | FNIKDY YIH | 71 | WVRQAP GQRLEW IG | 79 | WIDLEN ANTVYD AKFQG | 81 | RVTIIR DTSAST AYMELS SLRSED TAVYYC | 15 | ARDAYG RYFYDV | 89 | WGQGTL VTVSS | 103 | | 106 |
| ADI-45965 QVQLVQS GAEVKKP GASVKVS CKASG | | FNIKDY YMH | 71 | WVRQAP GQRLEW IG | 13 | WIDLEN ANAVYD AKFQG | 81 | RVTIIR DTSAST AYMELS SLRSED TAVYYC | 88 | ARDAYG RYFYDV | 89 | WGQGTL VTVSS | 103 | | 106 |
| ADI-45966 QVQLVQS GAEVKKP GASVKVS CKASG | | FNIKDY YMH | 71 | WVRQAP GQRLEW IG | 13 | WIDLEN ANTVYD AKFQG | 81 | RVAITR DTSAST AYMELS SLRSED TAVYYC | 15 | ARDAYG RYFYDV | 97 | WGQGTL VTVSS | 103 | | 106 |
| ADI-45967 QVQLVQS GAEVKKP GASVKVS CKASG | | FNIKDY YMH | 71 | WVRQAP GQRLEW IG | 13 | WIDLEN ANTVYD AKFQG | 81 | RVTIAR DTSAST VYMELS SLRSED TAVYYC | 15 | ARDAYG RYFYDV | 98 | WGQGTL VTVSS | 103 | | 106 |
| ADI-45968 QVQLVQS GAEVKKP GASVKVS CKASG | | FNIKDY YMH | 71 | WVRQAP GQRLEW IG | 13 | WIDLEN ANTVYD AKFQG | 81 | RVTIIR DASAST AYMELS SLRSED TAVYYC | 15 | ARDAYG RYFYDV | 99 | WGQGTL VTVSS | 103 | | 106 |
| ADI-45969 QVQLVQS GAEVKKP GASVKVS CKASG | | FNIKDY YMH | 71 | WVRQAP GQRLEW IG | 13 | WIDLEN ANTVYD AKFQG | 81 | RVTIIR DTSAST AYMELG SLRSED TAVYYC | 15 | ARDAYG RYFYDV | 100 | WGQGTL VTVSS | 103 | | 106 |

TABLE 5-continued

Antibody VH sequence information.

| | VH FR1 | SEQ ID NO: | VH CDR1 | SEQ ID NO: | VH FR2 | SEQ ID NO: | VH CDR2 | SEQ ID NO: | VH FR3 | SEQ ID NO: | VH CDR3 | SEQ ID NO: | VH FR4 | SEQ ID NO: |
|---|---|---|---|---|---|---|---|---|---|---|---|---|---|---|
| ADI-45970 | QVQLVQSGAEVKKPGASVKVSCKASG | 71 | FNVKDYYMH | 80 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-45971 | QVQLVQSGAEVKKPGATVKVSCKASG | 75 | FNIKDYYIH | 79 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45972 | QVQLVQSGAEVKRPGASVKVSCKASG | 76 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45973 | QVQLVQSEAEVKKPGASVKVSCKASG | 77 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45974 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSNLRSEDTAVYYC | 90 | ARDAYGRYFYDV | 103 | WGQGTLVTVSS | 106 |
| ADI-45975 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGQYFYDV | 104 | WGQGTLVTVSS | 106 |
| ADI-45976 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | VRDAYGRYFYDV | 105 | WGQGTLVTVSS | 106 |
| ADI-45977 | QVQLVQSGAEVKKPGASVKVSCKASG | 71 | FNIKDYYMH | 13 | WVRQAPGQRLEWIG | 81 | WIDLENANTVYDAKFQG | 84 | RVTITRDTSASTAYMELSSLGSEDTAVYYC | 93 | ARDAYGRYFYDV | 103 | WGQGTLVTVSS | 106 |
| ADI-45978 | QVQLVQSGAEVKKPGASVKVSCKASG | 71 | FNIKDYYMH | 13 | WVRQAPGQRLEWLG | 83 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45979 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELSSLRSEDTAVYYC | 89 | ARDAYGRYFYDV | 103 | WGQGTLVTVSS | 106 |
| ADI-45980 | QVQLVQSGAEVKKPGASVKVSCKASG | 71 | FNIKDYYMH | 13 | WVRQAPGQRLEWIG | 81 | WIDLENANTVYDAKFQG | 15 | RVTIIRDTSASTAYMELNSLRSEDTAVYYC | 101 | ARDAYGRYFYDV | 103 | WGQGTLVTVSS | 106 |
| ADI-45981 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |

TABLE 5-continued

Antibody VH sequence information.

| | VH FR1 | SEQ ID NO: | VH CDR1 | SEQ ID NO: | VH FR2 | SEQ ID NO: | VH CDR2 | SEQ ID NO: | VH FR3 | SEQ ID NO: | VH CDR3 | SEQ ID NO: | VH FR4 | SEQ ID NO: |
|---|---|---|---|---|---|---|---|---|---|---|---|---|---|---|
| ADI-45982 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45983 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSAGTAYMELSSLRSEDTAVYYC | 102 | ARDAYGRYFYDV | 103 | WGQGTLVTVSS | 106 |
| ADI-45984 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |
| ADI-45985 | QVQLVQSGAEVKKPGASVKVSCKASG | 71 | FNIKDYYMH | 13 | WVRQAPGQRLEWIG | 81 | WIDLENANTVYDAKFQG | 15 | RVTITRDTSASTAYMELSSLRSEDTAVYYC | 89 | ARDAYGRYFYDV | 103 | WGQGTLVTVSS | 106 |

TABLE 6

Antibody VL sequence information.

| | VL FR1 | SEQ ID NO: | VL CDR1 | SEQ ID NO: | VL FR2 | SEQ ID NO: | VL CDR2 | SEQ ID NO: | VL FR3 | SEQ ID NO: | VL CDR3 | SEQ ID NO: | VL CDR4 | SEQ ID NO: |
|---|---|---|---|---|---|---|---|---|---|---|---|---|---|---|
| ADI-42594 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-42596 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-46356 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-46357 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | AQSYFRT | 2 | FGGGTKVEIK | 130 |
| ADI-46358 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEIK | 130 |
| ADI-46359 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEK | 130 |

TABLE 6-continued

Antibody VL sequence information.

| | VL FR1 | SEQ ID NO: | VL CDR1 | SEQ ID NO: | VL FR2 | SEQ ID NO: | VL CDR2 | SEQ ID NO: | VL FR3 | SEQ ID NO: | VL CDR3 | SEQ ID NO: | VL CDR4 | SEQ ID NO: |
|---|---|---|---|---|---|---|---|---|---|---|---|---|---|---|
| ADI-46360 | DIVMTQSPDSLAVSLGERATINC | 108 | KSSQSLLNARTGKNYLA | 8 | WYQQKPGQPPELLIY | 118 | WASTRES | 10 | GVPDRFSGSGSGTDFTLTISSLQAEDVAVYYC | 126 | TQSYFRT | 3 | FGGGTKVEK | 130 |
| ADI-46361 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFR | 3 | FGGGTKVEK | 130 |
| ADI-46362 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEK | 130 |
| ADI-46363 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFR | 3 | FGGGTKVEK | 130 |
| ADI-46364 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEK | 130 |
| ADI-46365 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFR | 3 | FGGGTKVEK | 130 |
| ADI-46366 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEK | 130 |
| ADI-46367 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | AQSYFRT | 2 | FGGGTKVEK | 130 |
| ADI-46369 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFR | 4 | FGGGTKVEK | 130 |
| ADI-46370 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFR | 4 | FGGGTKVEK | 130 |
| ADI-46371 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFR | 4 | FGGGTKVEK | 130 |
| ADI-46372 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFR | 4 | FGGGTKVEK | 130 |

TABLE 6-continued

Antibody VL sequence information.

| | VL FR1 | SEQ ID NO: | VL CDR1 | SEQ ID NO: | VL FR2 | SEQ ID NO: | VL CDR2 | SEQ ID NO: | VL FR3 | SEQ ID NO: | VL CDR3 | SEQ ID NO: | VL CDR4 | SEQ ID NO: |
|---|---|---|---|---|---|---|---|---|---|---|---|---|---|---|
| ADI-46374 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEK | 130 |
| ADI-46375 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | TQSYFRT | 3 | FGGGTKVEK | 130 |
| ADI-46376 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEK | 130 |
| ADI-46378 | DIVMTQSPDSLAVSLGERATINC | 108 | KSSQSLLNARTRKNYLA | 9 | WYQQKPGRPPKLLIY | 119 | WASTRES | 10 | GVPDRFSGSGSGTDFTLTISSLQAEDVAVYYC | 126 | VQSYFRT | 4 | FGGGTKVEK | 130 |
| ADI-46379 | DIVMTQSPDSLAVSLGERATINC | 108 | KSSQSLLNARTGKNYLA | 8 | WYQQKPGQPPKLLIY | 117 | WASARES | 120 | GVPDRFSGSGSGTDFTLTISSLQAEDVAVYYC | 126 | TQSYFRT | 3 | FGGGTKVEK | 130 |
| ADI-46381 | DIVMTQSPDSLAVSLGERATINC | 108 | KTSQGLLNARTNKNYLA | 112 | WYQQKPGQPPKLLIY | 117 | WASTRES | 10 | GVPDRFSGSGSGTDFTLTISSLQAEDVAVYYC | 126 | VQSYFRT | 4 | FGGGTKVEK | 130 |
| ADI-42596 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | KQSYFRT | 5 | FGGGTKVEK | 130 |
| ADI-45959 | DIVMSQSPDSLAVSLGERATINC | 109 | KSSQSLLNARTGKNYLA | 8 | WYQQKPGQPPKLLIY | 117 | WASTRSS | 11 | GVPDRFSGSGSGTDFTLTISSLQAEDVAVYYC | 126 | VQSYFRT | 4 | FGGGTKVEIK | 130 |
| ADI-45960 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 127 | AQSYFRT | 2 | FGGGTKVEIK | 130 |
| ADI-45961 | DIVMTQSPDSLAVSLGERATINC | 108 | KSSQSLLNARTRRNYLA | 113 | WYQQKPGQPPKLLIY | 117 | WGSTRES | 121 | GVPDRFSGSGSGTDFTLTISSLQAEDVAVYYC | 126 | KQSYFRT | 5 | FGGGTKVEIK | 130 |
| ADI-45962 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45963 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |

TABLE 6-continued

Antibody VL sequence information.

| | VL FR1 | SEQ ID NO: | VL CDR1 | SEQ ID NO: | VL FR2 | SEQ ID NO: | VL CDR2 | SEQ ID NO: | VL FR3 | SEQ ID NO: | VL CDR3 | SEQ ID NO: | VL CDR4 | SEQ ID NO: |
|---|---|---|---|---|---|---|---|---|---|---|---|---|---|---|
| ADI-45964 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | AQSYFRT | 2 | FGGGTKVEIK | 130 |
| ADI-45965 | DIVMTQSPDSLAVSLGGRATINC | 110 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45966 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEIK | 130 |
| ADI-45967 | DIVMTQSPDSLAVSLGERAUNC | 111 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEIK | 130 |
| ADI-45968 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45969 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | AQSYFRT | 2 | FGGGTKVEIK | 130 |
| ADI-45970 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-45971 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45972 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45973 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-45974 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-45975 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |

TABLE 6-continued

Antibody VL sequence information.

| | VL FR1 | SEQ ID NO: | VL CDR1 | SEQ ID NO: | VL FR2 | SEQ ID NO: | VL CDR2 | SEQ ID NO: | VL FR3 | SEQ ID NO: | VL CDR3 | SEQ ID NO: | VL CDR4 | SEQ ID NO: |
|---|---|---|---|---|---|---|---|---|---|---|---|---|---|---|
| ADI-45976 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45977 | DIVMTQSPDSLAVSLGERATINC | 108 | KSSQSLLNARTGKNYLA | 8 | WYQQKPGQPPKLLIY | 117 | WASTRES | 10 | GVPDRFSGSGSGTDFTLTISSLQAEDVAVYYC | 126 | TQSYFRT | 3 | FGGGTKVEIK | 130 |
| ADI-45978 | DIVMTQSPDSLAVSLGERATINC | 108 | KSSQSLLNARTGKNYLA | 8 | WYQQKPGQPPKLLIY | 117 | WASARES | 120 | GVPDRFSGSGSGTDFTLTISSLQAEDVAVYYC | 126 | TQSYFRT | 3 | FGGGTKVEIK | 130 |
| ADI-45979 | DIVMTQSPDSLAVSLGERATINC | 108 | KSSQELLNARTGKNYLA | 114 | WYQQKPGQPPKLLIY | 117 | WASTRES | 10 | GVPDRFSGSGSGTDFTLTISSLQAEDVAVYYC | 126 | KQSYFRT | 5 | FGGGTKVEIK | 130 |
| ADI-45980 | DIVMTQSPDSLAVSLGERATINC | 108 | KSSQSLLNARTGKNYLA | 8 | WYQQKPGQPPKLLIY | 117 | WAFTRES | 122 | GVPDRFSGSGSGTDFTLTISSLQAEDVAVYYC | 126 | TQSYFRT | 3 | FGGGTKVEIK | 130 |
| ADI-45981 | DIVMTQSPDSLAVSLGERATINC | 108 | KSSQSLLNARTGKNYLA | 8 | WYQQKPGQPPKLLIY | 117 | WASMRES | 123 | GVPDRFSGSGSGTDFTLTISSLQAEDVAVYYC | 128 | SQSYFRT | 129 | FGGGTKVEIK | 130 |
| ADI-45982 | DIVMTQSPDSLAVSLGERATINC | 108 | KSSQSLLNARTGKNYLA | 8 | WYQQKPGQPPKLLIY | 117 | WASTREN | 124 | GVPDRFSGSGSGTDFTLTISSLQAEDVAVYYC | 126 | TQSYFRT | 3 | FGGGTKVEIK | 130 |
| ADI-45983 | DIVMTQSPDSLAVSLGERATINC | 108 | KSSQSLLNARTMKNYLA | 115 | WYQQKPGQPPKLLIY | 117 | AASTRES | 125 | GVPDRFSGSGSGTDFTLTISSLQAEDVAVYYC | 126 | AQSYFRT | 2 | FGGGTKVEIK | 130 |
| ADI-45984 | DIVMTQSPDSLAVSLGERATINC | 108 | KSSQSLLNARTRKNYLA | 9 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |
| ADI-45985 | DIVMTQSPDSLAVSLGERATINC | 108 | KTSQSLLNARTNKNYLA | 116 | WYQQKPGQPPKLLIY | 117 | WASTRES | 10 | GVPDRFSGSGSGTDFTLTISSLQAEDVAVYYC | 126 | VQSYFRT | 4 | FGGGTKVEIK | 130 |

TABLE 7

Human and Cynomolgus CD3ε Sequences

| Name | Sequence: | SEQ ID NO: |
|---|---|---|
| Hu CD3ε Fc | QDGNEEMGGITQTPYKVSISGTTVILTCPQYPGSE ILWQHNDKNIGGDEDDKNIGSDEDHLSLKEFSELE QSGYYVCYPRGSKPEDANFYLYLRARVCENCMEMD GGSDKTHTCPPCPAPELLGGPSVFLFPPKPKDTLM ISRTPEVTCVVVDVSHEDPEVKFNWYVDGVEVHNA KTKPREEQYASTYRVVSVLTVLHQDWLNGKEYKCK VSNKALPAPIEKTISKAKGQPREPQVYTLPPSRDE LTKNQVSLTCLVKGFYPSDIAVEWESNGQPENNYK TTPPVLDSDGSFFLYSKLTVDKSRWQQGNVFSCSV MHEALHNHYTQKSLSLSPGK | 131 |
| Cy CD3ε Fc | QDGNEEMGSITQTPYQVSISGTTVILTCSQHLGSE AQWQHNGKNKEDSGDRLFLPEFSEMEQSGYYVCYP RGSNPEDASHHLYLKARVCENCMEMDGGSDKTHTC PPCPAPELLGGPSVFLFPPKPKDTLMISRTPEVTC VVVDVSHEDPEVKFNWYVDGVEVHNAKTKPREEQY ASTYRVVSVLTVLHQDWLNGKEYKCKVSNKALPAP IEKTISKAKGQPREPQVYTLPPSRDELTKNQVSLT CLVKGFYPSDIAVEWESNGQPENNYKTTPPVLDSD GSFFLYSKLTVDKSRWQQGNVFSCSVMHEALHNHY TQKSLSLSPGK | 132 |

What is claimed is:

1. An anti-cluster of differentiation three (CD3) antibody or antigen-binding antibody fragment, which comprises:
   a. a heavy chain variable region (VH) polypeptide comprising:
      i. a VH CDR1 (CDRH1) comprising FNIKDYYMH (SEQ ID NO: 13);
      ii. a VH CDR2 (CDRH2) comprising WIDLENANTVYDAKFQG (SEQ ID NO: 15); and
      iii. a VH CDR3 (CDRH3) comprising ARDAYGRYFYDV (SEQ ID NO: 103); and
   b. a light chain variable region (VL) polypeptide comprising:
      i. a VL CDR1 (CDRL1) comprising KSSQSLLN-ARTGKNYLA (SEQ ID NO: 8);
      ii. a VL CDR2 (CDRL2) comprising WASTRX$_1$S (SEQ ID NO: 133); and
      iii. a VL CDR3 (CDRL3) comprising X$_2$QSYFRRT (SEQ ID NO: 134);
      wherein:
         (i) X$_1$ is S and X$_2$ is V;
         (ii) X$_1$ is E and X$_2$ is V; or
         (iii) X$_1$ is E and X$_2$ is A.

2. The anti-CD3 antibody or antigen-binding antibody fragment of claim 1, which:
   (i) binds to human CD3 with a dissociation constant ($K_D$) of about 200 pM or less; and/or
   (ii) elicits T cell activation or T cell killing while displaying a decreased propensity to elicit cytokine production to levels capable of inducing cytokine release syndrome.

3. The anti-CD3 antibody or antigen-binding antibody fragment of claim 1, which comprises one or more of the following features:
   a. comprises an scFv, a Fv, a Fab, a Fab', a Fab'-SH, a F(ab')2, a diabody, a scFv2-Fc2, or a scFv-IgG;
   b. comprises:
      (A) a heavy chain comprising the VH polypeptide and a heavy chain constant region (CH) polypeptide; and
      (B) a light chain comprising the VL polypeptide and a light chain constant region (CL) polypeptide;
   c. comprises an IgG, IgA, IgD, IgE, or IgM antibody;
   d. is comprised in a chimeric antigen receptor (CAR), which comprises at least one transmembrane domain, at least one intracellular domain from a T-cell receptor, and at least one co-stimulatory domain;
   e. comprises an IgG constant domain.

4. An isolated or recombinant nucleic acid encoding an anti-CD3 antibody or antigen-binding antibody fragment of claim 1, or an expression vector containing said nucleic acid.

5. A host cell transfected, transformed, or transduced with a nucleic acid according to claim 4, or with a vector containing said nucleic acid sequence.

6. A pharmaceutical composition comprising: an anti-CD3 antibody or antigen-binding antibody fragment of claim 1; and a pharmaceutically acceptable carrier and/or excipient.

7. An anti-CD3 antibody or antigen-binding antibody fragment, which comprises:
   (A) a heavy chain variable region (VH) polypeptide comprising a VH CDR1 (CDRH1), a VH CDR2 (CDRH2), and a VH CDR3 (CDRH3); and
   (B) a light chain variable region (VL) polypeptide comprising a VL CDR1 (CDRL1), a VL CDR2 (CDRL2), and a VL CDR3 (CDRL3),
   wherein:
   (I) (i) (a) the amino acid sequences of the CDRH1, the CDRH2, and the CDRH3 comprise or consist of the heavy chain CDR 1, 2, and 3 sequences, respectively, contained in SEQ ID NO: 17, and
      (b) the amino acid sequences of the CDRL1, the CDRL2, and the CDRL3 comprise or consist of the light chain CDR 1, 2, and 3 sequences, respectively, contained in SEQ ID NO: 34; or
      (ii) the amino acid sequences of the CDRH1, the CDRH2, the CDRH3, the CDRL1, the CDRL2, and the CDRL3 comprise or consist of SEQ ID NO: 13, 15, 103, 8, 11, and 4, respectively;
   (II) (i) (a) the amino acid sequences of the CDRH1, the CDRH2, and the CDRH3 comprise or consist of the heavy chain CDR 1, 2, and 3 sequences, respectively, contained in SEQ ID NO: 22, and
      (b) the amino acid sequences of the CDRL1, the CDRL2, and the CDRL3 comprise or consist of the light chain CDR 1, 2, and 3 sequences, respectively, contained in SEQ ID NO: 23; or
      (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
   (III) (i) (a) the amino acid sequences of the CDRH1, the CDRH2, and the CDRH3 comprise or consist of the heavy chain CDR 1, 2, and 3 sequences, respectively, contained in SEQ ID NO: 29, and
      (b) the amino acid sequences of the CDRL1, the CDRL2, and the CDRL3 comprise or consist of the light chain CDR 1, 2, and 3 sequences, respectively, contained in SEQ ID NO: 23; or
      (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
   (IV) (i) (a) the amino acid sequences of the CDRH1, the CDRH2, and the CDRH3 comprise or consist of the heavy chain CDR 1, 2, and 3 sequences, respectively, contained in SEQ ID NO: 49, and (b) the amino acid sequences of the CDRL1, the CDRL2, and the CDRL3 comprise or consist of the light chain CDR 1, 2, and 3 sequences, respectively, contained in SEQ ID NO: 23; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
(V) (i) (a) the amino acid sequences of the CDRH1, the CDRH2, and the CDRH3 comprise or consist of the heavy chain CDR 1, 2, and 3 sequences, respectively, contained in SEQ ID NO: 58, and
  (b) the amino acid sequences of the CDRL1, the CDRL2, and the CDRL3 comprise or consist of the light chain CDR 1, 2, and 3 sequences, respectively, contained in SEQ ID NO: 23; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
(VI) (i) (a) the amino acid sequences of the CDRH1, the CDRH2, and the CDRH3 comprise or consist of the heavy chain CDR 1, 2, and 3 sequences, respectively, contained in SEQ ID NO: 59, and
  (b) the amino acid sequences of the CDRL1, the CDRL2, and the CDRL3 comprise or consist of the light chain CDR 1, 2, and 3 sequences, respectively, contained in SEQ ID NO: 23; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
(VII) (i) (a) the amino acid sequences of the CDRH1, the CDRH2, and the CDRH3 comprise or consist of the heavy chain CDR 1, 2, and 3 sequences, respectively, contained in SEQ ID NO: 70, and
  (b) the amino acid sequences of the CDRL1, the CDRL2, and the CDRL3 comprise or consist of the light chain CDR 1, 2, and 3 sequences, respectively, contained in SEQ ID NO: 23; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 4, respectively;
(VIII) (i) (a) the amino acid sequences of the CDRH1, the CDRH2, and the CDRH3 comprise or consist of the heavy chain CDR 1, 2, and 3 sequences, respectively, contained in SEQ ID NO: 24, and
  (b) the amino acid sequences of the CDRL1, the CDRL2, and the CDRL3 comprise or consist of the light chain CDR 1, 2, and 3 sequences, respectively, contained in SEQ ID NO: 25; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 2, respectively;
(IX) (i) (a) the amino acid sequences of the CDRH1, the CDRH2, and the CDRH3 comprise or consist of the heavy chain CDR 1, 2, and 3 sequences, respectively, contained in SEQ ID NO: 17, and
  (b) the amino acid sequences of the CDRL1, the CDRL2, and the CDRL3 comprise or consist of the light chain CDR 1, 2, and 3 sequences, respectively, contained in SEQ ID NO: 47; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 2, respectively;
(X) (i) (a) the amino acid sequences of the CDRH1, the CDRH2, and the CDRH3 comprise or consist of the heavy chain CDR 1, 2, and 3 sequences, respectively, contained in SEQ ID NO: 17, and
  (b) the amino acid sequences of the CDRL1, the CDRL2, and the CDRL3 comprise or consist of the light chain CDR 1, 2, and 3 sequences, respectively, contained in SEQ ID NO: 25; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 2, respectively; or
(XI) (i) (a) the amino acid sequences of the CDRH1, the CDRH2, and the CDRH3 comprise or consist of the heavy chain CDR 1, 2, and 3 sequences, respectively, contained in SEQ ID NO: 55, and
  (b) the amino acid sequences of the CDRL1, the CDRL2, and the CDRL3 comprise or consist of the light chain CDR 1, 2, and 3 sequences, respectively, contained in SEQ ID NO: 25; or
  (ii) the amino acid sequences of the CDRH1, the CDRH2, the CDRH3, the CDRL1, the CDRL2, and the CDRL3 comprise or consist of SEQ ID NO: 13, 15, 103, 8, 10, and 2, respectively.

8. The anti-CD3 antibody or antigen-binding antibody fragment of claim 7, wherein
in (I), (A) the amino acid sequence of the VH polypeptide has at least 90% sequence identity to SEQ ID NO: 17, and
  (B) the amino acid sequence of the VL polypeptide has at least 90% sequence identity to SEQ ID NO: 34;
in (II), (A) the amino acid sequence of the VH polypeptide has at least 90% sequence identity to SEQ ID NO: 22, and
  (B) the amino acid sequence of the VL polypeptide has at least 90% sequence identity to SEQ ID NO: 23;
in (III), (A) the amino acid sequence of the VH polypeptide has at least 90% sequence identity to SEQ ID NO: 29, and
  (B) the amino acid sequence of the VL polypeptide has at least 90% sequence identity to SEQ ID NO: 23;
in (IV), (A) the amino acid sequence of the VH polypeptide has at least 90% sequence identity to SEQ ID NO: 49, and
  (B) the amino acid sequence of the VL polypeptide has at least 90% sequence identity to SEQ ID NO: 23;
in (V), (A) the amino acid sequence of the VH polypeptide has at least 90% sequence identity to SEQ ID NO: 58, and
  (B) the amino acid sequence of the VL polypeptide has at least 90% sequence identity to SEQ ID NO: 23;
in (VI), (A) the amino acid sequence of the VH polypeptide has at least 90% sequence identity to SEQ ID NO: 59, and
  (B) the amino acid sequence of the VL polypeptide has at least 90% sequence identity to SEQ ID NO: 23;
in (VII), (A) the amino acid sequence of the VH polypeptide has at least 90% sequence identity to SEQ ID NO: 70, and
  (B) the amino acid sequence of the $V_L$ polypeptide has at least 90% sequence identity to SEQ ID NO: 23;
in (VIII), (A) the amino acid sequence of the VH polypeptide has at least 90% sequence identity to SEQ ID NO: 24, and (B) the amino acid sequence of the VL polypeptide has at least 90% sequence identity to SEQ ID NO: 25;
in (IX), (A) the amino acid sequence of the VH polypeptide has at least 90% sequence identity to SEQ ID NO: 17, and
(B) the amino acid sequence of the VL polypeptide has at least 90% sequence identity to SEQ ID NO: 47;
in (X), (A) the amino acid sequence of the VH polypeptide has at least 90% sequence identity to SEQ ID NO: 17, and
(B) the amino acid sequence of the VL polypeptide has at least 90% sequence identity to SEQ ID NO: 25; or
in (XI), (A) the amino acid sequence of the VH polypeptide has at least 90% sequence identity to SEQ ID NO: 55, and
(B) the amino acid sequence of the VL polypeptide has at least 90% sequence identity to SEQ ID NO: 25.

9. The anti-CD3 antibody or antigen-binding antibody fragment of claim 7, wherein
in (I), (A) the amino acid sequence of the VH polypeptide has at least 95% sequence identity to SEQ ID NO: 17, and
(B) the amino acid sequence of the VL polypeptide has at least 95% sequence identity to SEQ ID NO: 34;
in (II), (A) the amino acid sequence of the VH polypeptide has at least 95% sequence identity to SEQ ID NO: 22, and
(B) the amino acid sequence of the VL polypeptide has at least 95% sequence identity to SEQ ID NO: 23;
in (IV), (A) the amino acid sequence of the VH polypeptide has at least 95% sequence identity to SEQ ID NO: 29, and
(B) the amino acid sequence of the VL polypeptide has at least 95% sequence identity to SEQ ID NO: 23;
in (IV), (A) the amino acid sequence of the VH polypeptide has at least 9500 sequence identity to SEQ ID NO: 49, and
(B) the amino acid sequence of the VL polypeptide has at least 95% sequence identity to SEQ ID NO: 23;
in (V), (A) the amino acid sequence of the VH polypeptide has at least 95% sequence identity to SEQ ID NO: 58, and
(B) the amino acid sequence of the VL polypeptide has at least 95% sequence identity to SEQ ID NO: 23;
in (VI), (A) the amino acid sequence of the VH polypeptide has at least 95% sequence identity to SEQ ID NO: 59, and
(B) the amino acid sequence of the VL polypeptide has at least 95% sequence identity to SEQ ID NO: 23;
in (VII), (A) the amino acid sequence of the VH polypeptide has at least 95% sequence identity to SEQ ID NO: 70, and
(B) the amino acid sequence of the VL polypeptide has at least 95% sequence identity to SEQ ID NO: 23;
in (VIII), (A) the amino acid sequence of the VH polypeptide has at least 90% sequence identity to SEQ ID NO: 24, and
(B) the amino acid sequence of the VL polypeptide has at least 95% sequence identity to SEQ ID NO: 25;
in (IX), (A) the amino acid sequence of the VH polypeptide has at least 95% sequence identity to SEQ ID NO: 17, and
(B) the amino acid sequence of the VL polypeptide has at least 95% sequence identity to SEQ ID NO: 47;
in (X), (A) the amino acid sequence of the VH polypeptide has at least 95% sequence identity to SEQ ID NO: 17, and
(B) the amino acid sequence of the VL polypeptide has at least 95% sequence identity to SEQ ID NO: 25; or
in (XI), (A) the amino acid sequence of the VH polypeptide has at least 95% sequence identity to SEQ ID NO: 55, and
(B) the amino acid sequence of the VL polypeptide has ng at least 95% sequence identity to SEQ ID NO: 25.

10. The anti-CD3 antibody or antigen-binding antibody fragment of claim 7,
wherein:
(i) (A) the amino acid sequence of the CDRH1, the CDRH2, and the CDRH3 comprise heavy chain CDR1, 2, and 3 sequences, respectively, contained in SEQ ID NO: 17; and
(B) the amino acid sequence of the CDRL1, the CDRL2, and the CDRL3 comprise light chain CDR1, 2, and 3 sequences, respectively, contained in SEQ ID NO: 34; or
(ii) the amino acid sequences of the CDRH1, the CDRH2, the CDRH3, the CDRL1, the CDRL2, and the CDRL3 comprise or consist of SEQ ID NO: 13, 15, 103, 8, 11, and 4, respectively.

11. The anti-CD3 antibody or antigen-binding antibody fragment of claim 10,
(A) the amino acid sequence of the VH polypeptide has at least 90% sequence identity to SEQ ID NO: 17, and
(B) the amino acid sequence of the VL polypeptide has at least 90% sequence identity to SEQ ID NO: 34.

12. The anti-CD3 antibody or antigen-binding antibody fragment of claim 10,
(A) the amino acid sequence of the VH polypeptide has at least 95% sequence identity to SEQ ID NO: 17, and
(B) the amino acid sequence of the VL polypeptide has at least 95% sequence identity to SEQ ID NO: 34.

13. The anti-CD3 antibody or antigen-binding antibody fragment of claim 10, wherein the amino acid sequences of the VH polypeptide and the VL polypeptide comprise or consist of SEQ ID NOS: 17 and 34, respectively.

14. A pharmaceutical composition comprising: an anti-CD3 antibody or antigen-binding antibody fragment of claim 13; and a pharmaceutically acceptable carrier and/or excipient.

15. The anti-CD3 antibody or antigen-binding antibody fragment of claim 10, which comprises one or more of the following features:
a. comprises an scFv, a Fv, a Fab, a Fab', a Fab'-SH, a F(ab')2, a diabody, a scFv2-Fc2, or a scFv-IgG;
b. comprises:
(A) a heavy chain comprising the VH polypeptide and a heavy chain constant region (CH) polypeptide; and
(B) a light chain comprising the VL polypeptide and a light chain constant region (CL) polypeptide;
c. comprises an IgG, IgA, IgD, IgE, or IgM antibody;
d. is comprised in a chimeric antigen receptor (CAR), which comprises at least one transmembrane domain, and at least one intracellular domain from a T-cell receptor, and at least one co-stimulatory domain; and/or
e. comprises an IgG constant domain.

16. An isolated or recombinant nucleic acid encoding an anti-CD3 antibody or antigen-binding antibody fragment of claim 10, or an expression vector containing said nucleic acid.

17. A host cell transfected, transformed, or transduced with a nucleic acid according to claim 16 or with a vector containing said nucleic acid sequence.

18. A pharmaceutical composition comprising: an anti-CD3 antibody or antigen-binding antibody fragment of claim 10; and a pharmaceutically acceptable carrier and/or excipient.

19. An anti-cluster of differentiation three (CD3) antibody or antigen-binding antibody fragment, which comprises:
    (A) a heavy chain variable region (VH) polypeptide; and
    (B) a light chain variable region (VL) polypeptide,
    wherein the amino acid sequences of the VH polypeptide and the VH polypeptide comprise or consist of:
    (I) SEQ ID NOS: 17 and 34, respectively;
    (II) SEQ ID NOS: 22 and 23, respectively;
    (III) SEQ ID NOS: 29 and 23, respectively;
    (IV) SEQ ID NOS: 49 and 23, respectively;
    (V) SEQ ID NOS: 58 and 23, respectively;
    (VI) SEQ ID NOS: 59 and 23, respectively;
    (VII) SEQ ID NOS: 70 and 23, respectively;
    (VIII) SEQ ID NOS: 24 and 25, respectively;
    (IX) SEQ ID NOS: 17 and 47, respectively;
    (X) SEQ ID NOS: 17 and 25, respectively;
    (XI) SEQ ID NOS: 55 and 25, respectively;
    (XII) SEQ ID NOS: 20 and 21, respectively;
    (XIII) SEQ ID NOS: 54 and 36, respectively;
    (XIV) SEQ ID NOS: 31 and 36, respectively;
    (XV) SEQ ID NOS: 67 and 68, respectively;
    (XVI) SEQ ID NOS: 17 and 36, respectively;
    (XVII) SEQ ID NOS: 59 and 36, respectively;
    (XVIII) SEQ ID NOS: 30 and 18, respectively;
    (XIX) SEQ ID NOS: 31 and 18, respectively; or
    (XX) SEQ ID NOS: 50 and 18, respectively.

* * * * *